(12) United States Patent
Yamada et al.

(10) Patent No.: US 12,162,768 B2
(45) Date of Patent: Dec. 10, 2024

(54) CARBON MATTER-CONTAINING MATERIAL PRODUCTION METHOD, CARBON MATTER-CONTAINING MATERIAL, AND SOLUBLE ORGANIC-INORGANIC COMPOSITE

(71) Applicant: NIPPON SHOKUBAI CO., LTD., Osaka (JP)

(72) Inventors: Yasuhiro Yamada, Chiba (JP); Masatoshi Murata, Chiba (JP); Makoto Saito, Chiba (JP); Satoshi Sato, Chiba (JP); Syun Gohda, Osaka (JP); Hironobu Ono, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 633 days.

(21) Appl. No.: 17/275,040

(22) PCT Filed: Sep. 13, 2019

(86) PCT No.: PCT/JP2019/036037
§ 371 (c)(1),
(2) Date: Mar. 10, 2021

(87) PCT Pub. No.: WO2020/054833
PCT Pub. Date: Mar. 19, 2020

(65) Prior Publication Data
US 2022/0055907 A1 Feb. 24, 2022

(30) Foreign Application Priority Data

Sep. 14, 2018 (JP) ................................. 2018-172447
Sep. 14, 2018 (JP) ................................. 2018-172449
(Continued)

(51) Int. Cl.
*C01B 33/18* (2006.01)
*C01F 7/02* (2022.01)
*C01G 23/047* (2006.01)

(52) U.S. Cl.
CPC ................ *C01B 33/18* (2013.01); *C01F 7/02* (2013.01); *C01G 23/047* (2013.01); *C01P 2002/82* (2013.01); *C01P 2002/88* (2013.01)

(58) Field of Classification Search
None
See application file for complete search history.

(56) References Cited

U.S. PATENT DOCUMENTS 4,753,717 A  6/1988  Yata et al.
6,812,187 B1  11/2004  Pak et al.
(Continued)

FOREIGN PATENT DOCUMENTS

CN  106540658 A  *  3/2017  ........... B01J 20/205
JP  S61222912 A  10/1986
(Continued)

OTHER PUBLICATIONS

Tripathi et al (One-pot assembly of silica@two polymeric shells for synthesis of hollow carbon porous nanospheres: Adsorption of bisphenol A, Mater Letters, vol. 120, (2014), pp. 108-110) (Year: 2014).*

(Continued)

*Primary Examiner* — Michael Forrest
(74) *Attorney, Agent, or Firm* — Osha Bergman Watanabe & Burton LLP

(57) ABSTRACT

A method of producing a carbon material-containing material having a precisely controlled structure under a mild condition, a carbon material-containing material covalently bonded to an inorganic matter, and an intermediate material which is useful for, for example, industrially producing (Continued)

carbon-coated inorganic particles, hollow carbon fine particles, and can be industrially produced under a mild condition, are provided. The method of producing a carbon material-containing material includes heating a composition containing a compound (A), which causes a condensation reaction between the same and/or different molecules, and an inorganic matter. When the compound (A) has a condensation reaction temperature of T° C., a heating temperature is (T-150)° C. or more. The carbon material-containing material includes a carbon material and an inorganic matter. At least part of the carbon material and inorganic matter are covalently bonded. The organic-inorganic composite includes a carbon material and an inorganic matter. The carbon material is soluble in a solvent.

18 Claims, 33 Drawing Sheets

(30) Foreign Application Priority Data

| | | |
|---|---|---|
| Oct. 26, 2018 | (JP) | 2018-201390 |
| Oct. 26, 2018 | (JP) | 2018-201392 |
| Feb. 6, 2019 | (JP) | 2019-019609 |
| Feb. 6, 2019 | (JP) | 2019-019611 |
| Aug. 7, 2019 | (JP) | 2019-145089 |
| Aug. 7, 2019 | (JP) | 2019-145090 |
| Sep. 4, 2019 | (JP) | 2019-160849 |
| Sep. 12, 2019 | (JP) | 2019-166187 |

(56) References Cited

U.S. PATENT DOCUMENTS

| | | |
|---|---|---|
| 7,718,570 B2 | 5/2010 | Pak et al. |
| 7,754,177 B2 | 7/2010 | Takikawa et al. |
| 8,986,838 B2 | 3/2015 | Kamegawa et al. |
| 2005/0036935 A1 | 2/2005 | Pak et al. |
| 2007/0207081 A1 | 9/2007 | Takikawa et al. |
| 2010/0291167 A1 | 11/2010 | Iida et al. |
| 2011/0281113 A1 | 11/2011 | Kamegawa et al. |
| 2013/0189580 A1* | 7/2013 | Dai .......... H05K 3/30 977/734 |
| 2013/0203589 A1* | 8/2013 | Thompson .......... B01J 20/3246 502/413 |

FOREIGN PATENT DOCUMENTS

| | | |
|---|---|---|
| JP | H07187849 A | 7/1995 |
| JP | H07267618 A | 10/1995 |
| JP | H11124467 A | 5/1999 |
| JP | 2002020628 A | 1/2002 |
| JP | 2004244311 A | 9/2004 |
| JP | 2005281065 A | 10/2005 |
| JP | 2010168251 A | 8/2010 |

OTHER PUBLICATIONS

Tripathi et al ("Enlargement of uniform micropores in hierarchically ordered micro-mesoporous carbon for high level decontamination of bisphenol", J. Mater. Chem. A. (2014) 2, 8534 (Year: 2014).*
Machine Translation for CN-106540658 (Year: 2017).*
Shahid, Naureen, et al.; "Chemically functionalized alumina nanoparticle effect on carbon fiber/epoxy composites;" Composites Science and Technology; vol. 65, No. 14, pp. 2250-2258; XP027688139; ISSN: 0266-3538; Amsterdam, NL; Nov. 1, 2005 (9 pages).
Extended European Search Report issued in corresponding European Patent Application No. 19858852.7, dated Dec. 12, 2022 (11 pages).
Dawei Pan et al.; "Polyoxometalate-Modified Carbon Nanotubes: New Catalyst Support for Methanol Electro-oxidation", Langmuir, 22, 5872-5876 (2006) (5 pages).
V. Ruiz et. al., "Hybrid electrodes based on polyoxometalate-carbon materials for electrochemical supercapacitors", Electrochemistry Communications, 24, 35-38 (2012) (4 pages).
Riichiro Saito, "Graphene's state-of-the-art technology and expanding applications", Chapter 2 Basics of light absorption of graphene, 3. Photoelectron properties of graphene (2012) (26 pages).
H. Nishihara et. al., "Oxidation-Resistant and Elastic Mesoporous Carbon with Single-Layer Graphene Walls", Adv. Funct. Mater., 26, 6418-6427 (2016) (10 pages).
International Search Report issued for International Patent Application No. PCT/JP2019/036037, mailed Nov. 26, 2019 (2 pages).
Pranav K. Tripathi et al., "One-pot assembly of silica@two polymeric shells for synthesis of hollow carbon porous nanospheres: Adsorption of bisphenol A" Elsevier Materials Letters, Jan. 21, 2014, vol. 120, p. 108-110 (3 pages).
Office Action issued in the counterpart Chinese Patent Application No. 201980059897.6 mailed Jul. 29, 2023 (8 pages).
Ottenbourgs, Ben, et al.; "Quantitative carbon-13 solid-state n.m.r. and FT-Raman spectroscopy in novolac resins"; Polymer; vol. 39; No. 22; 1998; p. 5293-5300 (9 pages).
Office Action issued in corresponding Japanese Patent Application No. 2019-145089, mailed Jan. 9, 2024 (2 pages).

* cited by examiner

CARBON MATTER-CONTAINING MATERIAL PRODUCTION METHOD, CARBON MATTER-CONTAINING MATERIAL, AND SOLUBLE ORGANIC-INORGANIC COMPOSITE

TECHNICAL FIELD

The present invention relates to a method of producing a carbon material-containing material, a carbon material-containing material, and a soluble organic-inorganic composite.

BACKGROUND ART

In consideration of recent trends toward resource savings and energy savings, a lightweight carbon material has been developed, and has been used in various fields. For example, carbon material-containing materials, such as carbon-coated inorganic particles and hollow carbon fine particles, have been reported as compounds each of which includes such lightweight carbon material and is useful in various fields (e.g., Patent Literatures 1 to 4, and Non-Patent Literatures 1 to 4). In addition, activated carbon, carbon black, or the like has been known as a carbon material-containing material that is industrially produced.

However, it is difficult to apply the related-art carbon material-containing materials, such as the carbon-coated inorganic particles and the hollow carbon fine particles, to industrial production in which mass production is performed at low cost because the materials need to be produced by forming a carbon material film on the surface of each of inorganic particles to be coated with carbon and fine particles each serving as a base for a hollow structure through, for example, a vapor phase reaction or a high-temperature deposition reaction.

In addition, such carbon material-containing materials as described above including the activated carbon, the carbon black, and the like that are industrially produced have various functional groups. Accordingly, there is a problem in that it is difficult to precisely control the structures of the carbon material-containing materials, and hence variations in physical properties thereof occur. In recent years, a carbon material-containing material that can certainly express targeted physical properties has been required, and hence the development of a carbon material-containing material having a precisely controlled structure has been required.

CITATION LIST

Patent Literature

[PTL 1] JP 07-187849 A
[PTL 2] JP 07-267618 A
[PTL 3] JP 2005-281065 A
[PTL 4] JP 2010-168251 A

Non-Patent Literature

[NPL 1] Dawei Pan et. al., Langmuir, 22, 5872-5876 (2006)
[NPL 2] V. Ruiz et. al., Electrochemistry Communications, 24, 35-38 (2012)
[NPL 3] H. Nishihara et. al., Adv. Funct. Mater., 26, 6418-6427 (2016)
[NPL 4] Riichiro Saito, "Advanced Technologies and Emerging Applications of Graphene", Chapter 2. Basic Physical Properties of Graphene and Chapter 3. Photoelectronic Physical Properties of Graphene

SUMMARY OF INVENTION

Technical Problem

An object of the present invention is to provide a method by which a carbon material-containing material having solubility in a solvent or a carbon material-containing material having a precisely controlled structure is simply produced under a mild condition. Another object of the present invention is to provide a carbon material-containing material in which a carbon material and an inorganic matter are bonded to each other through a covalent bond. Another object of the present invention is to provide an organic-inorganic composite, which is useful for, for example, industrially producing carbon material-containing materials, such as carbon-coated inorganic particles and hollow carbon fine particles, and can be industrially produced under a mild condition.

Solution to Problem

According to one embodiment of the present invention, there is provided a method of producing a carbon material-containing material, including a heating step (I) of heating a composition containing a compound (A), which causes a condensation reaction between the same molecules and/or between different molecules by being heated, and an inorganic matter, wherein when the compound (A) has a condensation reaction temperature of $T°$ C., a heating temperature in the heating step (I) is $T-150)°$ C. or more, provided that the condensation reaction temperature T as used herein means a condensation reaction temperature in the absence of a catalyst (carrier).

In one embodiment, the method of producing a carbon material-containing material further includes a carbon material-removing step of removing at least part of a carbon material produced by the heating of the compound (A) after the heating step (I).

In one embodiment, the method of producing a carbon material-containing material further includes a heating step (II) of further heating the residue after the carbon material-removing step.

In one embodiment, the method of producing a carbon material-containing material further includes an inorganic matter-removing step of removing the inorganic matter after the heating step (I).

In one embodiment, the method of producing a carbon material-containing material further includes a heating step (II) of further heating the residue after the inorganic matter-removing step.

In one embodiment, the compound (A) has a molecular weight of 500 or less.

In one embodiment, in the compound (A) has a condensation reaction temperature of 450° C. or less.

In one embodiment, the compound (A) has a condensation reaction temperature of 400° C. or less.

In one embodiment, when the compound (A) is subjected to TG-DTA analysis under a nitrogen gas atmosphere and under a temperature increase condition of 10° C./min from 40° C., a weight ratio (M500/M50) of a weight M500 thereof at a temperature of 500° C. to an initial weight M50 thereof at a temperature of 50° C. is 0.2 or more.

In one embodiment, the condensation reaction is accelerated by an acid catalyst.

In one embodiment, the condensation reaction is at least one kind selected from the group consisting of:
(a) a condensation reaction caused by formation of $H_2O$ from a —H group and a —OH group, and desorption thereof;
(b) a condensation reaction caused by formation of ROH from a —H group and an —OR group where R represents any appropriate substituted or unsubstituted alkyl group, and desorption thereof;
(c) a condensation reaction caused by formation of HX from a —H group and an —X group where X represents a halogen or CN, and desorption thereof;
(d) a condensation reaction caused by formation of $NH_3$ from a —H group and an —$NH_2$ group, and desorption thereof;
(e) a condensation reaction caused by formation of $RNH_2$ from a —H group and an —NHR group where R represents any appropriate substituted or unsubstituted alkyl group, and desorption thereof;
(f) a condensation reaction caused by formation of $R^1R^2NH$ from a —H group and an —$NR^1R^2$ group where $R^1$ and $R^2$ each represent any appropriate substituted or unsubstituted alkyl group, and desorption thereof;
(g) a condensation reaction caused by formation of $H_2S$ from a —H group and a —SH group, and desorption thereof;
(h) a condensation reaction caused by formation of RSH from a —H group and an —SR group where R represents any appropriate substituted or unsubstituted alkyl group, and desorption thereof;
(i) a condensation reaction caused by formation of RCOOH from a —H group and an —OOCR group where R represents any appropriate substituted or unsubstituted alkyl group, and desorption thereof;
(j) a condensation reaction caused by formation of $H_2SO_3$ from a —H group and an —OSO(OH) group, and desorption thereof;
(k) a condensation reaction caused by formation of $RSO_2$(OH) from a —H group and an —$OSO_2R$ group where R represents any appropriate substituted or unsubstituted alkyl group, and desorption thereof;
(l) a condensation reaction caused by formation of $ROSO_3H$ from a —H group and an —$OSO_2(OR)$ group where R represents any appropriate substituted or unsubstituted alkyl group, and desorption thereof; and
(m) a condensation reaction caused by formation of $H_2SO_4$ from a —H group and an —$OSO_2(OH)$ group, and desorption thereof.

In one embodiment, the inorganic matter is at least one kind selected from the group consisting of an inorganic oxide, an inorganic nitride, an inorganic sulfide, an inorganic carbide, and an insoluble salt.

In one embodiment, the inorganic oxide is inorganic oxide particles each having a functional group on a surface thereof.

In one embodiment, the inorganic oxide particles are at least one kind selected from the group consisting of silica particles, alumina particles, titania particles, magnesium oxide particles, polyacid particles, metal particles whose surfaces are oxidized at least partially, composite oxide particles, and solid solution oxide particles.

In one embodiment, a metal for forming the polyacid particles is at least one kind selected from the group consisting of molybdenum, vanadium, tungsten, niobium, titanium, and tantalum.

In one embodiment, the inorganic oxide has a decomposition temperature of 800° C. or more.

According to one embodiment of the present invention, there is provided a carbon material-containing material, including:
a carbon material; and
an inorganic matter,
wherein at least part of the carbon material and at least part of the inorganic matter are bonded to each other through a covalent bond.

In one embodiment, the carbon material-containing material of the present invention shows a peak in a range of from 125 ppm to 135 ppm in $^{13}$C-NMR analysis thereof.

In one embodiment, the carbon material-containing material of the present invention shows a peak in a range of from 140 ppm to 160 ppm in $^{13}$C-NMR analysis thereof.

According to one embodiment of the present invention, there is provided an organic-inorganic composite, including:
a carbon material; and
an inorganic matter,
wherein the carbon material is soluble in a solvent.

In one embodiment, the solvent is N-methylpyrrolidone.

In one embodiment, the inorganic matter is at least one kind selected from the group consisting of an inorganic oxide, an inorganic nitride, an inorganic sulfide, an inorganic carbide, and an insoluble salt.

In one embodiment, the inorganic oxide is inorganic oxide particles each having a functional group on a surface thereof.

In one embodiment, the inorganic oxide particles are at least one kind selected from the group consisting of silica particles, alumina particles, titania particles, magnesium oxide particles, polyacid particles, metal particles whose surfaces are oxidized at least partially, composite oxide particles, and solid solution oxide particles.

In one embodiment, a metal for forming the polyacid particles is at least one kind selected from the group consisting of molybdenum, vanadium, tungsten, niobium, titanium, and tantalum.

Advantageous Effects of Invention

According to the present invention, the method by which a carbon material-containing material having solubility in a solvent or a carbon material-containing material having a precisely controlled structure is simply produced under a mild condition can be provided. According to the present invention, the carbon material-containing material in which a carbon material and an inorganic matter are bonded to each other through a covalent bond can also be provided. According to the present invention, the organic-inorganic composite, which is useful for, for example, industrially producing carbon material-containing materials, such as carbon-coated inorganic particles and hollow carbon fine particles, and can be industrially produced under a mild condition, can also be provided.

DESCRIPTION OF EMBODIMENTS

Figure 1:
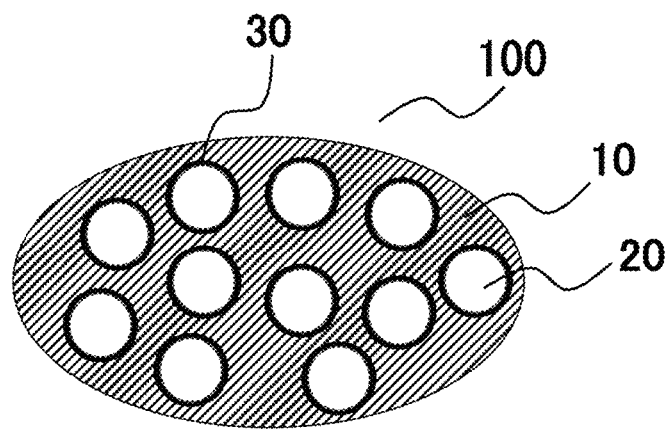
FIG. 1 is a schematic sectional view for illustrating one preferred embodiment of each of an organic-inorganic composite that is one embodiment of a carbon material-containing material obtained by a production method of the present invention, and an organic-inorganic composite of the present invention.

<<<<1. Method of Producing Carbon Material-Containing Material>>>>

A method of producing a carbon material-containing material of the present invention includes a heating step (I) of heating a composition containing a compound (A), which causes a condensation reaction between the same molecules and/or between different molecules by being heated, and an inorganic matter, wherein when the compound (A) has a condensation reaction temperature of T° C., a heating temperature in the heating step (I) is (T−150)° C. or more.

In the heating step (I), the composition containing the compound (A), which causes the condensation reaction between the same molecules and/or between different molecules by being heated, and the inorganic matter is heated. A blending ratio between the compound (A) and the inorganic matter is as follows: the amount of the compound (A) is preferably from 0.01 wt % to 1,000,000 wt %, more preferably from 0.1 wt % to 100,000 wt %, particularly preferably from 1 wt % to 1,000 wt % with respect to 100 wt % of the inorganic matter. When the blending ratio between the compound (A) and the inorganic matter falls within the ranges, a carbon material-containing material having a more precisely controlled structure can be more simply produced under a milder condition. The blending ratio between the inorganic matter and the compound (A) may be appropriately adjusted in accordance with the target physical properties of a composite. For example, the adjustment of the blending ratio between the inorganic matter and the compound (A) enables the control of the physical properties and form (e.g., solubility in a solvent, the shape of a carbon component or an inorganic component (whether the component is particulate or nonparticulate), and the size of the carbon component or the inorganic component) of the carbon material-containing material to be obtained.

Any appropriate other component may be incorporated into the composition containing the compound (A), which causes the condensation reaction between the same molecules and/or between different molecules by being heated, and the inorganic matter to the extent that the effects of the present invention are not impaired. Examples of such other component include a solvent, a catalyst, a parent material, and a carrier.

The composition to be heated in the heating step (I) only needs to be prepared by any appropriate method to the extent that the effects of the present invention are not impaired. Such method is, for example, a method including mixing the compound (A) and the inorganic matter through any appropriate method (e.g., crushing or pulverization) while the components are in solid states. In addition, the method is, for example, a method including mixing the compound (A), the inorganic matter, a solvent, and as required, any other component except the solvent through any appropriate method (e.g., ultrasonic treatment) and removing the solvent through any appropriate method (e.g., vacuum drying). In addition, shredding may be performed as required.

When the condensation reaction temperature of the compound (A) is T° C., the heating temperature in the heating step (I) is (T−150)° C. or more, preferably from (T−150)° C. to (T+50)° C., more preferably from (T−130)° C. to (T+45)° C., still more preferably from (T−100)° C. to (T+40)° C., particularly preferably from (T−80)° C. to (T+35)° C., most preferably from (T−50)° C. to (T+30)° C. In the method of producing a carbon material-containing material of the present invention, the catalytic ability of the inorganic matter, and reactivity between a functional group on the inorganic matter and a carbon material are high, and hence a reaction between the functional group and the carbon material may proceed from relatively low temperature as compared to the condensation reaction temperature of the compound (A) as described above to advance the carbonization of the compound (A) matter. When the heating temperature is adjusted within the ranges, a carbon material-containing material having solubility in a solvent or a carbon material-containing material having a more precisely controlled structure can be more simply produced under a milder condition.

The condensation reaction temperature of the compound (A) may be determined by TG-DTA analysis. A specific procedure is as described below.

(1) When one kind of compound is used as the compound (A), the TG-DTA analysis of the compound (A) is performed under a nitrogen gas atmosphere at a rate of temperature increase of 10° C./min from 40° C., and the lowest peak top temperature of the resultant DTA curve is determined as the condensation reaction temperature (T° C.) of the compound (A).

(2) When a mixture of two or more kinds of compounds is used as the compound (A), the TG-DTA analysis of the mixture is performed under a nitrogen gas atmosphere at a rate of temperature increase of 10° C./min from 40° C., and the lowest peak top temperature of the resultant DTA curve is determined as the condensation reaction temperature (T° C.) of the compound (A) (mixture of two or more kinds of compounds).

(3) However, when the compound (A) serving as one kind of compound or a mixture of two or more kinds of compounds contains, for example, an impurity such as a solvent, moisture, or hydrated water, a DTA peak along with the desorption of the impurity (sometimes referred to as "impurity peak") is observed at temperatures lower than the condensation reaction temperature in some cases. In such cases, the condensation reaction temperature of the compound (A) is determined while the impurity peak is neglected. The lowest peak top temperature of the resultant DTA curve is typically determined as the condensation reaction temperature of the compound (A) while the impurity peak is neglected.

As a specific heating temperature, the heating temperature in the heating step (I) is preferably from 200° C. to 500° C., more preferably from 220° C. to 400° C., still more preferably from 230° C. to 350° C., most preferably from 250° C. to 300° C. When the heating temperature is adjusted within the ranges, a carbon material-containing material having solubility in a solvent or a carbon material-containing material having a more precisely controlled structure can be more simply produced under a milder condition. In particular, the heating temperature in the heating step (I) is low as described above, and hence a carbon material-containing material can be industrially produced under a milder condition.

As a specific heating time, a heating time in the heating step (I) is preferably from 0.1 hour to 120 hours, more preferably from 0.5 hour to 100 hours, still more preferably from 1 hour to 50 hours, most preferably from 2 hours to 24 hours. When the heating time is adjusted within the ranges, a carbon material-containing material having solubility in a solvent or a carbon material-containing material having a more precisely controlled structure can be more simply produced under a milder condition.

<<1-1. Compound (A)>>

The compound (A) causes the condensation reaction between the same molecules and/or between different molecules by being heated, and hence the compound (A) may be typically turned into a carbon material through the heating step (I) of heating the composition containing the compound (A) and the inorganic matter.

It is preferred that the compound (A) be a solid under an environment at 23° C., and have a melting point. When the compound has a melting point, the compound melts in its calcination process, and hence the reaction between the molecules satisfactorily proceeds. If the compound does not have any melting point, the compound does not melt in the calcination process. Accordingly, the positions of the molecules are fixed, and hence the reaction between the molecules is hardly accelerated. Thus, the compound is hardly turned into a carbon material. When such compound (A) is adopted, the condensation reaction is accelerated, and hence the decomposition reaction of the compound is suppressed, or the solubility of the carbon material in the carbon material-containing material to be obtained in a solvent becomes more excellent (e.g., the amount of the component of the carbon material that dissolves in the solvent becomes larger, or the number of kinds of solvents in which the carbon material can dissolve increases).

The skeleton of the compound (A) that does not contribute to the condensation is preferably an aromatic structure. When the skeleton is aromatic, the carbon component of the carbon material to be obtained may be more stable. Such aromatic structure is preferably, for example: an aromatic structure including a carbon atom, such as benzene or naphthalene; or a heteroaromatic structure including a carbon atom and a heteroatom (e.g., nitrogen or oxygen), such as pyridine, pyrimidine, furan, or thiophene. Of those, an aromatic structure and a heteroaromatic structure each having a six-membered ring structure, such as benzene and pyridine, are more preferred.

Any appropriate molecular weight may be adopted as the molecular weight of the compound (A) to the extent that the effects of the present invention are not impaired. Such molecular weight is preferably 500 or less, more preferably from 75 to 450, still more preferably from 80 to 400, most preferably from 100 to 350 because the effects of the present invention can be further expressed.

Any appropriate condensation reaction temperature may be adopted as the condensation reaction temperature of the compound (A) to the extent that the effects of the present invention are not impaired. Such condensation reaction temperature is preferably 450° C. or less, more preferably 400° C. or less, still more preferably from 200° C. to 370° C., particularly preferably from 250° C. to 350° C. because the effects of the present invention can be further expressed.

When the compound (A) is subjected to TG-DTA analysis under a nitrogen gas atmosphere and under a temperature increase condition of 10° C./min from 40° C., the weight ratio (M500/M50) of the weight M500 thereof at a temperature of 500° C. to the initial weight M50 thereof at a temperature of 50° C. is preferably 0.2 or more, more preferably from 0.2 to 0.9, most preferably from 0.3 to 0.8 because the effects of the present invention can be further expressed. When the compound (A) in which the weight ratio (M500/M50) falls within the ranges is used, the carbon material may sufficiently remain in the carbon material-containing material after its heating.

Typical Embodiment (First Embodiment) of Compound (A)

A typical embodiment (first embodiment) of the compound (A) is an aromatic compound that is decomposed by heating to produce a radical on an aromatic ring thereof. The aromatic compound that has produced the radical on the aromatic ring may cause the condensation reaction between the same molecules and/or between different molecules to be turned into a carbon material.

The aromatic compound that is decomposed by heating to produce the radical on the aromatic ring is preferably an aromatic compound that produces a gas (gas that is in a gas state at normal temperature and normal pressure) by being heated.

Any appropriate aromatic compound may be adopted as the aromatic compound that produces the gas by being heated as long as the compound is an aromatic compound and produces the gas by being heated. Such gas that is in a gas state at normal temperature and normal pressure is preferably at least one kind selected from CO, $CO_2$, $N_2$, $O_2$, $H_2$, and $NO_2$.

When such gas that is in a gas state at normal temperature and normal pressure as described above is at least one kind selected from CO, $CO_2$, and $O_2$, the carbon material-containing material to be obtained preferably has, in particular, at least one kind of aspect selected from the group consisting of the following aspects (1) to (6).

(1) The ratio of the total amount of all carbon-oxygen bonds, that is, C—O bonds (including an alcohol-derived C—O bond, an ether-derived C—O bond, and an epoxy-derived C—O bond) and C=O bonds (including a carbonyl-derived C=O bond, a carboxyl-derived C=O bond, an ester-derived C=O bond, and a lactone-derived C=O bond) to the total amount of all bonds, that is, a C—C bond, a C=C bond, a C—H bond, the C—O bonds, and the C=O bonds, the ratio being determined by C1s XPS analysis, is preferably 10% or more, more preferably 20% or more, still more preferably 25% or more, and the upper limit of the ratio is preferably 35% or less. When the ratio of the total amount of the C—O bonds and the C=O bonds to the total amount of the C—C bond, the C=C bond, the C—H bond, the C—O bonds, and the C=O bonds, the ratio being determined by the C1s XPS analysis, in the carbon material-containing material falls within the ranges, the carbon material-containing material may be a novel carbon material-containing material having various physical properties, such as solubility, unlike a simple carbon material that has heretofore been known.

(2) The ratio of the total amount of the ether-derived C—O bond (i.e., a C—O—C bond) and the alcohol-derived C—O bond (i.e., a C—OH bond) to the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, is preferably 50% or more, more preferably 60% or more, still more preferably 65% or more, particularly preferably 70% or more, most preferably 75% or more. The upper limit of the ratio is preferably 90% or less. When the ratio of the total amount of the ether-derived C—O bond and the alcohol-derived C—O bond to the total amount of the C—O bonds and the C=O bonds, the ratio being determined by the C1s XPS analysis, in the carbon material-containing material falls within the ranges, the structure control ratio of the carbon material portion of the carbon material-containing material can be improved, and the structure thereof can be more precisely controlled. The term "structure control ratio" refers to the ratio of the number of bonds derived from a desired reaction to the total bond number. In the present invention, the total bond number corresponds to the total amount of the C—O bonds and the C=O bonds, and the number of the bonds derived from the desired reaction corresponds to the total amount of the ether-derived C—O bond and the alcohol-derived C—O bond. A high structure control ratio is rephrased as follows: the number of the bonds derived from the desired reaction is large, and the number of bonds derived from an undesired reaction is small. In the present invention, a bond derived from the undesired reaction is a C=O bond derived from the decomposition reaction of the carbon material. As the structure control ratio becomes larger, the decomposition reaction is suppressed, and hence such carbon material-containing material can be said to be a carbon material-containing material having a more precisely controlled structure.

(3) The ratio of the total amount of the ether-derived C—O bond (i.e., the C—O—C bond) and the alcohol-derived C—O bond (i.e., the C—OH bond) to the total amount of all the bonds, that is, the C—C bond, the C=C bond, the C—H bond, the C—O bonds (including the alcohol-derived C—O bond, the ether-derived C—O bond, and the epoxy-derived C—O bond), and the C=O bonds (including the carbonyl-derived C=O bond, the carboxyl-derived C=O bond, the ester-derived C=O bond, and the lactone-derived C=O bond), the ratio being determined by the C1s XPS analysis, is preferably 15% or more, more preferably 17% or more, still more preferably 20% or more. The upper limit of the ratio is preferably 30% or less. When the ratio of the total amount of the ether-derived C—O bond (i.e., the C—O—C bond) and the alcohol-derived C—O bond (i.e., the C—OH bond) to the total amount of all the bonds, the ratio being determined by the C1s XPS analysis, in the carbon material-containing material falls within the ranges, the carbon material-containing material can be said to be a carbon material-containing material having a more precisely controlled structure.

(4) An aspect in which the ratio of the total amount of all the carbon-oxygen bonds, that is, the C—O bonds (including the alcohol-derived C—O bond, the ether-derived C—O bond, and the epoxy-derived C—O bond) and the C═O bonds (including the carbonyl-derived C═O bond, the carboxyl-derived C═O bond, the ester-derived C═O bond, and the lactone-derived C═O bond) to the total amount of all the bonds, that is, the C—C bond, the C═C bond, the C—H bond, the C—O bonds, and the C═O bonds, the ratio being determined by C1s XPS analysis, falls within the ranges described in the aspect (1), and the ratio of the total amount of the ether-derived C—O bond (i.e., the C—O—C bond) and the alcohol-derived C—O bond (i.e., the C—OH bond) to the total amount of all the carbon-oxygen bonds, that is, the C—O bonds (including the alcohol-derived C—O bond, the ether-derived C—O bond, and the epoxy-derived C—O bond) and the C═O bonds (including the carbonyl-derived C═O bond, the carboxyl-derived C═O bond, the ester-derived C═O bond, and the lactone-derived C═O bond), the ratio being determined by the C1s XPS analysis, falls within the ranges described in the aspect (2). According to such aspect, the solubility of the carbon material portion of the carbon material-containing material can be further improved, and the structure control ratio of the carbon material portion can be further improved. In addition, according to such aspect, the structure of the carbon material-containing material can be even more precisely controlled.

(5) The carbon material-containing material preferably shows no peak resulting from C═O stretching vibration in the range of from 1,660 $cm^{-1}$ to 1,800 $cm^{-1}$ in its IR analysis. When no peak resulting from the C═O stretching vibration is observed in the range of from 1,660 $cm^{-1}$ to 1,800 $cm^{-1}$ in the IR analysis of the carbon material-containing material, the structure of the carbon material-containing material can be more precisely controlled. The reason why the structure of the carbon material-containing material can be more precisely controlled when no peak resulting from the C═O stretching vibration is observed in the range of from 1,660 $cm^{-1}$ to 1,800 $cm^{-1}$ in the IR analysis of the carbon material-containing material is as described in the foregoing.

(6) The carbon material in the carbon material-containing material is soluble in a solvent.

An example of the aromatic compound that produces CO and/or $CO_2$ by being heated is an aromatic compound having a "—C(═O)—" and/or "—O—C(═O)—" structure (e.g., an aromatic ketone derivative, an aromatic ester derivative, or an acid anhydride).

Examples of the aromatic compound that produces CO and/or $CO_2$ by being heated include the following compounds.

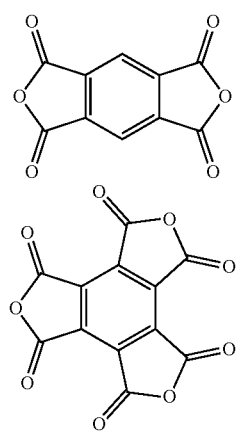

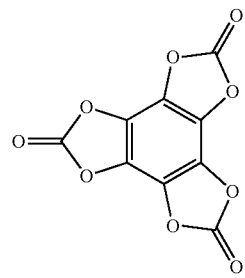

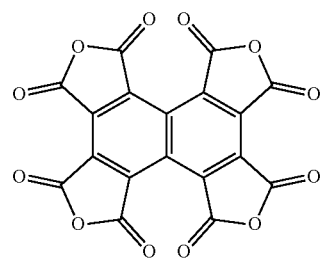

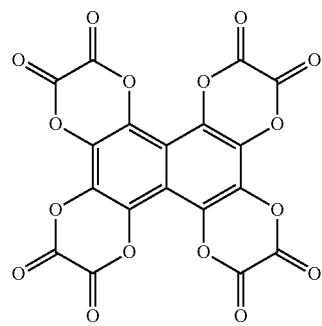

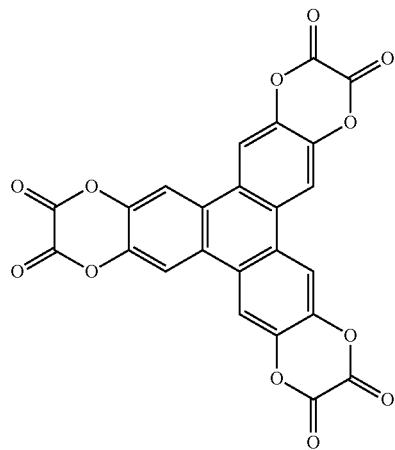

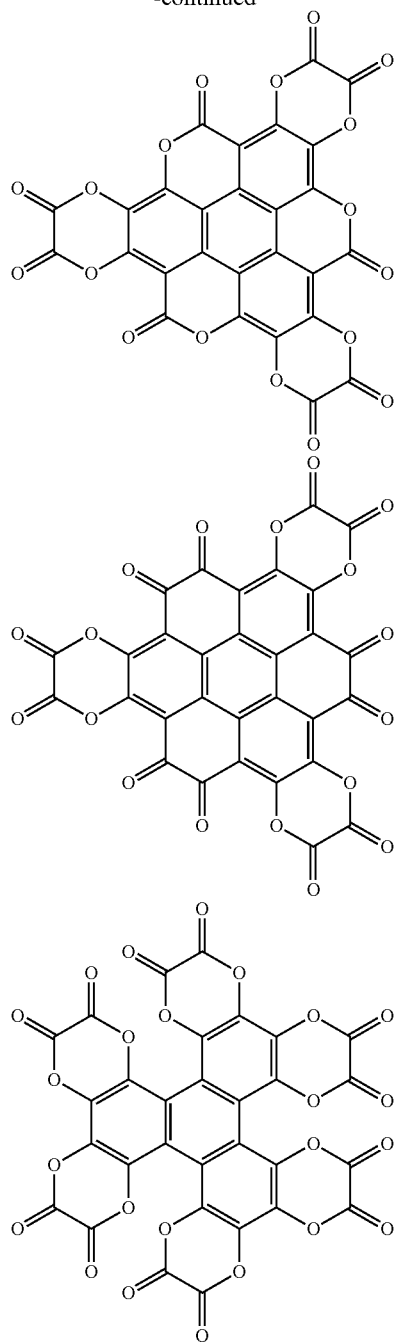

An example of the aromatic compound that produces $N_2$ by being heated is an aromatic compound having an "—NH—NH—" structure, an "—N=N—" structure, or an "—$N_3$" structure (e.g., an aromatic azo compound, an aromatic azide compound, a triazole-substituted aromatic compound, a tetrazole-substituted aromatic compound, triazine or a derivative thereof, tetrazine or a derivative thereof, or an aromatic hydrazine derivative).

Examples of the aromatic compound that produces $N_2$ by being heated include the following compounds. In the following compounds, R represents a hydrogen atom, or an alkyl group, an aryl group, or a heteroaryl group that may have a substituent.

An example of the aromatic compound that produces $O_2$ by being heated is an aromatic compound having an "—O—O—" structure (e.g., an aromatic carbon oxide or an aromatic peroxide).

Examples of the aromatic compound that produces $O_2$ by being heated include the following compounds. In the following compounds, R represents a hydrogen atom, or an alkyl group, an aryl group, or a heteroaryl group that may have a substituent.

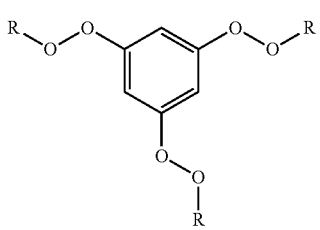

An example of the aromatic compound that produces $H_2$ by being heated is a fused polycyclic aromatic compound having a "—$CH_2$—" structure (e.g., a phenalene-based compound).

Examples of the aromatic compound that produces $H_2$ by being heated include the following compounds.

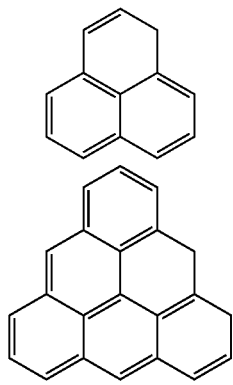

An example of the aromatic compound that produces $NO_2$ by being heated is an aromatic compound having an "—$NO_2$" structure (e.g., an aromatic nitro compound).

An example of the aromatic compound that produces $NO_2$ by being heated is the following compound.

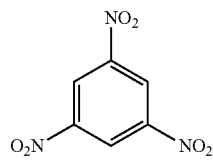

The aromatic compound that is decomposed by heating to produce the radical on the aromatic ring is the following compound: the compound has thermal decomposability, and a gas molecule (preferably at least one kind selected from CO, $CO_2$, $N_2$, $O_2$, $H_2$, and $NO_2$) is produced by the dissociation and decomposition of at least part of its skeleton, while the radical is produced on the remaining aromatic ring. When such aromatic compound is used, a reaction is caused by its own decomposition alone without any need for a reaction catalyst. Accordingly, a by-product of the chemical reaction and the reaction catalyst can be suppressed from existing in the carbon material to serve as fatal impurities, and hence a carbon material having higher quality can be obtained. In addition, when such aromatic compound is used, the carbon material can be obtained under a relatively mild temperature environment without use of any combustible gas. In addition, such aromatic compound may have such high reactivity as to require no catalytic action.

Typical Embodiment (Second Embodiment) of Compound (A)

A typical embodiment (second embodiment) of the compound (A) is such a compound that one neutral molecule is formed from two or more kinds of groups by their condensation reaction, and is desorbed. In the second embodiment, a case in which one compound has two or more kinds of groups is permitted, and a case in which the respective groups of two or more compounds are combined to provide two or more kinds of groups is also permitted. Such compound (A) may cause the condensation reaction between the same molecules and/or between different molecules to be turned into a carbon material.

Any appropriate condensation reaction may be adopted as the condensation reaction to the extent that the effects of the present invention are not impaired as long as the condensation reaction is caused by the formation of one neutral molecule from two or more kinds of groups, and the desorption thereof. When such condensation reaction is adopted, the reaction can be performed at relatively low temperature. Such condensation reaction may be, for example:

(a) a condensation reaction caused by formation of $H_2O$ from a —H group and a —OH group, and desorption thereof;

(b) a condensation reaction caused by formation of ROH from a —H group and an —OR group where R represents any appropriate substituted or unsubstituted alkyl group, and desorption thereof;

(c) a condensation reaction caused by formation of HX from a —H group and an —X group where X represents a halogen or CN, and desorption thereof;

(d) a condensation reaction caused by formation of $NH_3$ from a —H group and an —$NH_2$ group, and desorption thereof;

(e) a condensation reaction caused by formation of $RNH_2$ from a —H group and an —NHR group where R represents any appropriate substituted or unsubstituted alkyl group, and desorption thereof;

(f) a condensation reaction caused by formation of $R^1R^2NH$ from a —H group and an —$NR^1R^2$ group where $R^1$ and $R^2$ each represent any appropriate substituted or unsubstituted alkyl group, and desorption thereof;

(g) a condensation reaction caused by formation of $H_2S$ from a —H group and a —SH group, and desorption thereof;

(h) a condensation reaction caused by formation of RSH from a —H group and an —SR group where R represents any appropriate substituted or unsubstituted alkyl group, and desorption thereof;

(i) a condensation reaction caused by formation of RCOOH from a —H group and an —OOCR group where R represents any appropriate substituted or unsubstituted alkyl group, and desorption thereof;

(j) a condensation reaction caused by formation of $H_2SO_3$ from a —H group and an —OSO(OH) group, and desorption thereof; (k) a condensation reaction caused by formation of $RSO_2(OH)$ from a —H group and an —$OSO_2R$ group where R represents any appropriate substituted or unsubstituted alkyl group, and desorption thereof;

(l) a condensation reaction caused by formation of $ROSO_3H$ from a —H group and an —$OSO_2(OR)$ group where R represents any appropriate substituted or unsubstituted alkyl group, and desorption thereof; or (m) a condensation reaction caused by formation of $H_2SO_4$ from a —H group and an —$OSO_2(OH)$ group, and desorption thereof.

In particular, when the desorbed neutral component is a gas component at the desorption temperature (calcination temperature), the component is present in a vapor phase portion without being incorporated into the carbon material, and hence hardly serves as an impurity.

In the case of, in particular, any one of the following condensation reactions out of the above-mentioned condensation reactions, the carbon material-containing material to be obtained preferably has, in particular, at least one kind of aspect selected from the group consisting of the following aspects (1) to (6):

(a) the condensation reaction caused by the formation of $H_2O$ from a —H group and a —OH group, and the desorption thereof;

(b) the condensation reaction caused by the formation of ROH from a —H group and an —OR group (where R represents any appropriate substituted or unsubstituted alkyl group), and the desorption thereof; and (i) the condensation reaction caused by the formation of RCOOH from a —H group and an —OOCR group (where R represents any appropriate substituted or unsubstituted alkyl group), and the desorption thereof.

(1) The ratio of the total amount of all carbon-oxygen bonds, that is, C—O bonds (including an alcohol-derived C—O bond, an ether-derived C—O bond, and an epoxy-derived C—O bond) and C=O bonds (including a carbonyl-derived C=O bond, a carboxyl-derived C=O bond, an ester-derived C=O bond, and a lactone-derived C=O bond) to the total amount of all bonds, that is, a C—C bond, a C=C bond, a C—H bond, the C—O bonds, and the C=O bonds, the ratio being determined by C1s XPS analysis, is preferably 10% or more, more preferably 20% or more, still more preferably 25% or more, and the upper limit of the ratio is preferably 35% or less. When the ratio of the total amount of the C—O bonds and the C=O bonds to the total amount of the C—C bond, the C=C bond, the C—H bond, the C—O bonds, and the C=O bonds, the ratio being determined by the C1s XPS analysis, in the carbon material-containing material falls within the ranges, the carbon material-containing material may be a novel carbon material-containing material having various physical properties, such as solubility, unlike a simple carbon material that has heretofore been known.

(2) The ratio of the total amount of the ether-derived C—O bond (i.e., a C—O—C bond) and the alcohol-derived C—O bond (i.e., a C—OH bond) to the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, is preferably 50% or more, more preferably 60% or more, still more preferably 65% or more, particularly preferably 70% or more, most preferably 75% or more. The upper limit of the ratio is preferably 90% or less. When the ratio of the total amount of the ether-derived C—O bond and the alcohol-derived C—O bond to the total amount of the C—O bonds and the C=O bonds, the ratio being determined by the C1s XPS analysis, in the carbon material-containing material falls within the ranges, the structure control ratio of the carbon material portion of the carbon material-containing material can be improved, and the structure thereof can be more precisely controlled.

That is, as the ratio of a C=O bond derived from the decomposition reaction of the carbon material becomes larger, the decomposition reaction is suppressed, and hence such carbon material-containing material can be said to be a carbon material-containing material having a more precisely controlled structure.

(3) The ratio of the total amount of the ether-derived C—O bond (i.e., the C—O—C bond) and the alcohol-derived C—O bond (i.e., the C—OH bond) to the total amount of all the bonds, that is, the C—C bond, the C=C bond, the C—H bond, the C—O bonds (including the alcohol-derived C—O bond, the ether-derived C—O bond, and the epoxy-derived C—O bond), and the C=O bonds (including the carbonyl-derived C=O bond, the carboxyl-derived C=O bond, the ester-derived C=O bond, and the lactone-derived C=O bond), the ratio being determined by the C1s XPS analysis, is preferably 15% or more, more preferably 17% or more, still more preferably 20% or more. The upper limit of the ratio is preferably 30% or less. When the ratio of the total amount of the ether-derived C—O bond (i.e., the C—O—C bond) and the alcohol-derived C—O bond (i.e., the C—OH bond) to the total amount of all the bonds, the ratio being determined by the C1s XPS analysis, in the carbon material-containing material falls within the ranges, the carbon material-containing material can be said to be a carbon material-containing material having a more precisely controlled structure.

(4) An aspect in which the ratio of the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond) to the total amount of all the bonds, that is, the C—C bond, the C=C bond, the C—H bond, the C—O bonds, and the C=O bonds, the ratio being determined by C1s XPS analysis, falls within the ranges described in the aspect (1), and the ratio of the total amount of the ether-derived C—O bond (i.e., the C—O—C bond) and the alcohol-derived C—O bond (i.e., the C—OH bond) to the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, falls within the ranges described in the aspect (2). According to such aspect, the solubility of the carbon material portion of the carbon material-containing material can be further improved, and the structure control ratio of the carbon material portion can be further improved. In addition, according to such aspect, the structure of the carbon material-containing material can be even more precisely controlled.

(5) The carbon material-containing material preferably shows no peak resulting from C=O stretching vibration in the range of from 1,660 $cm^{-1}$ to 1,800 $cm^{-1}$ in its IR analysis. When no peak resulting from the C=O stretching vibration is observed in the range of from 1,660 $cm^{-1}$ to 1,800 $cm^{-1}$ in the IR analysis of the carbon material-containing material, the structure of the carbon material-containing material can be more precisely controlled. The reason why the structure of the carbon material-containing material can be more precisely controlled when no peak resulting from the C=O stretching vibration is observed in the range of from 1,660 cm$^{-1}$ to 1,800 cm$^{-1}$ in the IR analysis of the carbon material-containing material is as described in the foregoing.

(6) The carbon material in the carbon material—containing material is soluble in a solvent.

Description is given by taking the condensation reaction caused by the formation of H$_2$O from a —H group and a —OH group, and the desorption thereof (the above-mentioned condensation reaction (a)) as a typical example of the condensation reaction.

One embodiment (sometimes referred to as "embodiment (X)") of the compound (A) in the second embodiment is a compound (a1) having a skeleton formed of one carbon six-membered ring structure, or a compound (a2) having a skeleton in which two or more carbon six-membered ring structures are bonded and/or fused to each other, and —OH groups account for one half of the number of substituents that do not contribute to the structure formation of the skeleton, and —H groups account for the other half thereof.

In the embodiment (X), any one of the following two cases may be adopted:
  (i) a case in which the compound (A) is the compound (a1) having the skeleton formed of one carbon six-membered ring structure; and
  (ii) a case in which the compound (A) is the compound (a2) having the skeleton in which two or more carbon six-membered ring structures are bonded and/or fused to each other.

In the embodiment (X), the term "substituents that do not contribute to the structure formation of the skeleton" means substituents that do not contribute to the structure formation of the "skeleton formed of one carbon six-membered ring structure" in the case (i) or the "skeleton in which two or more carbon six-membered ring structures are bonded and/or fused to each other" in the case (ii). For example, as the case (i), when the compound (a1) having the skeleton formed of one carbon six-membered ring structure is represented by the chemical formula (a1-1) to be represented later, its substituents that do not contribute to the structure formation of the skeleton formed of one carbon six-membered ring structure are six —OH groups and six —H groups, and when the compound (a1) having the skeleton formed of one carbon six-membered ring structure is represented by the chemical formula (a1-2) to be represented later, its substituents that do not contribute to the structure formation of the skeleton formed of one carbon six-membered ring structure are three —OH groups and three —H groups. In addition, for example, as the case (ii), when the compound (a2) having the skeleton in which two or more carbon six-membered ring structures are bonded and/or fused to each other is represented by the chemical formula (a2-1) to be represented later, its substituents that do not contribute to the structure formation of the skeleton in which two or more carbon six-membered ring structures are bonded and/or fused to each other are six —OH groups and six —H groups.

In the embodiment (X), —OH groups account for one half of the number of the substituents that do not contribute to the structure formation of the skeleton of the compound (a1) having the skeleton formed of one carbon six-membered ring structure, and —H groups account for the other half thereof. In addition, —OH groups account for one half of the number of the substituents that do not contribute to the structure formation of the skeleton of the compound (a2) having the skeleton in which two or more carbon six-membered ring structures are bonded and/or fused to each other, and —H groups account for the other half thereof.

When the compound (A) has such substituent configuration, the compound may effectively cause a dehydration reaction between the same molecules and/or between different molecules by being heated.

Any appropriate compound may be adopted as the compound (A) that may be adopted in the embodiment (X) to the extent that the effects of the present invention are not impaired as long as the compound is the compound (a1) having the skeleton formed of one carbon six-membered ring structure or the compound (a2) having the skeleton in which two or more carbon six-membered ring structures are bonded and/or fused to each other, and —OH groups account for one half of the number of the substituents that do not contribute to the structure formation of the skeleton, and —H groups account for the other half thereof. Examples of such compound (A) include the following compounds.

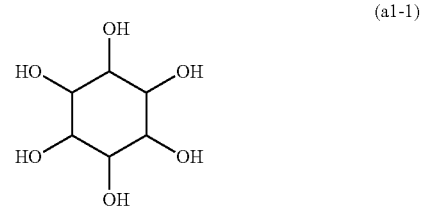

(a1-1)

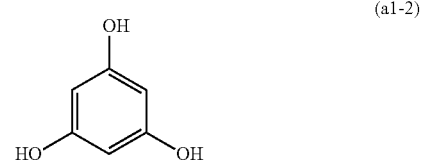

(a1-2)

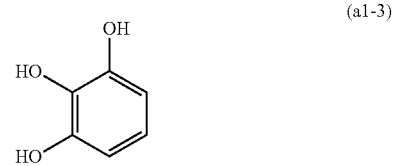

(a1-3)

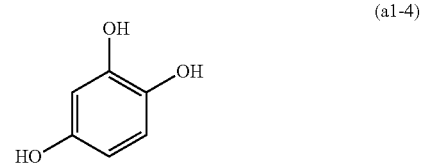

(a1-4)

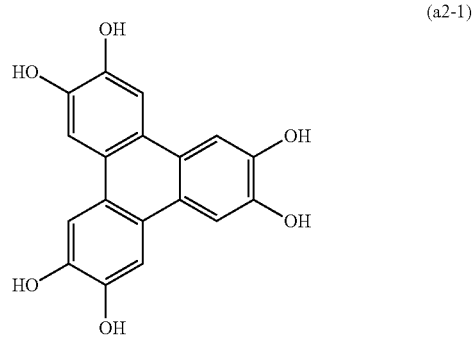

(a2-1)

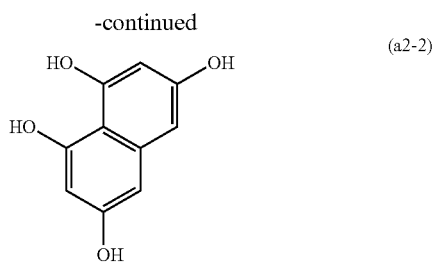
(a2-2)

Of the compounds (A) that may be adopted in the embodiment (X), phloroglucinol (compound (a1-2)) or hexahydroxytriphenylene (HHTP) (compound (a2-1)) is preferred because the condensation reaction caused by the formation of $H_2O$ from a —H group and a —OH group, and the desorption thereof is assumed to easily occur, and because the reaction is assumed to easily proceed at low temperature.

Another embodiment (sometimes referred to as "embodiment (Y)") of the compound (A) in the second embodiment is two or more kinds selected from the compound (a1) having the skeleton formed of one carbon six-membered ring structure, and/or the compound (a2) having the skeleton in which two or more carbon six-membered ring structures are bonded and/or fused to each other, and —OH groups account for one half of the total of the number of the substituents that do not contribute to the structure formation of the skeleton of the compound (a1) and the number of the substituents that do not contribute to the structure formation of the skeleton of the compound (a2), and —H groups account for the other half thereof.

In the embodiment (Y), any one of the following three cases may be adopted:
(i) a case in which the compound (A) is formed of two or more kinds selected from the compounds (a1) each having the skeleton formed of one carbon six-membered ring structure;
(ii) a case in which the compound (A) is formed of two or more kinds selected from the compounds (a2) each having the skeleton in which two or more carbon six-membered ring structures are bonded and/or fused to each other; and
(iii) a case in which the compound (A) is formed of one or more kinds selected from the compounds (a1) each having the skeleton formed of one carbon six-membered ring structure, and one or more kinds selected from the compounds (a2) each having the skeleton in which two or more carbon six-membered ring structures are bonded and/or fused to each other.

In the embodiment (Y), the term "total of the number of the substituents that do not contribute to the structure formation of the skeleton of the compound (a1) and the number of the substituents that do not contribute to the structure formation of the skeleton of the compound (a2)" has the following meaning. That is, in the case (i), the term means a number obtained by totalizing the number of the substituents that do not contribute to the structure formation of the "skeleton formed of one carbon six-membered ring structure" in each of the two or more kinds of compounds (a1). In the case (ii), the term means a number obtained by totalizing the number of the substituents that do not contribute to the structure formation of the "skeleton in which two or more carbon six-membered ring structures are bonded and/or fused to each other" in each of the two or more kinds of compounds (a2). In the case (iii), the term means a number obtained by totalizing the number of the substituents that do not contribute to the structure formation of the "skeleton formed of one carbon six-membered ring structure" in each of the one or more kinds of compounds (a1) and the number of the substituents that do not contribute to the structure formation of the "skeleton in which two or more carbon six-membered ring structures are bonded and/or fused to each other" in each of the one or more kinds of compounds (a2).

In the embodiment (Y), for example, as the case (i), when the two or more kinds of compounds (a1) are represented by the following chemical formula (a1-5) and the following chemical formula (a1-6), the substituents that do not contribute to the structure formation of the skeleton formed of one carbon six-membered ring structure in the compound represented by the chemical formula (a1-5) are two —OH groups and four —H groups, and the substituents that do not contribute to the structure formation of the skeleton formed of one carbon six-membered ring structure in the compound represented by the chemical formula (a1-6) are four —OH groups and two —H groups. Accordingly, the total of the substituents is as follows: six —OH groups and six —H groups. In addition, for example, as the case (iii), when the one or more kinds of compounds (a1) are represented by the following chemical formula (a1-5) and the following chemical formula (a1-7), and the one or more kinds of compounds (a2) are each represented by the following chemical formula (a2-3), the substituents that do not contribute to the structure formation of the skeleton formed of one carbon six-membered ring structure in the compound represented by the chemical formula (a1-5) are two —OH groups and four —H groups, the substituents that do not contribute to the structure formation of the skeleton formed of one carbon six-membered ring structure in the compound represented by the chemical formula (a1-7) are six —OH groups, and the substituents that do not contribute to the structure formation of the skeleton in which two or more carbon six-membered ring structures are bonded and/or fused to each other in the compound represented by the chemical formula (a2-3) are two —OH groups and six —H groups.

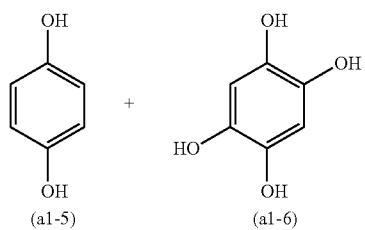 [SMILES: Oc1ccc(O)cc1 ; Oc1cc(O)c(O)cc1O]

(a1-5)   +   (a1-6)

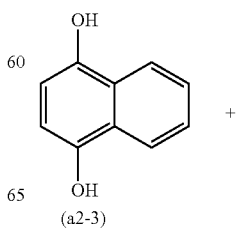

+

(a2-3)

-continued

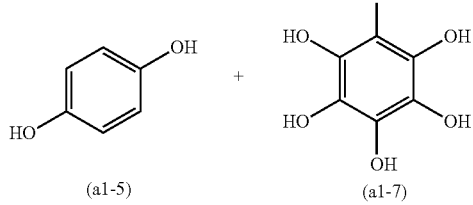

(a1-5)  (a1-7)

When such compound (A) is used, a reaction is caused by its own dehydration reaction without any need for a reaction catalyst. Accordingly, a by-product of the chemical reaction and the reaction catalyst can be suppressed from existing in the carbon material to serve as fatal impurities, and hence a carbon material having higher quality can be obtained. In addition, when such compound (A) is used, the carbon material can be obtained under a relatively mild temperature environment without use of any combustible gas. In addition, such compound (A) may have such high reactivity as to require no catalytic action.

A preferred embodiment of the compound (A) in the second embodiment is, for example, a compound having three or more phenolic hydroxyl groups in a molecule thereof.

Any appropriate compound having three or more phenolic hydroxyl groups in a molecule thereof may be adopted as the compound having three or more phenolic hydroxyl groups in a molecule thereof to the extent that the effects of the present invention are not impaired.

In the compound having three or more phenolic hydroxyl groups in a molecule thereof, an aromatic ring to which the phenolic hydroxyl groups are bonded is preferably a hydrocarbon aromatic ring. Even when the aromatic ring to which the phenolic hydroxyl groups are bonded is a heteroaromatic ring, the effects of the present invention may be exhibited. However, the hydrocarbon aromatic ring having a more stable ring structure may make the carbon material to be obtained more stable. The heteroaromatic ring means an aromatic ring whose ring structure includes carbon and an element except carbon unlike the hydrocarbon aromatic ring whose ring structure includes carbon.

The compound having three or more phenolic hydroxyl groups in a molecule thereof may have a substituent except the phenolic hydroxyl groups. Any appropriate substituent may be adopted as such substituent to the extent that the effects of the present invention are not impaired. Such substituent is preferably a hydroxyl group alone because the effects of the present invention are further improved. Even when a substituent except a hydroxyl group is present, the effects of the present invention may be exhibited. However, when no substituent other than a hydroxyl group is present, a side reaction is easily prevented, and hence the compound is more easily turned into a carbon material. The "hydroxyl group" as used herein serving as a substituent except the phenolic hydroxyl groups means a hydroxyl group that is not phenolic. As a matter of course, the term "substituent" refers to a group that substitutes a hydrogen group (—H).

Any appropriate element may be adopted as an element for forming the compound having three or more phenolic hydroxyl groups in a molecule thereof to the extent that the effects of the present invention are not impaired. Such elements are preferably carbon, oxygen, and hydrogen alone because the effects of the present invention are improved. Even when an element except carbon, oxygen, and hydrogen is present, the effects of the present invention may be exhibited. However, when no element other than carbon, oxygen, and hydrogen is present, a side reaction is easily prevented, and hence the compound is more easily turned into a carbon material.

The condensation reaction temperature of the compound having three or more phenolic hydroxyl groups in a molecule thereof preferably falls within the range of from 200° C. to 450° C., and more preferably falls within the range of from 200° C. to 400° C. in order that the effects of the present invention may be further exhibited. Thus, the compound can be effectively turned into a carbon material.

The compounds each having three or more phenolic hydroxyl groups in a molecule thereof may be used alone or in combination thereof. Even when two or more kinds of compounds are used, the temperature at which a condensation reaction between their molecules occurs preferably falls within the above-mentioned ranges.

Examples of the compound having three or more phenolic hydroxyl groups in a molecule thereof include compounds represented by the general formulae (1) to (11).

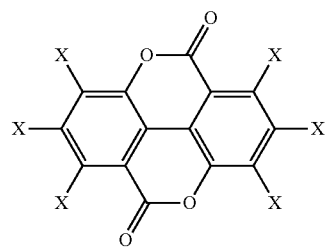

(1)

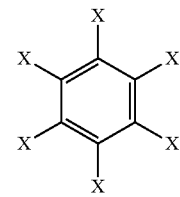

(2)

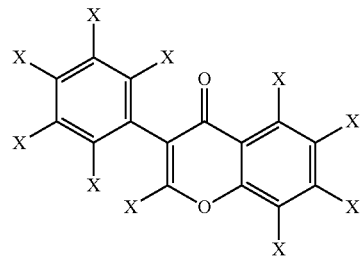

(3)

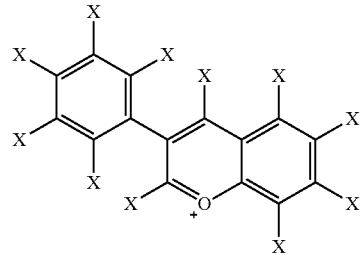

(4)

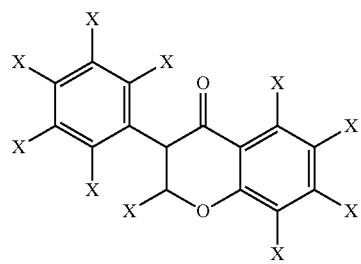
(5)

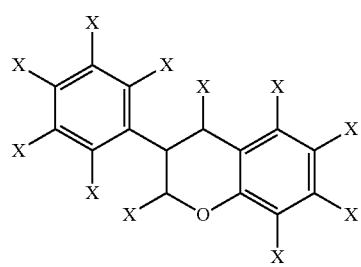
(6)

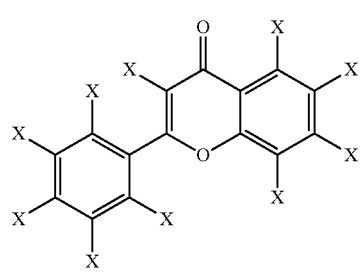
(7)

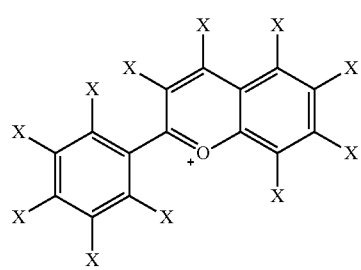
(8)

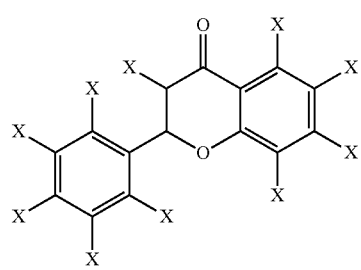
(9)

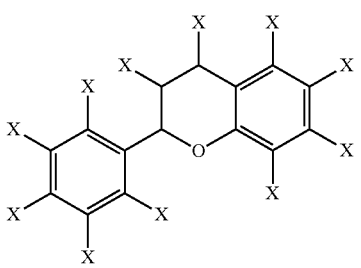
(10)

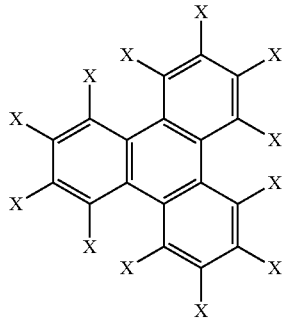
(11)

In each of the general formulae (1) to (11), X represents a hydrogen atom or a hydroxyl group, and three or more of Xs each represent a hydroxyl group (phenolic hydroxyl group).

Herein, the term "phenolic hydroxyl group" means a hydroxyl group bonded to an aromatic ring. That is, in the general formula (1), three or more of six Xs bonded to aromatic rings each represent a phenolic hydroxyl group. In the general formula (2), three or more of six Xs bonded to an aromatic ring each represent a phenolic hydroxyl group. In the general formula (3), three or more of ten Xs bonded to aromatic rings each represent a phenolic hydroxyl group. In the general formula (4), three or more of eleven Xs bonded to aromatic rings each represent a phenolic hydroxyl group. In the general formula (5), three or more of nine Xs bonded to aromatic rings each represent a phenolic hydroxyl group. In the general formula (6), three or more of nine Xs bonded to aromatic rings each represent a phenolic hydroxyl group. In the general formula (7), three or more of ten Xs bonded to aromatic rings each represent a phenolic hydroxyl group. In the general formula (8), three or more of eleven Xs bonded to aromatic rings each represent a phenolic hydroxyl group. In the general formula (9), three or more of nine Xs bonded to aromatic rings each represent a phenolic hydroxyl group. In the general formula (10), three or more of nine Xs bonded to aromatic rings each represent a phenolic hydroxyl group. In the general formula (11), three or more of twelve Xs bonded to aromatic rings each represent a phenolic hydroxyl group.

Of the compounds each having three or more phenolic hydroxyl groups in a molecule thereof, phloroglucinol or hexahydroxytriphenylene is preferred because the condensation reaction caused by the formation of $H_2O$ from a —H group and a —OH group, and the desorption thereof is assumed to easily occur, and because the reaction is assumed to easily proceed, and phloroglucinol is more preferred.

Typical Embodiment (Third Embodiment) of Compound (A)

A typical embodiment (third embodiment) of the compound (A) is an embodiment in which both of the first embodiment and the second embodiment are simultaneously adopted. That is, the third embodiment is an aromatic compound that is decomposed by heating to produce a radical on an aromatic ring thereof, and is such a compound that one neutral molecule is formed from two or more kinds of groups by their condensation reaction, and is desorbed. Such compound (A) may cause the condensation reaction between the same molecules and/or between different molecules to be turned into a carbon material.

A specific structure of the third embodiment is, for example, a compound (a3-1). A carbon dioxide molecule is desorbed from the compound (a3-1) by its heating to produce a radical (reaction active site) on an aromatic ring thereof. In addition, a hydroxyl group and a hydrogen group undergo dehydration between the molecules of the compound to cause a condensation reaction.

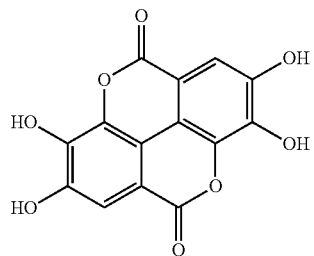

(a3-1)

When such compound (A) is used, a reaction is caused by its own dehydration reaction without any need for a reaction catalyst. Accordingly, a by-product of the chemical reaction and the reaction catalyst can be suppressed from existing in the carbon material to serve as fatal impurities, and hence a carbon material having higher quality can be obtained. In addition, when such compound (A) is used, the carbon material can be obtained under a relatively mild temperature environment without use of any combustible gas. In addition, such compound (A) may have such high reactivity as to require no catalytic action.

<<1-2. Inorganic Matter>>

Any appropriate inorganic matter may be adopted as the inorganic matter to the extent that the effects of the present invention are not impaired. For example, a particulate inorganic matter (inorganic matter particles) or a nonparticulate inorganic matter (e.g., a fibrous inorganic matter or a thin film-shaped inorganic matter) may be adopted as such inorganic matter. The inorganic matter is preferably the particulate inorganic matter (inorganic matter particles).

The inorganic matters may be used alone or in combination thereof.

The inorganic matter is preferably, for example, at least one kind selected from the group consisting of an inorganic oxide, an inorganic nitride, an inorganic sulfide, an inorganic carbide, and an insoluble salt.

A metal that is partially oxidized, or preferably, a metal whose surface is oxidized at least partially is also included in examples of the "inorganic oxide" as used in the present invention. This is because part of a metal, or preferably, at least part of the surface thereof is generally oxidized as described later. Such metal is preferably a metal that is easily oxidized, such as magnesium (Mg), calcium (Ca), strontium (Sr), barium (Ba), titanium (Ti), zirconium (Zr), hafnium (Hf), vanadium (V), niobium (Nb), tantalum (Ta), chromium (Cr), molybdenum (Mo), tungsten (W), manganese (Mn), indium (In), gallium (Ga), iron (Fe), cobalt (Co), nickel (Ni), copper (Cu), zinc (Zn), cadmium (Cd), aluminum (Al), tin (Sn), lanthanum (La), yttrium (Y), cerium (Ce), or silicon (Si), more preferably copper (Cu), aluminum (Al), or silicon (Si). That is, any such metal is easily oxidized, and hence part of the metal, or preferably, at least part of the surface thereof is oxidized. Accordingly, the metal is included in the category of the "inorganic oxide" as used in the present invention.

Specific examples of the "inorganic oxide" as used in the present invention include silica, alumina, titania, a polyacid, a metal that is partially oxidized (preferably a metal whose surface is oxidized at least partially), a composite oxide, and a solid solution oxide. That is, the "inorganic oxide" as used in the present invention may be an oxide including one kind of metal element, may be a composite oxide including two or more kinds of metal elements, or may be a so-called solid solution oxide in which a dissimilar element is further solid-dissolved in the oxide including one kind of metal element (also referred to as "single-metal oxide") or the composite oxide. The dissimilar element in the solid solution oxide may be a metal element, or may be a nonmetal element except oxygen, such as nitrogen or fluorine.

The inorganic oxides may be used alone or in combination thereof. An example in which two or more kinds of inorganic oxides are adopted is, for example, a case in which the two or more kinds of inorganic oxides are merely used in combination (e.g., mixed), or a case in which the two or more kinds of inorganic oxides are bound to each other.

Examples of the "oxide including one kind of metal element" include magnesium oxide, calcium oxide, strontium oxide, barium oxide, titanium oxide, zirconium oxide, hafnium oxide, vanadium oxide, niobium oxide, tantalum oxide, chromium oxide, molybdenum oxide, tungsten oxide, manganese oxide, indium oxide, gallium oxide, iron oxide, cobalt oxide, nickel oxide, copper oxide, zinc oxide, cadmium oxide, aluminum oxide, tin oxide, lanthanum oxide, yttrium oxide, cerium oxide, and silicon oxide. Of those, magnesium oxide, titanium oxide (titania), aluminum oxide (alumina), and silicon oxide (silica) are preferred.

Any appropriate composite oxide may be adopted as the above-mentioned "composite oxide including two or more kinds of metal elements" to the extent that the effects of the present invention are not impaired. Such composite oxide is typically an oxide containing two or more kinds of metals, and examples thereof include a complex oxide of a perovskite structure and a complex oxide of a spinel structure.

The complex oxide of a perovskite structure is typically an oxide represented by $ABO_3$ (A and B represent elements different from each other), and examples thereof include perovskite ($CaTiO_3$), barium titanate ($BaTiO_3$), strontium titanate ($SrTiO_3$), lead titanate zirconate ($Pb(Zr,Ti)O_3$), barium zirconate ($BaZrO_3$), and lithium niobate ($LiNbO_3$).

Examples of the complex oxide of a spinel structure include spinel ($MgAl_2O_4$), lithium titanate ($LiTi_2O_4$), and chrysoberyl ($BeAl_2O_4$).

Any appropriate solid solution oxide may be adopted as the above-mentioned "solid solution oxide" to the extent that the effects of the present invention are not impaired. Such solid solution oxide is typically a product obtained by solid-dissolving a dissimilar metal element and/or a nonmetal element except oxygen, such as nitrogen or fluorine, in the single-metal oxide or the composite oxide.

The shape of the "inorganic oxide" as used in the present invention is not limited (i.e., for example, the oxide may be inorganic oxide particles or may be a nonparticulate inorganic oxide). An embodiment that is entirely the inorganic oxide is permitted, and an embodiment that is partially the inorganic oxide is also permitted. The embodiment that is partially the inorganic oxide is preferably an embodiment having the inorganic oxide on its surface.

The shape of the embodiment that is partially the inorganic oxide (preferably the embodiment having the inorganic oxide on its surface) is not limited, and an example thereof is a metal that is partially oxidized (preferably a metal whose surface is oxidized at least partially). Part of the metal (preferably at least part of the surface thereof) may be oxidized in the presence of oxygen. Therefore, the shape of the "embodiment having the inorganic oxide on its surface" that is one embodiment of the inorganic oxide as used in the present invention is not limited, and the metal whose surface is oxidized at least partially is included in the category thereof.

In the case where inorganic oxide particles are used as the inorganic oxide, a massive carbon material-containing material containing many inorganic oxide particles may be typically obtained through the heating step (I) of heating the composition containing the compound (A) and the inorganic oxide (in this case, a particulate carbon material-containing material may be capable of being obtained by shredding or the like). However, the particulate carbon material-containing material may be obtained through the heating step (I) of heating the composition containing the compound (A) and the inorganic oxide by adjusting the blending ratio between the compound (A) and the inorganic oxide.

When a fibrous inorganic oxide is used as the inorganic oxide, for example, fibrous core-shell fibers may be obtained instead of core-shell particles to be described later. In addition, when the fibrous inorganic oxide is used, for example, a tubular hollow carbon material may be obtained instead of hollow carbon fine particles to be described later.

When a thin film-shaped inorganic oxide is used as the inorganic oxide, for example, a laminated carbon material-containing material may be obtained through the heating step (I) of heating the composition containing the compound (A) and the inorganic oxide. In addition, for example, various thin film-shaped carbon materials may be obtained by further subjecting such laminated carbon material-containing material to, for example, a heating step (II), a carbon material-removing step, or an inorganic oxide-removing step to be described later.

The decomposition temperature of the inorganic oxide is preferably 800° C. or more, more preferably 850° C. or more, still more preferably 900° C. or more, particularly preferably 950° C. or more because the effects of the present invention can be further expressed.

In the present invention, the inorganic oxide is preferably the inorganic oxide particles because the effects of the present invention can be further expressed.

The "inorganic oxide particles" as used herein are preferably particles that are entirely the inorganic oxide, or particles that are partially the inorganic oxide. The particles that are partially the inorganic oxide are preferably particles each having the inorganic oxide on its surface. The "inorganic oxide particles" as used herein are more preferably the particles that are entirely the inorganic oxide.

The particles that are partially the inorganic oxide (preferably the particles each having the inorganic oxide on its surface) are, for example, metal particles that are partially oxidized (preferably metal particles whose surfaces are oxidized at least partially). Part of the metal particles (preferably at least part of the surfaces thereof) may be oxidized in the presence of oxygen. Therefore, the metal particles whose surfaces are oxidized at least partially are included in the category of the "particles each having the inorganic oxide on its surface" that are one embodiment of the inorganic oxide particles as used in the present invention.

The inorganic oxide particles except the metal particles (e.g., silica particles, alumina particles, and titania particles) may be not only the particles that are entirely the inorganic oxide but also the particles that are partially the inorganic oxide (preferably the particles each having the inorganic oxide on its surface). That is, for example, when the silica particles are taken as an example, the silica particles may be not only particles that are entirely silica but also particles that are partially silica (preferably particles each having silica on its surface).

The average particle diameter of the inorganic oxide particles may be appropriately set in accordance with purposes. The average particle diameter of the inorganic oxide particles is preferably from 0.01 μm to 100 μm, particularly preferably from 0.1 μm to 10 μm because the effects of the present invention can be further expressed.

The average particle diameter of the inorganic oxide particles is an average particle diameter in a particle size distribution on a volume basis, and is preferably measured by a laser diffraction scattering method.

The inorganic oxide particles are preferably inorganic oxide particles each having a functional group on its surface because the effects of the present invention can be further expressed. Examples of such functional group include: a hydroxylic functional group, such as M-OH; an oxygen functional group containing an etheric functional group, such as M-O-M; a nitrogen functional group containing an aminic functional group, such as $M-NH_2$ or M-NH-M; a sulfur functional group containing a thiolic functional group, such as M-SH or M-S-M; and other functional groups including a silicon functional group, a boron functional group, and a phosphorus functional group (where M conceptually represents an object to which the functional group is bonded, and represents any appropriate object to which the functional group can be bonded, such as the inorganic oxide itself, for example, a metal element or an organic group for forming the inorganic oxide). Those functional groups may be easily formed by, for example, treating the surface of the inorganic oxide with various compounds. Of those, inorganic oxide particles each having an oxygen functional group on its surface are preferred as the inorganic oxide particles.

Figure 2:
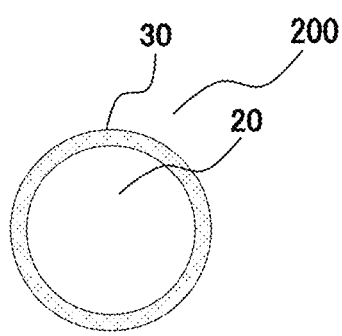
FIG. 2 is a schematic sectional view for illustrating a core-shell particle that is one example of a carbon material-containing particle that is one embodiment of the carbon material-containing material obtained by the production method of the present invention, and a core-shell particle that may be obtained from the organic-inorganic composite of the present invention.

When the inorganic oxide particles each having a functional group on its surface are adopted as the inorganic oxide, the functional group present on the surface of each of the inorganic oxide particles may form a bond with the carbon material in the carbon material-containing material. The region (carbon material bonding region) of the carbon material contributing to such bond is not the carbon material itself. That is, as illustrated in FIG. 1, an organic-inorganic composite (whose details are described later) 100 in one preferred embodiment of the carbon material-containing material is obtained by dispersing a plurality of inorganic matter particles 20 (in this case, the inorganic oxide particles) in a carbon material 10 serving as a matrix, and at an interface between the carbon material 10 and each of the inorganic matter particles 20, a carbon material region (carbon material bonding region) 30 produced by the formation of a bond between the carbon material and a functional group present on the surface of each of the inorganic matter particles 20 is present. Then, for example, when the carbon material is soluble in a solvent, the treatment of the organic-inorganic composite 100 with the solvent that dissolves the carbon material may provide a core-shell particle (core portion: the inorganic oxide particle, shell portion: the carbon material bonding region) 200 in which the surface of the inorganic matter particle 20 is coated with the carbon material bonding region (region that is not dissolved by the solvent) 30 as illustrated in FIG. 2. The removal of the inorganic matter particle 20 serving as the core portion from the core-shell particle 200 thus obtained may provide a hollow carbon fine particle having the carbon material.

The inorganic oxide particles each having a functional group on its surface are preferably at least one kind selected from the group consisting of silica particles, alumina particles, titania particles, magnesium oxide particles, polyacid particles, metal particles whose surfaces are oxidized at least partially, composite oxide particles, and solid solution oxide particles. When at least one kind selected from the group consisting of the silica particles, the alumina particles, the titania particles, the magnesium oxide particles, the polyacid particles, the metal particles whose surfaces are oxidized at least partially, the composite oxide particles, and the solid solution oxide particles is adopted as the inorganic oxide particles each having a functional group on its surface, the functional group present on the surface of each of the inorganic oxide particles can further form a bond with the carbon material.

The inorganic oxide particles each having a functional group on its surface are more preferably the polyacid particles. A polyacid for forming the polyacid particles is, for example, an isopolyacid or a heteropolyacid. As described in the foregoing, when the compound (A) is used, the carbon material-containing material can be obtained without utilization of any catalytic effect. In particular, however, when the polyacid particles are adopted as the inorganic oxide particles each having a functional group on its surface, a strongly acidic catalytic effect and the presence of the surface functional group are coupled with each other. Thus, in the case where the compound is turned into a carbon material-containing material, a dehydration condensation reaction between its molecules is accelerated to increase the ratio of the total amount of a —OH group and an —O— group to the total amount of C—O bonds. Thus, the carbon material-containing material may have a high structure control ratio.

As the isopolyacid, any appropriate isopolyacid may be adopted to the extent that the effects of the present invention are not impaired. Examples of such isopolyacid include an inorganic acid mainly formed of an inorganic element, such as molybdenum, vanadium, tungsten, niobium, titanium, tantalum, chromium, manganese, rhenium, iron, ruthenium, cobalt, nickel, palladium, platinum, copper, silver, gold, tin, titanium, zirconium, rhodium, iridium, osmium, or zinc, and salts thereof. Typical examples thereof include molybdic acid, vanadic acid, tungstic acid, niobic acid, titanic acid, and tantalic acid.

As the heteropolyacid, any appropriate heteropolyacid may be adopted to the extent that the effects of the present invention are not impaired. An example of such heteropolyacid is a heteropolyacid formed by introducing a heteroatom to an isopolyacid or a metal salt thereof. Examples of the heteroatom include oxygen, sulfur, phosphorus, ammonium, potassium, sodium, and silicon. The heteropolyacid may be a hydrate.

Specific examples of the heteropolyacid include a tungsten-based heteropolyacid formed by introducing a heteroatom to an isopolyacid containing tungsten, and a molybdenum-based heteropolyacid formed by introducing a heteroatom to an isopolyacid containing molybdenum.

Examples of the tungsten-based heteropolyacid include phosphotungstic acid, silicotungstic acid, cobalttungstic acid, germanotungstic acid, borotungstic acid, phosphovanadotungstic acid, and phosphotungstomolybdic acid.

Examples of the molybdenum-based heteropolyacid include phosphomolybdic acid, silicomolybdic acid, and phosphovanadomolybdic acid.

As the inorganic nitride, any appropriate inorganic nitride may be adopted to the extent that the effects of the present invention are not impaired. Examples of such inorganic nitride include boron nitride, carbon nitride, aluminum nitride, and gallium nitride. Of those, boron nitride and aluminum nitride are preferred.

The inorganic nitrides may be used alone or in combination thereof.

In the present invention, as in the inorganic oxide described in the foregoing, inorganic nitride particles are preferred as the inorganic nitride because the effects of the present invention can be further expressed.

The average particle diameter of the inorganic nitride particles may be appropriately set in accordance with purposes. The average particle diameter of the inorganic nitride particles is preferably from 0.01 μm to 100 μm, particularly preferably from 0.1 μm to 10 μm because the effects of the present invention can be further expressed.

The average particle diameter of the inorganic nitride particles is an average particle diameter in a particle size distribution on a volume basis, and is preferably measured by a laser diffraction scattering method.

The inorganic nitride particles are preferably inorganic nitride particles each having a functional group on its surface because the effects of the present invention can be further expressed. Examples of such functional group include: a hydroxylic functional group, such as M-OH; an oxygen functional group containing an etheric functional group, such as M-O-M; a nitrogen functional group containing an aminic functional group, such as M-NH$_2$ or M-NH-M; a sulfur functional group containing a thiolic functional group, such as M-SH or M-S-M; and other functional groups including a silicon functional group, a boron functional group, and a phosphorus functional group (where M conceptually represents an object to which the functional group is bonded, and represents any appropriate object to which the functional group can be bonded, such as the inorganic nitride itself, for example, a metal element or an organic group for forming the inorganic nitride). Those functional groups may be easily formed by, for example, treating the surface of the inorganic nitride with various compounds.

When the inorganic nitride particles each having a functional group on its surface are adopted as the inorganic nitride, the functional group present on the surface of each of the inorganic nitride particles may form a bond with the carbon material in the carbon material-containing material. The region (carbon material bonding region) of the carbon material contributing to such bond is not the carbon material itself. That is, as in the inorganic oxide particles each having a functional group on its surface thereof described in the foregoing, as illustrated in FIG. 1, an organic-inorganic composite (whose details are described later) 100 in one preferred embodiment of the carbon material-containing material is obtained by dispersing a plurality of inorganic matter particles 20 (in this case, the inorganic nitride particles) in a carbon material 10 serving as a matrix, and at an interface between the carbon material 10 and each of the inorganic matter particles 20, a carbon material region (carbon material bonding region) 30 produced by the formation of a bond between the carbon material and a functional group present on the surface of each of the inorganic matter particles 20 is present. Then, for example, when the carbon material is soluble in a solvent, the treatment of the organic-inorganic composite 100 with the solvent that dissolves the carbon material may provide a core-shell particle (core portion: the inorganic nitride particle, shell portion: the carbon material bonding region) 200 in which the surface of the inorganic matter particle 20 is coated with the carbon material bonding region (region that is not dissolved by the solvent) 30 as illustrated in FIG. 2. The removal of the inorganic matter particle 20 serving as the core portion from the core-shell particle 200 thus obtained may provide a hollow carbon fine particle having the carbon material.

As the inorganic sulfide, any appropriate inorganic sulfide may be adopted to the extent that the effects of the present invention are not impaired. Examples of such inorganic sulfide include copper sulfide, zinc sulfide, and cadmium sulfide.

The inorganic sulfides may be used alone or in combination thereof.

In the present invention, as in the inorganic oxide described in the foregoing, inorganic sulfide particles are preferred as the inorganic sulfide because the effects of the present invention can be further expressed.

The average particle diameter of the inorganic sulfide particles may be appropriately set in accordance with purposes. The average particle diameter of the inorganic sulfide particles is preferably from 0.01 µm to 100 µm, particularly preferably from 0.1 µm to 10 µm because the effects of the present invention can be further expressed.

The average particle diameter of the inorganic sulfide particles is an average particle diameter in a particle size distribution on a volume basis, and is preferably measured by a laser diffraction scattering method.

The inorganic sulfide particles are preferably inorganic sulfide particles each having a functional group on its surface because the effects of the present invention can be further expressed. Examples of such functional group include: a hydroxylic functional group, such as M-OH; an oxygen functional group containing an etheric functional group, such as M-O-M; a nitrogen functional group containing an aminic functional group, such as M-NH$_2$ or M-NH-M; a sulfur functional group containing a thiolic functional group, such as M-SH or M-S-M; and other functional groups including a silicon functional group, a boron functional group, and a phosphorus functional group (where M conceptually represents an object to which the functional group is bonded, and represents any appropriate object to which the functional group can be bonded, such as the inorganic sulfide itself, for example, a metal element or an organic group for forming the inorganic sulfide). Those functional groups may be easily formed by, for example, treating the surface of the inorganic sulfide with various compounds.

When the inorganic sulfide particles each having a functional group on its surface are adopted as the inorganic sulfide, the functional group present on the surface of each of the inorganic sulfide particles may form a bond with the carbon material in the carbon material-containing material. The region (carbon material bonding region) of the carbon material contributing to such bond is not the carbon material itself. That is, as in the inorganic oxide particles each having a functional group on its surface described in the foregoing, as illustrated in FIG. 1, an organic-inorganic composite (whose details are described later) 100 in one preferred embodiment of the carbon material-containing material is obtained by dispersing a plurality of inorganic matter particles 20 (in this case, the inorganic sulfide particles) in a carbon material 10 serving as a matrix, and at an interface between the carbon material 10 and each of the inorganic matter particles 20, a carbon material region (carbon material bonding region) 30 produced by the formation of a bond between the carbon material and a functional group present on the surface of each of the inorganic matter particles 20 is present. Then, for example, when the carbon material is soluble in a solvent, the treatment of the organic-inorganic composite 100 with the solvent that dissolves the carbon material may provide a core-shell particle (core portion: the inorganic sulfide particle, shell portion: the carbon material bonding region) 200 in which the surface of the inorganic matter particle 20 is coated with the carbon material bonding region (region that is not dissolved by the solvent) 30 as illustrated in FIG. 2. The removal of the inorganic matter particle 20 serving as the core portion from the core-shell particle 200 thus obtained may provide a hollow carbon fine particle having the carbon material.

As the inorganic carbide, any appropriate inorganic carbide may be adopted to the extent that the effects of the present invention are not impaired. Examples of such inorganic carbide include silicon carbide, tungsten carbide, and calcium carbide.

The inorganic carbides may be used alone or in combination thereof.

In the present invention, as in the inorganic oxide described in the foregoing, inorganic carbide particles are preferred as the inorganic carbide because the effects of the present invention can be further expressed.

The average particle diameter of the inorganic carbide particles may be appropriately set in accordance with purposes. The average particle diameter of the inorganic carbide particles is preferably from 0.01 µm to 100 µm, particularly preferably from 0.1 µm to 10 µm because the effects of the present invention can be further expressed.

The average particle diameter of the inorganic carbide particles is an average particle diameter in a particle size distribution on a volume basis, and is preferably measured by a laser diffraction scattering method.

The inorganic carbide particles are preferably inorganic carbide particles each having a functional group on its surface because the effects of the present invention can be further expressed. Examples of such functional group include: a hydroxylic functional group, such as M-OH; an oxygen functional group containing an etheric functional group, such as M-O-M; a nitrogen functional group containing an aminic functional group, such as M-NH$_2$ or M-NH-M; a sulfur functional group containing a thiolic functional group, such as M-SH or M-S-M; and other functional groups including a silicon functional group, a boron functional group, and a phosphorus functional group (where M conceptually represents an object to which the functional group is bonded, and represents any appropriate object to which the functional group can be bonded, such as the inorganic carbide itself, for example, a metal element or an organic group for forming the inorganic carbide). Those functional groups may be easily formed by, for example, treating the surface of the inorganic carbide with various compounds.

When the inorganic carbide particles each having a functional group on its surface are adopted as the inorganic carbide, the functional group present on the surface of each of the inorganic carbide particles may form a bond with the carbon material in the carbon material-containing material. The region (carbon material bonding region) of the carbon material contributing to such bond is not the carbon material itself. That is, as in the inorganic oxide particles each having a functional group on its surface described in the foregoing, as illustrated in FIG. 1, an organic-inorganic composite (whose details are described later) 100 in one preferred embodiment of the carbon material-containing material is obtained by dispersing a plurality of inorganic matter particles 20 (in this case, the inorganic carbide particles) in a carbon material 10 serving as a matrix, and at an interface between the carbon material 10 and each of the inorganic matter particles 20, a carbon material region (carbon material bonding region) 30 produced by the formation of a bond between the carbon material and a functional group present on the surface of each of the inorganic matter particles 20 is present. Then, for example, when the carbon material is soluble in a solvent, the treatment of the organic-inorganic composite 100 with the solvent that dissolves the carbon material may provide a core-shell particle (core portion: the inorganic carbide particle, shell portion: the carbon material bonding region) 200 in which the surface of the inorganic matter particle 20 is coated with the carbon material bonding region (region that is not dissolved by the solvent) 30 as illustrated in FIG. 2. The removal of the inorganic matter particle 20 serving as the core portion from the core-shell particle 200 thus obtained may provide a hollow carbon fine particle having the carbon material.

As the insoluble salt, any appropriate insoluble salt may be adopted to the extent that the effects of the present invention are not impaired. Such insoluble salt is preferably a metal-containing salt insoluble in an organic solvent. Examples thereof include metal phosphates, such as lithium iron phosphate, and metal sulfates. Of those, lithium iron phosphate is preferred.

The insoluble salts may be used alone or in combination thereof.

The insoluble salt only needs to be insoluble in a solvent to be used in the method of producing a carbon material-containing material in the embodiment of the present invention. For example, when a solvent is used in the step of mixing the compound (A) and the inorganic matter, the inorganic matter only needs to be insoluble in the solvent. In other words, an appropriate solvent that does not dissolve the inorganic matter only needs to be selected in accordance with the inorganic matter. The same holds true for a carbon material-removing step in the case where the method of producing a carbon material-containing material in the embodiment of the present invention includes the carbon material-removing step. When hollow carbon fine particles and the like are produced in the method of producing a carbon material-containing material in the embodiment of the present invention, the method preferably includes a step of dissolving the inorganic matter. However, even when the method includes such step of dissolving the inorganic matter, an inorganic matter that does not dissolve in the solvent may be selected in a step before the step. The term "insoluble salt" means that the salt can be dissolved in the solvent under a certain condition, but is insoluble in the solvent in a production method in which the effects of the present invention can be exhibited. In addition, the insoluble salt is also preferably of a particulate form, and a preferred range of its average particle diameter is the same as that of the oxide.

When at least one kind selected from the group consisting of the silica particles and the polyacid particles is adopted as the inorganic oxide particles each having a functional group on its surface, the functional group present on the surface of each of the inorganic oxide particles can further form a bond with the carbon material, and hence the carbon material-containing material to be obtained preferably has, in particular, the following aspect (4).

(4) The carbon material-containing material preferably shows no peak resulting from C=O stretching vibration in the range of from 1,660 $cm^{-1}$ to 1,800 $cm^{-1}$ in its IR analysis. When no peak resulting from the C=O stretching vibration is observed in the range of from 1,660 $cm^{-1}$ to 1,800 $cm^{-1}$ in the IR analysis of the carbon material-containing material, the structure of the carbon material-containing material can be more precisely controlled.

<<<<2. Typical Example of Method of Producing Carbon Material-Containing Material>>>>

The carbon material-containing material that may be produced by the method of producing a carbon material-containing material of the present invention comes in a wide variety of kinds, and may adopt, as its shape, any one of various shapes, such as a particulate shape and a nonparticulate shape (e.g., a fibrous shape or a thin film shape). The shape is preferably the particulate shape.

As described in the foregoing, for example, when inorganic matters of various shapes, such as a particulate inorganic matter (inorganic matter particles) and a nonparticulate inorganic matter (e.g., a fibrous inorganic matter or a thin film-shaped inorganic matter), are each adopted as the inorganic matter, a wide variety of carbon material-containing materials may be obtained in accordance with the respective shapes. The inorganic matter is preferably the particulate inorganic matter (inorganic matter particles).

In the case where the inorganic matter particles are used, a massive carbon material-containing material containing many inorganic matter particles may be typically obtained by the method of producing a carbon material-containing material of the present invention. In this case, a particulate carbon material-containing material may be capable of being obtained by shredding or the like. In addition, the particulate carbon material-containing material may be obtained by the method of producing a carbon material-containing material of the present invention through the adjustment of the blending ratio between the compound (A) and the inorganic matter.

When the fibrous inorganic matter is used, fibrous core-shell fibers may be obtained by the method of producing a carbon material-containing material of the present invention instead of core-shell particles to be described later. In addition, when the fibrous inorganic matter is used, a tubular hollow carbon material may be obtained by the method of producing a carbon material-containing material of the present invention instead of hollow carbon fine particles to be described later.

When the thin film-shaped inorganic matter is used, a laminated carbon material-containing material may be obtained by the method of producing a carbon material-containing material of the present invention. In addition, various thin film-shaped carbon materials may be obtained by further subjecting such laminated carbon material-containing material to, for example, a heating step (II), a carbon material-removing step, or an inorganic matter-removing step to be described later.

When the thickness of the carbon material portion in the carbon material-containing material that may be produced by the method of producing a carbon material-containing material of the present invention is controlled, the carbon material-containing material may be adopted in various applications. Such thickness of the carbon material portion is described by taking, for example, the following specific aspects thereof as typical examples:

(Aspect 1) the thickness of the carbon material portion in the carbon material-containing material obtained by removing, through a carbon material-removing step, the entirety of the carbon material except the carbon material that strongly interacts with the outermost surface of the inorganic matter to exist on the surface of the inorganic matter; and (Aspect 2) the thickness of the carbon material portion in the carbon material-containing material in a state in which the entirety or part of the carbon material portion of the carbon material-containing material is left.

The carbon material portion in (Aspect 1) described above is more specifically a carbon material portion strongly interacting with the outermost surface of the inorganic matter, the portion being obtained by removing, through the carbon material-removing step, the entirety of the carbon material (typically a soluble carbon material) except the carbon material that strongly interacts with the outermost surface of the inorganic matter to exist on the surface of the inorganic matter. The thickness of such carbon material portion is small, and is preferably from 0.3 nm to 10 nm, more preferably from 0.4 nm to 3 nm, though the preferred value varies depending on the structure of the carbon material. When the thickness of the carbon material portion is controlled within such ranges, a carbon component strongly interacting with the inorganic matter may be sufficiently utilized in various applications.

In (Aspect 1) described above, the thickness of the carbon material portion is typically small, but the thickness may be adjusted without any upper limit by using an appropriate carbon material-removing method.

Although the thickness of the carbon material portion in (Aspect 2) described above is typically larger than the thickness of the carbon material portion in (Aspect 1) described above, the thickness is preferably 100 µm or less, more preferably 50 µm or less, still more preferably 10 µm or less, most preferably 1 µm or less in order that its function as a carbon material film may be further exhibited. When the thickness of the carbon material portion in (Aspect 2) described above is controlled within such ranges, its function as a film can be sufficiently exhibited.

The thickness of the carbon material portion may also be appropriately controlled in accordance with the kind of a raw material compound (e.g., the compound (A)) to be used in the method of producing a carbon material-containing material and a production condition.

The thickness of such carbon material portion may be determined by various analysis methods. Examples of such analysis methods include: a method including directly observing the portion with an electron microscope (Method A); and a method including estimating a carbon amount, which is calculated by elemental analysis or thermogravimetric analysis, from the macroscopic surface area of the inorganic matter (excluding the surface area of a microstructure that an organic molecule like the present invention cannot enter) and the density of the carbon material (Method B).

(Method A) described above is more specifically, for example, a method including observing a section of the carbon material-containing material serving as a sample with a transmission electron microscope or a scanning electron microscope, preferably a transmission electron microscope or a scanning electron microscope mounted with an energy dispersive X-ray analyzer.

In (Method B) described above, the macroscopic surface area of the inorganic matter may be estimated from, for example, the shape of the carbon material-containing material serving as the sample and the shape of the inorganic matter to be incorporated thereinto.

In (Method A) described above, for example, when the sample is particles, the average thickness of the sample may be obtained as follows: the thicknesses of an individual particle in the sample are preferably measured at 3 or more sites, and their simple average is adopted as the thickness of the particle; and thicknesses are more preferably determined for 10 or more particles, and their simple average is adopted as the average thickness. The thickness (average thickness) thus obtained preferably falls, for example, within the above-mentioned desired thickness range within which the thickness of the carbon material portion is wished to be controlled.

In (Method B) described above, an analyzed thickness may be regarded as the average thickness of the sample. The thickness analyzed by this (Method B) preferably falls, for example, within the above-mentioned desired thickness range within which the thickness of the carbon material portion is wished to be controlled.

Typical embodiments of such carbon material-containing material are, for example, an organic-inorganic composite and carbon material-containing particles. Examples of the carbon material-containing particles include core-shell particles, highly carbonized core-shell particles, hollow carbon fine particles, and highly carbonized hollow carbon fine particles. A method of producing a typical and specific carbon material-containing material is described below.

<<2-1. Method of Producing Organic-Inorganic Composite>>

One embodiment of the carbon material-containing material obtained by the production method of the present invention is the organic-inorganic composite.

The organic-inorganic composite may be typically obtained through the heating step (I) of heating the composition containing the compound (A), which causes the condensation reaction between the same molecules and/or between different molecules by being heated, and the inorganic matter.

The organic-inorganic composite includes a carbon material and the inorganic matter. The carbon material may be typically produced by the heating of the compound (A), which causes the condensation reaction between the same molecules and/or between different molecules by being heated, in the composition containing the compound (A) and the inorganic matter through the heating step (I) of heating the composition.

The carbon materials may be used alone or in combination thereof. The inorganic matters may be used alone or in combination thereof. The description in the section <<1-2. Inorganic Matter>> may be incorporated for the "inorganic matter".

The content of the carbon material in the organic-inorganic composite is preferably from 0.01 wt % to 99.99 wt %, particularly preferably from 0.1 wt % to 99.9 wt % in terms of weight ratio. When the content of the carbon material in the organic-inorganic composite falls within the ranges, the organic-inorganic composite can be industrially produced under a mild condition, and hollow carbon fine particles and the like can be industrially produced by using the organic-inorganic composite as a material. Such content of the carbon material may be easily set to any appropriate ratio through, for example, various removing steps to be described later in accordance with target physical properties.

The content of the inorganic matter in the organic-inorganic composite is preferably from 0.01 wt % to 99.99 wt %, particularly preferably from 0.1 wt % to 99.9 wt % in terms of weight ratio. When the content of the inorganic matter in the organic-inorganic composite falls within the ranges, the organic-inorganic composite can be industrially produced under a mild condition, and hollow carbon fine particles and the like can be industrially produced by using the organic-inorganic composite as a material. Such content of the inorganic matter may be easily set to any appropriate ratio through, for example, various removing steps to be described later in accordance with target physical properties.

The ratio of the total amount of all carbon-oxygen bonds, that is, C—O bonds (including an alcohol-derived C—O bond, an ether-derived C—O bond, and an epoxy-derived C—O bond) and C=O bonds (including a carbonyl-derived C=O bond, a carboxyl-derived C=O bond, an ester-derived C=O bond, and a lactone-derived C=O bond) to the total amount of all bonds, that is, a C—C bond, a C=C bond, a C—H bond, the C—O bonds, and the C=O bonds, the ratio being determined by C1s XPS analysis, in the organic-inorganic composite is preferably 10% or more, more preferably 20% or more, still more preferably 25% or more. The upper limit of the ratio is preferably 35% or less. When the ratio of the total amount of the C—O bonds and the C=O bonds to the total amount of the C—C bond, the C=C bond, the C—H bond, the C—O bonds, and the C=O bonds, the ratio being determined by the C1s XPS analysis, in the organic-inorganic composite falls within the ranges, the organic-inorganic composite may be a novel carbon material-containing material having various physical properties, such as solubility, unlike a simple carbon material that has heretofore been known.

The ratio of the total amount of the ether-derived C—O bond (i.e., a C—O—C bond) and the alcohol-derived C—O bond (i.e., a C—OH bond) to the total amount of all carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, in the organic-inorganic composite is preferably 50% or more, more preferably 60% or more, still more preferably 65% or more, particularly preferably 70% or more, most preferably 75% or more. The upper limit of the ratio is preferably 90% or less. When the ratio of the total amount of the ether-derived C—O bond and the alcohol-derived C—O bond to the total amount of the C—O bonds and the C=O bonds, the ratio being determined by the C1s XPS analysis, in the organic-inorganic composite falls within the ranges, the structure control ratio of the carbon material portion of the organic-inorganic composite can be improved, and the structure thereof can be more precisely controlled. That is, as the ratio of a C=O bond derived from the decomposition reaction of the organic-inorganic composite becomes smaller, the decomposition reaction is suppressed, and hence such organic-inorganic composite can be said to be a carbon material-containing material having a more precisely controlled structure.

The ratio of the total amount of the ether-derived C—O bond (i.e., the C—O—C bond) and the alcohol-derived C—O bond (i.e., the C—OH bond) to the total amount of all the bonds, that is, the C—C bond, the C=C bond, the C—H bond, the C—O bonds (including the alcohol-derived C—O bond, the ether-derived C—O bond, and the epoxy-derived C—O bond), and the C=O bonds (including the carbonyl-derived C=O bond, the carboxyl-derived C=O bond, the ester-derived C=O bond, and the lactone-derived C=O bond), the ratio being determined by the C1s XPS analysis, in the organic-inorganic composite is preferably 15% or more, more preferably 17% or more, still more preferably 20% or more. The upper limit of the ratio is preferably 30% or less. When the ratio of the total amount of the ether-derived C—O bond (i.e., the C—O—C bond) and the alcohol-derived C—O bond (i.e., the C—OH bond) to the total amount of all the bonds, the ratio being determined by the C1s XPS analysis, in the carbon material-containing material falls within the ranges, the organic-inorganic composite can be said to be an organic-inorganic composite having a more precisely controlled structure.

The organic-inorganic composite is particularly preferably an aspect in which the ratio of the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond) to the total amount of all the bonds, that is, the C—C bond, the C=C bond, the C—H bond, the C—O bonds, and the C=O bonds, the ratio being determined by C1s XPS analysis, falls within the ranges, and the ratio of the total amount of the ether-derived C—O bond (i.e., the C—O—C bond) and the alcohol-derived C—O bond (i.e., the C—OH bond) to the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, falls within the ranges. According to such aspect, the solubility of the carbon material portion of the organic-inorganic composite can be further improved, and the structure control ratio of the carbon material portion can be further improved. In addition, according to such aspect, the structure of the organic-inorganic composite can be even more precisely controlled.

The organic-inorganic composite is particularly preferably an aspect in which the ratio of the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond) to the total amount of all the bonds, that is, the C—C bond, the C=C bond, the C—H bond, the C—O bonds, and the C=O bonds, the ratio being determined by C1s XPS analysis, falls within the ranges, and the ratio of the total amount of the ether-derived C—O bond (i.e., the C—O—C bond) and the alcohol-derived C—O bond (i.e., the C—OH bond) to the total amount of all the bonds, that is, the C—C bond, the C=C bond, the C—H bond, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, falls within the ranges. According to such aspect, the solubility of the carbon material portion of the organic-inorganic composite can be further improved, and the structure control ratio of the carbon material portion can be further improved. In addition, according to such aspect, the structure of the organic-inorganic composite can be even more precisely controlled.

The most preferred aspect of the organic-inorganic composite is such that the ratio of the total amount of all the carbon-oxygen bonds, that is, the C—O bonds (including the alcohol-derived C—O bond, the ether-derived C—O bond, and the epoxy-derived C—O bond), and the C=O bonds (including the carbonyl-derived C=O bond, the carboxyl-derived C=O bond, the ester-derived C=O bond, and the lactone-derived C=O bond) to the total amount of all the bonds, that is, the C—C bond, the C=C bond, the C—H bond, the C—O bonds, and the C=O bonds, the ratio being determined by the C1s XPS analysis, falls within the above-mentioned ranges, the ratio of the total amount of the ether-derived C—O bond (i.e., the C—O—C bond) and the alcohol-derived C—O bond (i.e., the C—OH bond) to the total amount of all the carbon-oxygen bonds, that is, the C—O bonds (including the alcohol-derived C—O bond, the ether-derived C—O bond, and the epoxy-derived C—O bond) and the C=O bonds (including the carbonyl-derived C=O bond, the carboxyl-derived C=O bond, the ester-derived C=O bond, and the lactone-derived C=O bond), the ratio being determined by the C1s XPS analysis, falls within the above-mentioned ranges, and the ratio of the total amount of the ether-derived C—O bond (i.e., the C—O—C bond) and the alcohol-derived C—O bond (i.e., the C—OH bond) to the total amount of all the bonds, that is, the C—C bond, the C=C bond, the C—H bond, the C—O bonds (including the alcohol-derived C—O bond, the ether-derived C—O bond, and the epoxy-derived C—O bond), and the C=O bonds (including the carbonyl-derived C=O bond, the carboxyl-derived C=O bond, the ester-derived C=O bond, and the lactone-derived C=O bond), the ratio being determined by the C1s XPS analysis, falls within the above-mentioned ranges. According to such aspect, the solubility of the carbon material portion of the organic-inorganic composite can be further improved, and the structure control ratio of the carbon material portion can be still further improved. In addition, according to such aspect, the structure of the organic-inorganic composite can be even still more precisely controlled.

No peak resulting from the C=O stretching vibration is observed in the range of from 1,660 $cm^{-1}$ to 1,800 $cm^{-1}$ in the IR analysis of the organic-inorganic composite. When no peak resulting from the C=O stretching vibration is observed in the range of from 1,660 $cm^{-1}$ to 1,800 $cm^{-1}$ in the IR analysis of the organic-inorganic composite, the structure of the organic-inorganic composite can be more precisely controlled.

The reason why the structure of the organic-inorganic composite can be more precisely controlled when no peak resulting from the C=O stretching vibration is observed in the range of from 1,660 $cm^{-1}$ to 1,800 $cm^{-1}$ in the IR analysis of the organic-inorganic composite is considered to be as described below. That is, when the organic-inorganic composite is produced by using such a compound and a production method as described later, as a result of the condensation reaction, an aromatic ring that is a skeleton and an oxygen functional group remain in the product after the reaction. At this time, when the structure of the aromatic ring is maintained (in other words, when the structure is controlled), an ether-cross-linked C—O bond or the alcohol-derived C—O bond, and the oxygen functional group may also undergo desorption and condensation to produce a C—C bond through which the aromatic rings each serving as the skeleton are bonded to each other. Meanwhile, when an undesired decomposition reaction occurs to cleave the aromatic structure serving as the skeleton, a C=O bond derived from the decomposition reaction is produced. Therefore, the fact that no peak resulting from the C=O stretching vibration is observed in the range of from 1,660 $cm^{-1}$ to 1,800 $cm^{-1}$ in the IR analysis means that the decomposition reaction is suppressed, and hence such organic-inorganic composite can be said to be a carbon material-containing material having a more precisely controlled structure. The range is particularly preferably the range of from 1,700 $cm^{-1}$ to 1,800 $cm^{-1}$.

When the organic-inorganic composite is subjected to TG-DTA analysis under an air atmosphere and under a temperature increase condition of 10° C./min from 40° C., its oxidation start temperature represented by the rise-up temperature of the resultant DTA curve is preferably 200° C. or more, more preferably 250° C. or more, most preferably 300° C. or more. When the organic-inorganic composite is subjected to the TG-DTA analysis under the air atmosphere and under a temperature increase condition of 10° C./min from 40° C., in the case where the oxidation start temperature represented by the rise-up temperature of the DTA curve falls within the ranges, the carbon material-containing material of the present invention has high oxidation stability, that is, its structure is controlled, and hence its skeleton structure is maintained. Accordingly, the oxidation resistance (decomposition resistance) thereof is improved. If the cleavage of the skeleton of the carbon material-containing material that may produce a C=O bond occurs, the stability of the skeleton may reduce to reduce the oxidation resistance (decomposition resistance).

As described in the foregoing, the organic-inorganic composite that is one embodiment of the carbon material-containing material obtained by the production method of the present invention includes the carbon material and the inorganic matter. The organic-inorganic composite that is one embodiment of the carbon material-containing material obtained by the production method of the present invention includes the "carbon material" as described above, and may be typically produced by the heating of the compound (A), which causes the condensation reaction between the same molecules and/or between different molecules by being heated, in the composition containing the compound (A) and the inorganic matter through the heating step (I) of heating the composition as described in the foregoing. The following description about the "carbon material" in the organic-inorganic composite that is one embodiment of the carbon material-containing material obtained by the production method of the present invention may be incorporated as description about each of the "carbon material" referred to in the description in the foregoing section <<<<1. Method of producing Carbon Material-containing Material>>>>, the "carbon material" referred to in the description in the section <<<<2. Typical Example of Method of producing Carbon Material-containing Material>>>> except the section <<2-1. Method of producing Organic-inorganic Composite>>, the "carbon material" referred to in the description in the section <<<<3. Carbon Material-containing Material>>>>, the "carbon material" referred to in the description in the section <<<<4. Organic-inorganic Composite>>>>, and the "carbon material" referred to in the description in the section <<<<5. Applications of Organic-inorganic Composite>>>>.

The presence of the carbon component of the carbon material can be easily recognized by the C1s XPS analysis of the material. In addition, the carbon material preferably has, in its structure, a benzene ring-derived honeycomb structure (graphene structure). The presence or absence of the graphene structure can be recognized by Raman spectroscopic analysis (Non Patent Literature 4).

In normal cases, the total content of metal components serving as impurities in the carbon material is preferably 0.1 atm % or less, more preferably 0.01 atm % or less, particularly preferably substantially zero with respect to 100 atm % of the carbon atoms of the material. The presence of those components can be recognized through the analysis of the carbon material by a fluorescent X-ray elemental analysis method (XRF). In addition, when the carbon material-containing material (in this section, the organic-inorganic composite) is analyzed by the fluorescent X-ray elemental analysis method (XRF), the content of a metal element except a metal element in the inorganic matter for forming the carbon material-containing material (in this section, the organic-inorganic composite) is preferably 0.1 atm % or less, more preferably 0.01 atm % or less, particularly preferably substantially zero with respect to 100 atm % of the carbon atoms of the carbon material-containing material. In, for example, the case where the carbon material-containing material (in this section, the organic-inorganic composite) using alumina as its inorganic matter is analyzed by the fluorescent X-ray elemental analysis method (XRF), when a metal element in alumina is aluminum alone, the content of a metal element except aluminum is preferably 0.1 atm % or less, more preferably 0.01 atm % or less, particularly preferably substantially zero with respect to 100 atm % of the carbon atoms of the carbon material-containing material.

The carbon material contains carbon as an essential constituent element, and may contain an element except carbon. Such element except carbon is preferably at least one kind of element selected from oxygen, hydrogen, nitrogen, sulfur, fluorine, chlorine, bromine, and iodine, more preferably at least one kind of element selected from oxygen, hydrogen, nitrogen, and sulfur, still more preferably at least one kind of element selected from oxygen, hydrogen, and nitrogen, particularly preferably at least one kind of element selected from oxygen and hydrogen. When the total amount of the elements except hydrogen out of the elements for forming the carbon material is set to 100 atm %, the amount of carbon is preferably 60 atm % or more, more preferably 70 atm % or more, still more preferably 75 atm % or more. In addition, the amount of the element except carbon is preferably 10 atm % or more. When the ratios of the respective elements fall within the ranges, the carbon material, which is generally insoluble, can express satisfactory solubility. The presence of those elements can be recognized through the determination of the amounts of the elements of the carbon material by X-ray photoelectron spectroscopy (C1s XPS). In addition, in the case where the amounts of the elements of the carbon material-containing material (in this section, the organic-inorganic composite) are determined by the X-ray photoelectron spectroscopy (C1s XPS), when the total amount of the elements except the elements in the inorganic matter for forming the carbon material-containing material (in this section, the organic-inorganic composite) is set to 100 atm %, the amount of carbon is preferably 60 atm % or more, more preferably 70 atm % or more, still more preferably 75 atm % or more. In addition, the amount of the element except carbon is preferably 10 atm % or more. In, for example, the case where the carbon material-containing material (in this section, the organic-inorganic composite) using phosphotungstic acid as its inorganic matter is analyzed by the X-ray photoelectron spectroscopy (C1s XPS), phosphorus and tungsten are detected. Accordingly, the ratio of the amount of carbon to the total amount (except hydrogen) of the elements except phosphorus, tungsten, and oxygen for forming phosphotungstic acid, whose amount is calculated from the contents of phosphorus and tungsten, and the ratio of the amount of the element except carbon to the total amount preferably fall within the ranges.

The carbon material is preferably soluble in a solvent.

Herein, a case in which the carbon material is soluble in the solvent is a case in which the carbon material is more excellent in solubility in the solvent than a related-art carbon material is, and hence can achieve satisfactory handleability.

Any one of the following embodiment modes may be preferably adopted as an aspect in which the carbon material is soluble in the solvent:

(Embodiment Mode 1) an embodiment mode in which the entirety of the carbon material dissolves in the solvent, that is, an embodiment mode in which the carbon material is formed only of a component that dissolves in the solvent (component A); and (Embodiment Mode 2) an embodiment mode in which part of the carbon material dissolves in the solvent, that is, an embodiment mode in which the carbon material is formed of the component that dissolves in the solvent (component A) and a component that does not dissolve in the solvent (component B); in this case, the component B is, for example, a portion that interacts with the inorganic matter to be insoluble in the solvent.

In the present invention, "soluble in a solvent" refers to an aspect in which a component soluble in any solvent is present. The solvent is preferably, for example, N,N-dimethylformamide, N,N-dimethylacetamide, N-methylpyrrolidone, dimethyl sulfoxide, acetone, methyl ethyl ketone, methyl isobutyl ketone, tetrahydrofuran, methanol, ethanol, 2-propanol, butanol, chloroform, or dichloromethane. That is, an aspect in which a component soluble in at least one kind of solvent selected from a group consisting of N,N-dimethylformamide, N,N-dimethylacetamide, N-methylpyrrolidone, dimethyl sulfoxide, acetone, methyl ethyl ketone, methyl isobutyl ketone, tetrahydrofuran, methanol, ethanol, 2-propanol, butanol, chloroform, and dichloromethane is preferred, an aspect in which a component soluble in at least one kind of solvent selected from a group consisting of N,N-dimethylformamide, N,N-dimethylacetamide, N-methylpyrrolidone, dimethyl sulfoxide, and chloroform is more preferred, an aspect in which a component soluble in at least one kind of solvent selected from a group consisting of N,N-dimethylformamide and N-methylpyrrolidone is still more preferred, an aspect in which a component soluble in N-methylpyrrolidone is present is particularly preferred.

One embodiment in which the carbon material is soluble in the solvent is, for example, an embodiment in which the carbon material contains a carbon-based compound that is soluble in the solvent.

Whether or not the carbon material is soluble in the solvent may be judged by, for example, a judgment method including: mixing the carbon material-containing material (in this section, the organic-inorganic composite) in the solvent so that its concentration may be 0.001 wt %; then treating the mixture with an ultrasonic wave for 1 hour; passing the resultant liquid through filter paper made of PTFE (pore diameter: 0.45 μm); and observing whether or not the carbon-based compound is present in the liquid that has been passed through the filter paper. When the carbon-based compound is present in the liquid that has been passed through the filter paper, the carbon material is judged to contain the carbon-based compound that is soluble in the solvent. For example, GL CHROMATODISC (TYPE 13P) manufactured by GL Sciences Inc. may be used as the filter paper made of PTFE.

The carbon material preferably (i) shows a peak in a G band (generally in the range of from 1,550 $cm^{-1}$ to 1,650 $cm^{-1}$) in a Raman spectrum obtained by its Raman spectroscopic analysis. Therefore, the fact that the carbon material has the peak in the G band (generally in the range of from 1,550 $cm^{-1}$ to 1,650 $cm^{-1}$) in the Raman spectrum obtained by the Raman spectroscopic analysis means that the carbon material has a graphene structure or a graphene structure-like structure. When the peak in the G band has a higher intensity and is sharper, it can be said that the carbon material has a more beautiful graphene structure or a more beautiful graphene structure-like structure.

The carbon material preferably (ii) shows a peak in a D band (generally in the range of from 1,300 cm$^{-1}$ to 1,400 cm$^{-1}$) in the Raman spectrum obtained by the Raman spectroscopic analysis. A carbon material having a structure derived from a defect of a graphene structure shows a peak in a D band (generally in the range of from 1,300 cm$^{-1}$ to 1,400 cm$^{-1}$) in a Raman spectrum obtained by its Raman spectroscopic analysis. Therefore, the fact that the carbon material has the peak in the D band (generally in the range of from 1,300 cm$^{-1}$ to 1,400 cm$^{-1}$) in the Raman spectrum obtained by the Raman spectroscopic analysis means that the carbon material contains a functional group, and has a structure derived from a defect of a graphene structure or a structure similar to the structure derived from the defect of the graphene structure. When the peak in the D band has a lower intensity, it can be said that the carbon material has a more beautiful graphene structure or a more beautiful graphene structure-like structure. In addition, the fact that the peak in the D band can be observed means that the carbon material-containing material obtained by the production method of the present invention has a functional group. Thus, the solubility of the carbon material in the solvent can be improved.

The carbon material preferably (i) shows the peak in the G band (generally in the range of from 1,550 cm$^{-1}$ to 1,650 cm$^{-1}$) in the Raman spectrum obtained by the Raman spectroscopic analysis, and (ii) shows the peak in the D band (generally in the range of from 1,300 cm$^{-1}$ to 1,400 cm$^{-1}$) in the Raman spectrum obtained by the Raman spectroscopic analysis.

The carbon material preferably (iii) shows a peak in a G' band (generally in the range of from 2,650 cm$^{-1}$ to 2,750 cm$^{-1}$) in a Raman spectrum obtained by its Raman spectroscopic analysis. Therefore, the fact that the carbon material has the peak in the G' band (generally in the range of from 2,650 cm$^{-1}$ to 2,750 cm$^{-1}$) in the Raman spectrum obtained by the Raman spectroscopic analysis means that the carbon material has a graphene structure or a graphene structure-like structure. The intensity of the peak in the G' band is strongest when the number of the graphene structures is one, and the intensity gradually reduces as the lamination number of the graphene structures increases. However, even when the intensity gradually reduces as the lamination number of the graphene structures increases, the peak in the G' band can be observed. Therefore, the presence of the peak in the G' band can be rephrased as follows: the carbon material has a graphene structure or a graphene structure-like structure. The G' band is sometimes referred to as "2D band".

The carbon material preferably (i) shows the peak in the G band (generally in the range of from 1,550 cm$^{-1}$ to 1,650 cm$^{-1}$) in the Raman spectrum obtained by the Raman spectroscopic analysis, (ii) shows the peak in the D band (generally in the range of from 1,300 cm$^{-1}$ to 1,400 cm$^{-1}$) in the Raman spectrum obtained by the Raman spectroscopic analysis, and (iii) shows the peak in the G' band (generally in the range of from 2,650 cm$^{-1}$ to 2,750 cm$^{-1}$) in the Raman spectrum obtained by the Raman spectroscopic analysis.

The carbon material preferably (iv) shows a peak in a D+D' band (generally in the range of from 2,800 cm$^{-1}$ to 3,000 cm$^{-1}$) in the Raman spectrum obtained by the Raman spectroscopic analysis. A carbon material having a structure derived from a defect of a graphene structure shows a peak in a D+D' band (generally in the range of from 2,800 cm$^{-1}$ to 3,000 cm$^{-1}$) in a Raman spectrum obtained by its Raman spectroscopic analysis. Therefore, the fact that the carbon material has the peak in the D+D' band (generally in the range of from 2,800 cm$^{-1}$ to 3,000 cm$^{-1}$) in the Raman spectrum obtained by the Raman spectroscopic analysis means that the carbon material contains a functional group, and has a structure derived from a defect of a graphene structure or a structure similar to the structure derived from the defect of the graphene structure. When the peak in the D+D' band has a lower intensity, it can be said that the carbon material has a more beautiful graphene structure or a more beautiful graphene structure-like structure. The D+D' band is sometimes referred to as "D+G band". The fact that the peak in the D+D' band can be observed also means that the carbon material-containing material obtained by the production method of the present invention has a functional group. Thus, the solubility of the carbon material in the solvent can be improved.

The carbon material preferably (i) shows the peak in the G band (generally in the range of from 1,550 cm$^{-1}$ to 1,650 cm$^{-1}$) in the Raman spectrum obtained by the Raman spectroscopic analysis, (ii) shows the peak in the D band (generally in the range of from 1,300 cm$^{-1}$ to 1,400 cm$^{-1}$) in the Raman spectrum obtained by the Raman spectroscopic analysis, (iii) shows the peak in the G' band (generally in the range of from 2,650 cm$^{-1}$ to 2,750 cm$^{-1}$) in the Raman spectrum obtained by the Raman spectroscopic analysis, and (iv) shows the peak in the D+D' band (generally in the range of from 2,800 cm$^{-1}$ to 3,000 cm$^{-1}$) in the Raman spectrum obtained by the Raman spectroscopic analysis.

The carbon material preferably contains the carbon-based compound that is soluble in the solvent.

As one embodiment, for example, the carbon material (i) shows the peak in the G band (generally in the range of from 1,550 cm$^{-1}$ to 1,650 cm$^{-1}$) in the Raman spectrum obtained by the Raman spectroscopic analysis, (ii) shows the peak in the D band (generally in the range of from 1,300 cm$^{-1}$ to 1,400 cm$^{-1}$) in the Raman spectrum obtained by the Raman spectroscopic analysis, and contains the carbon-based compound that is soluble in the solvent.

When the carbon material contains a functional group, and part of a graphene structure thereof has a defect, the defect may contribute to the expression of the solubility of the carbon material in the solvent.

As described above, the carbon material has a graphene structure or a graphene structure-like structure unlike a conventionally known carbon material, and hence the solubility of the carbon material in the solvent becomes more excellent (e.g., the amount of the component of the carbon material that dissolves in the solvent becomes larger, or the number of kinds of solvents in which the carbon material can dissolve increases).

The molecular weight of the carbon-based compound in the carbon material is preferably from 1,000 to 1,300,000, more preferably from 5,000 to 1,000,000, still more preferably from 10,000 to 700,000, particularly preferably from 15,000 to 500,000, most preferably from 20,000 to 300,000. A case in which the molecular weight of the carbon-based compound in the carbon material falls within the ranges, coupled with the feature (i), makes the solubility of the carbon material in the solvent more excellent (e.g., the amount of the component of the carbon material that dissolves in the solvent becomes larger, or the number of kinds of solvents in which the carbon material can dissolve increases). When the molecular weight of the carbon-based compound in the carbon material is more than 1,300,000, the solubility of the carbon material in the solvent may deteriorate. When the molecular weight of the carbon-based compound in the carbon material is less than 1,000, a feature as the carbon material may fade. Any such molecular weight may be analyzed by an approach to be described later.

The content of the carbon-based compound in the carbon material is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %. A case in which the content of the carbon-based compound in the carbon material falls within the ranges, coupled with the features (i) and (ii), makes the solubility of the carbon material in the solvent more excellent (e.g., the amount of the component of the carbon material that dissolves in the solvent becomes larger, or the number of kinds of solvents in which the carbon material can dissolve increases).

The carbon material preferably shows a peak in the range of from 20° to 30° in an XRD spectrum chart obtained by its XRD analysis. That is, an embodiment in which the carbon material has a structure in which graphene structures are laminated (graphene-laminated structure) is also one preferred embodiment. The presence of the laminated structure may make the carbon material stronger, and may make the material more stable.

A more preferred embodiment of the carbon material is: an embodiment in which the material has any one of the features (i) to (iv) described above for the Raman spectrum obtained by the Raman spectroscopic analysis, or a combination thereof; or an embodiment in which the material has the features (i) and (ii), the features (i), (ii), and (iii), or the features (i), (ii), (iii), and (iv), and shows the peak in the range of from 20° to 30° in the XRD spectrum chart obtained by the XRD analysis.

The carbon material may be preferably present in a bulk state. In general, the properties of a substance in a bulk state are properties intrinsic to the substance. That is, the substance in the bulk state can determine the values of the basic properties of the substance, such as a boiling point, a melting point, a viscosity, and a density. The term "physical properties of a substance" refers to the properties of the bulk portion thereof. Examples of the bulk state include a particle, a pellet, and a film. The state of presence of the particle is, for example, powder. The film is preferably a self-standing film.

<<2-2. Method of Producing Carbon Material-Containing Particles>>

One embodiment of the carbon material-containing material obtained by the production method of the present invention is the carbon material-containing particles. Typical examples of the carbon material-containing particles include core-shell particles, highly carbonized core-shell particles, hollow carbon fine particles, and highly carbonized hollow carbon fine particles.

<2-2-1. Method of Producing Core-Shell Particles>

The core-shell particles may be produced by incorporating, into the method of producing a carbon material-containing material of the present invention, a carbon material-removing step of removing at least part of the carbon material produced by the heating of the compound (A) after the heating step (I). That is, the particles may be produced by: producing the organic-inorganic composite that is one embodiment of the carbon material-containing material through the heating step (I); and then subjecting the organic-inorganic composite to the carbon material-removing step of removing at least part of the carbon material in the composite. In the carbon material-removing step, the organic-inorganic composite is treated with a solvent that dissolves the carbon material in the composite. Thus, there may be obtained the core-shell particle (core portion: the inorganic matter particle, shell portion: the carbon material bonding region) 200 in which the surface of the inorganic matter particle 20 is coated with the carbon material bonding region (region that is not dissolved by the solvent) 30 as illustrated in FIG. 2. Such core-shell particle is also a carbon material-containing material.

Examples of the solvent include N,N-dimethylformamide, N,N-dimethylacetamide, N-methylpyrrolidone, dimethyl sulfoxide, acetone, methyl ethyl ketone, methyl isobutyl ketone, tetrahydrofuran, methanol, ethanol, 2-propanol, butanol, chloroform, and dichloromethane. Of those, N,N-dimethylformamide, N,N-dimethylacetamide, N-methylpyrrolidone, dimethyl sulfoxide, and chloroform are preferred, N,N-dimethylformamide and N-methylpyrrolidone are more preferred, and N-methylpyrrolidone is particularly preferred.

<2-2-2. Method of Producing Highly Carbonized Core-Shell Particles>

The highly carbonized core-shell particles may be produced by incorporating, into the method of producing a carbon material-containing material of the present invention, a heating step (II) of further heating the residue after the heating step (I) and the carbon material-removing step subsequent thereto. That is, the above-mentioned core-shell particles (core portions: the inorganic matter particles, shell portions: the carbon material bonding regions) are further heated. The shell portions may be highly carbonized through the heating step (II). Thus, the highly carbonized core-shell particles (core portions: the inorganic matter particles, shell portions: highly carbonized products) may be obtained. When the shell portions are highly carbonized, the strength and heat resistance of the resultant carbon material or carbon material composite can be improved. The highly carbonized core-shell particles are also a carbon material-containing material.

Although a heating temperature in the heating step (II) only needs to be equal to or less than a temperature that the inorganic component of the core can withstand, a specific heating temperature is preferably from 500° C. to 3,000° C., more preferably from 600° C. to 2,500° C., most preferably from 700° C. to 2,000° C. When the heating temperature in the heating step (II) is adjusted within the ranges, the shell portions can be highly carbonized in an effective manner.

As a specific heating time, a heating time in the heating step (II) is preferably from 0.1 hour to 120 hours, more preferably from 0.5 hour to 100 hours, still more preferably from 1 hour to 50 hours, most preferably from 2 hours to 24 hours. When the heating time is adjusted within the ranges, the shell portions can be highly carbonized in an effective manner.

<2-2-3. Method of Producing Hollow Carbon Fine Particles>

The hollow carbon fine particles may be produced by incorporating, into the method of producing a carbon material-containing material of the present invention, an inorganic matter-removing step of removing the inorganic matter after the heating step (I) (Production Mode 1). That is, the fine particles may be produced by: producing the organic-inorganic composite that is one embodiment of the carbon material-containing material through the heating step (I); and then subjecting the organic-inorganic composite to the inorganic matter-removing step of removing the inorganic matter in the composite.

The hollow carbon fine particles may also be produced by incorporating, into the method of producing a carbon material-containing material of the present invention, the inorganic matter-removing step of removing the inorganic matter after the heating step (I) and the carbon material-removing step subsequent thereto (Production Mode 2).

That is, the fine particles may be produced by: producing the core-shell particles that are one embodiment of the carbon material-containing material through the heating step (I) and the carbon material-removing step subsequent thereto; and then subjecting the core-shell particles to the inorganic matter-removing step of removing the inorganic matter in each of the particles.

A method of removing the inorganic matter in the inorganic matter-removing step is, for example, a method including removing the inorganic matter with a solvent that can dissolve the inorganic matter without dissolving the carbon material. A solvent having such dissolution characteristic as described above, which is not particularly limited, is preferably an aqueous solvent. The reason why the aqueous solvent is preferred as described above is that the carbon material in the carbon material-containing material produced by the production method of the present invention is often hardly soluble in water, while the inorganic matter therein is often soluble in water (in particular, acidic water or basic water). Examples of the aqueous solvent include: acidic aqueous solutions, such as sulfuric acid, hydrochloric acid, and nitric acid; and basic aqueous solutions, such as sodium hydroxide, potassium hydroxide, and ammonia. In addition, a temperature in the removing step, which is not particularly limited, is preferably from 0° C. to 150° C., more preferably from 20° C. to 100° C. because the dissolution characteristic of the aqueous solvent can be effectively expressed. Further, the physical treatment of the removing step, which is not particularly limited, is preferably still standing, stirring, ultrasonic treatment, or a shearing operation, more preferably stirring, ultrasonic treatment, or a shearing operation because the removability of the inorganic matter can be effectively expressed.

<2-2-4. Method of Producing Highly Carbonized Hollow Carbon Fine Particles>

The highly carbonized hollow carbon fine particles may be produced by incorporating, into the method of producing a carbon material-containing material of the present invention, the heating step (II) of further heating the residue after the heating step (I) and the inorganic matter-removing step subsequent thereto. That is, the hollow carbon fine particles obtained in Production Mode 1 described above are further heated. The carbon material portions of the fine particles may be highly carbonized through the heating step (II). Thus, the highly carbonized hollow carbon fine particles may be obtained. When the carbon material portions are highly carbonized, the strength and heat resistance of the resultant carbon material or carbon material composite can be improved. The highly carbonized hollow carbon fine particles are also a carbon material-containing material.

The highly carbonized hollow carbon fine particles may also be produced by incorporating, into the method of producing a carbon material-containing material of the present invention, the heating step (II) of further heating the residue after the heating step (I), the carbon material-removing step subsequent thereto, and the inorganic matter-removing step subsequent thereto. That is, the hollow carbon fine particles obtained in Production Mode 2 described above are further heated. The carbon material portions of the fine particles may be highly carbonized through the heating step (II).

<<<<3. Carbon Material-Containing Material>>>>

A carbon material-containing material of the present invention is a carbon material-containing material including a carbon material and an inorganic matter, and at least part of the carbon material and at least part of the inorganic matter are bonded to each other through a covalent bond.

In the carbon material-containing material of the present invention, at least part of the carbon material and at least part of the inorganic matter are bonded to each other through the covalent bond. It is preferred that at least part of the carbon material be covalently bonded to at least part of the outermost surface of the inorganic matter. It is more preferred that at least part of the carbon material be covalently bonded to at least part of the outermost surface of each of the inorganic matter particles.

The description in the sections <<<<1. Method of producing Carbon Material-containing Material>>>> and <<<<2. Typical Example of Method of producing Carbon Material-containing Material>>>> may be incorporated for the "carbon material" and the "inorganic matter" in the description of the carbon material-containing material of the present invention.

The carbon material-containing material of the present invention may be produced by any appropriate method. The carbon material-containing material of the present invention may be preferably produced by the method of producing a carbon material-containing material of the present invention.

The carbon material-containing material of the present invention comes in a wide variety of kinds, and may adopt, as its shape, any one of various shapes, such as a particulate shape and a nonparticulate shape (e.g., a fibrous shape or a thin film shape). The shape is preferably the particulate shape.

As described in the foregoing sections <<<<1. Method of producing Carbon Material-containing Material>>>> and <<<<2. Typical Example of Method of producing Carbon Material-containing Material>>>>, for example, when inorganic matters of various shapes, such as a particulate inorganic matter (inorganic matter particles) and a nonparticulate inorganic matter (e.g., a fibrous inorganic matter or a thin film-shaped inorganic matter), are each adopted as the inorganic matter, a wide variety of carbon material-containing materials may be obtained in accordance with the respective shapes. The inorganic matter is preferably the particulate inorganic matter (inorganic matter particles).

As described in the foregoing sections <<<<1. Method of producing Carbon Material-containing Material>>>> and <<<<2. Typical Example of Method of producing Carbon Material-containing Material>>>>, in the case where the inorganic matter particles are used, the carbon material-containing material of the present invention is typically, for example, a massive carbon material-containing material containing many inorganic matter particles. In this case, a particulate carbon material-containing material may be obtained by shredding or the like. In addition, the particulate carbon material-containing material may be obtained by adjusting the blending ratio between the compound (A) and the inorganic matter. In addition, when the fibrous inorganic matter is used, the carbon material-containing material of the present invention is, for example, fibrous core-shell particles or a tubular hollow carbon material. Further, when the thin film-shaped inorganic matter is used, the carbon material-containing material of the present invention is, for example, a laminated carbon material-containing material. In addition, various thin film-shaped carbon materials may be obtained by further subjecting such laminated carbon material-containing material to, for example, the heating step (II), the carbon material-removing step, or the inorganic matter-removing step described in the foregoing.

Typical embodiments of the carbon material-containing material of the present invention are, for example, an organic-inorganic composite and carbon material-containing particles as in the carbon material-containing material obtained by the production method described in the section <<<<2. Typical Example of Method of producing Carbon Material-containing Material>>>>. Examples of the carbon material-containing particles include core-shell particles, highly carbonized core-shell particles, hollow carbon fine particles, and highly carbonized hollow carbon fine particles.

The carbon material-containing material of the present invention preferably shows a peak in the range of from 125 ppm to 135 ppm in its $^{13}$C-NMR analysis. The fact that the carbon material-containing material shows the peak in the range of from 125 ppm to 135 ppm in the $^{13}$C-NMR analysis means that the carbon material-containing material includes a carbon material containing at least sp2 carbon.

The carbon material-containing material of the present invention preferably shows a peak in the range of from 140 ppm to 160 ppm in the $^{13}$C-NMR analysis. The fact that the carbon material-containing material shows the peak in the range of from 140 ppm to 160 ppm in the $^{13}$C-NMR analysis means the presence of a C—O bond. Therefore, the fact that the carbon material-containing material shows the peak in the range of from 140 ppm to 160 ppm in the $^{13}$C-NMR analysis typically means that the carbon material-containing material has a "group having oxygen" (e.g., a group having oxygen derived from an inorganic oxide or a metal hydroxyl group) on the outermost surface of the inorganic matter, and the oxygen and carbon of the carbon material are covalently bonded to each other.

In addition, a case in which the carbon material-containing material of the present invention has a peak derived from a C—O—Si bond in its $^{29}$Si-NMR analysis means that at least part of the carbon material and at least part of the inorganic matter having Si are bonded to each other through a covalent bond. The case typically means that at least part of the carbon material is covalently bonded to at least part of the outermost surface of each of silica particles.

The contents described in the section <<<<2. Typical Example of Method of producing Carbon Material-containing Material>>>> may be incorporated for the thickness of the carbon material portion in the carbon material-containing material of the present invention.

<<<<4. Organic-Inorganic Composite>>>>

An organic-inorganic composite of the present invention is an organic-inorganic composite including a carbon material and an inorganic matter, and the carbon material is soluble in a solvent.

In the organic-inorganic composite of the present invention, the description in the section <<2-1. Method of producing Organic-inorganic Composite>> may be incorporated for the composition and physical properties of the organic-inorganic composite, and the "carbon material". In the organic-inorganic composite of the present invention, the description in the section <<1-1. Compound (A)>> may be incorporated for the "compound (A)". In the organic-inorganic composite of the present invention, the description in the section <<1-2. Inorganic Matter>> may be incorporated for the "inorganic matter".

The organic-inorganic composite of the present invention may be produced by any appropriate method to the extent that the effects of the present invention are not impaired. Such production method typically includes the heating step (I) of heating the composition containing the compound (A), which causes the condensation reaction between the same molecules and/or between different molecules by being heated, and the inorganic matter. The compound (A) in the composition containing the compound (A) and the inorganic matter may be heated through the heating step (I) to be turned into a carbon material.

When the condensation reaction temperature of the compound (A) is T°C, the heating temperature in the heating step (I) at the time of the production of the organic-inorganic composite of the present invention is preferably (T−150)° C. or more.

In the heating step (I) at the time of the production of the organic-inorganic composite of the present invention, the composition containing the compound (A), which causes the condensation reaction between the same molecules and/or between different molecules by being heated, and the inorganic matter is heated. A blending ratio between the compound (A) and the inorganic matter is as follows: the amount of the compound (A) is preferably from 0.01 wt % to 1,000,000 wt %, more preferably from 0.1 wt % to 100,000 wt %, particularly preferably from 1 wt % to 1,000 wt % with respect to 100 wt % of the inorganic matter. When the blending ratio between the compound (A) and the inorganic matter falls within the ranges, an organic-inorganic composite having a more precisely controlled structure can be more simply produced under a milder condition. The blending ratio between the inorganic matter and the compound (A) may be appropriately adjusted in accordance with the target physical properties of a composite. For example, the adjustment of the blending ratio between the inorganic matter and the compound (A) enables the control of the physical properties and form (e.g., solubility in a solvent, the shape of a carbon component or an inorganic component (whether the component is particulate or nonparticulate), and the size of the carbon component or the inorganic component) of the organic-inorganic composite to be obtained.

Any appropriate other component may be incorporated into the composition containing the compound (A), which causes the condensation reaction between the same molecules and/or between different molecules by being heated, and the inorganic matter to the extent that the effects of the present invention are not impaired. Examples of such other component include a solvent, a catalyst, a parent material, and a carrier.

The composition to be heated in the heating step (I) at the time of the production of the organic-inorganic composite of the present invention only needs to be prepared by any appropriate method to the extent that the effects of the present invention are not impaired. Such method is, for example, a method including mixing the compound (A) and the inorganic matter through any appropriate method (e.g., crushing or pulverization) while the components are in solid states. In addition, the method is, for example, a method including mixing the compound (A), the inorganic matter, a solvent, and as required, any other component except the solvent through any appropriate method (e.g., ultrasonic treatment) and removing the solvent through any appropriate method (e.g., vacuum drying). In addition, shredding may be performed as required.

When the condensation reaction temperature of the compound (A) is T° C., the heating temperature in the heating step (I) at the time of the production of the organic-inorganic composite of the present invention is preferably (T−150)° C. or more, more preferably from (T−150)° C. to (T+50°) C, still more preferably from (T−130°) C to (T+45°) C, even still more preferably from (T−100°) C to (T+40°) C, particularly preferably from (T−80°) C to (T+35) ° C., most preferably from (T−50) ° C. to (T+30) ° C. When the organic-inorganic composite of the present invention is produced, the catalytic ability of the inorganic matter, and reactivity between a functional group on the inorganic matter and a carbon material are high, and hence a reaction between the functional group and the carbon material may proceed from relatively low temperature as compared to the condensation reaction temperature of the compound (A) as described above to advance the carbonization of the inorganic matter. When the heating temperature is adjusted within the ranges, an organic-inorganic composite having solubility in a solvent or an organic-inorganic composite having a more precisely controlled structure can be more simply produced under a milder condition.

The condensation reaction temperature of the compound (A) may be determined by TG-DTA analysis. A specific procedure is as described below.
  (1) When one kind of compound is used as the compound (A), the TG-DTA analysis of the compound (A) is performed under a nitrogen gas atmosphere at a rate of temperature increase of 10° C./min from 40° C., and the lowest peak top temperature of the resultant DTA curve is determined as the condensation reaction temperature (T° C.) of the compound (A).
  (2) When a mixture of two or more kinds of compounds is used as the compound (A), the TG-DTA analysis of the mixture is performed under a nitrogen gas atmosphere at a rate of temperature increase of 10° C./min from 40° C., and the lowest peak top temperature of the resultant DTA curve is determined as the condensation reaction temperature (T° C.) of the compound (A) (mixture of two or more kinds of compounds).
  (3) However, when the compound (A) serving as one kind of compound or a mixture of two or more kinds of compounds contains, for example, an impurity such as a solvent, moisture, or hydrated water, a DTA peak along with the desorption of the impurity (sometimes referred to as "impurity peak") is observed at temperatures lower than the condensation reaction temperature in some cases. In such cases, the condensation reaction temperature of the compound (A) is determined while the impurity peak is neglected. The lowest peak top temperature of the resultant DTA curve is typically determined as the condensation reaction temperature of the compound (A) while the impurity peak is neglected.

As a specific heating temperature, the heating temperature in the heating step (I) at the time of the production of the organic-inorganic composite of the present invention is preferably from 200° C. to 500° C., more preferably from 220° C. to 400° C., still more preferably from 230° C. to 350° C., most preferably from 250° C. to 300° C. When the heating temperature is adjusted within the ranges, an organic-inorganic composite having solubility in a solvent or an organic-inorganic composite having a more precisely controlled structure can be more simply produced under a milder condition. In particular, the heating temperature in the heating step (I) is low as described above, and hence an organic-inorganic composite can be industrially produced under a milder condition.

As a specific heating time, a heating time in the heating step (I) at the time of the production of the organic-inorganic composite of the present invention is preferably from 0.1 hour to 120 hours, more preferably from 0.5 hour to 100 hours, still more preferably from 1 hour to 50 hours, most preferably from 2 hours to 24 hours. When the heating time is adjusted within the ranges, an organic-inorganic composite having solubility in a solvent or an organic-inorganic composite having a more precisely controlled structure can be more simply produced under a milder condition.

The contents described in the section <<<<2. Typical Example of Method of producing Carbon Material-containing Material>>>> may be incorporated for the thickness of the carbon material portion in the organic-inorganic composite of the present invention.

<<<<5. Applications of Organic-Inorganic Composite>>>>

The organic-inorganic composite of the present invention can be developed into various applications. A typical product obtained by such application development is carbon material-containing particles. The carbon material-containing material comes in a wide variety of kinds, and may adopt, as its shape, any one of various shapes, such as a particulate shape and a nonparticulate shape (e.g., a fibrous shape or a thin film shape) The shape is preferably the particulate shape. Typical examples of the carbon material-containing particles include core-shell particles, highly carbonized core-shell particles, hollow carbon fine particles, and highly carbonized hollow carbon fine particles.

<<5-1. Core-Shell Particles>>

The core-shell particles may be produced as follows: at the time of the production of the organic-inorganic composite of the present invention, a carbon material-removing step of removing at least part of the carbon material produced by the heating of the compound (A) after the heating step (I). That is, the particles may be produced by: producing the organic-inorganic composite of the present invention through the heating step (I); and then subjecting the organic-inorganic composite of the present invention to the carbon material-removing step of removing at least part of the carbon material in the composite. In the carbon material-removing step, the organic-inorganic composite of the present invention is treated with a solvent that dissolves the carbon material in the composite. Thus, there may be obtained the core-shell particle (core portion: the inorganic matter particle, shell portion: the carbon material bonding region) 200 in which the surface of the inorganic matter particle 20 is coated with the carbon material bonding region (region that is not dissolved by the solvent) 30 as illustrated in FIG. 2.

Examples of the solvent include N,N-dimethylformamide, N,N-dimethylacetamide, N-methylpyrrolidone, dimethyl sulfoxide, acetone, methyl ethyl ketone, methyl isobutyl ketone, tetrahydrofuran, methanol, ethanol, 2-propanol, butanol, chloroform, and dichloromethane. Of those, N,N-dimethylformamide, N,N-dimethylacetamide, N-methylpyrrolidone, dimethyl sulfoxide, and chloroform are preferred, N,N-dimethylformamide and N-methylpyrrolidone are more preferred, and N-methylpyrrolidone is particularly preferred.

The contents described in the section <<<<2. Typical Example of Method of producing Carbon Material-containing Material>>>> may be incorporated for the thickness of the carbon material portion in the core-shell particles.

<<5-2. Highly Carbonized Core-Shell Particles>>

The highly carbonized core-shell particles may be produced as follows: at the time of the production of the organic-inorganic composite of the present invention, the carbon material-removing step is subsequently performed after the heating step (I), and then the residue is subjected to the heating step (II) of further heating the residue. That is, the core-shell particles (core portions: the inorganic matter particles, shell portions: the carbon material bonding regions) obtained through the carbon material-removing step are further heated. The shell portions may be highly carbonized through the heating step (II). Thus, the highly carbonized core-shell particles (core portions: the inorganic matter particles, shell portions: highly carbonized products)

may be obtained. When the shell portions are highly carbonized, the strength and heat resistance of the resultant carbon material or carbon material composite can be improved.

Although a heating temperature in the heating step (II) only needs to be equal to or less than a temperature that the inorganic component of the core can withstand, a specific heating temperature is preferably from 500° C. to 3,000° C., more preferably from 600° C. to 2,500° C., most preferably from 700° C. to 2,000° C. When the heating temperature in the heating step (II) is adjusted within the ranges, the shell portions can be highly carbonized in an effective manner.

As a specific heating time, a heating time in the heating step (II) is preferably from 0.1 hour to 120 hours, more preferably from 0.5 hour to 100 hours, still more preferably from 1 hour to 50 hours, most preferably from 2 hours to 24 hours. When the heating time is adjusted within the ranges, the shell portions can be highly carbonized in an effective manner.

The contents described in the section <<<<2. Typical Example of Method of producing Carbon Material-containing Material>>>> may be incorporated for the thickness of the carbon material portion in the highly carbonized core-shell particles.

<<5-3. Hollow Carbon Fine Particles>>

The hollow carbon fine particles may be produced by incorporating, into the method of producing the organic-inorganic composite of the present invention, an inorganic matter-removing step of removing the inorganic matter after the heating step (I) (Production Mode 1). That is, the fine particles may be produced by: producing the organic-inorganic composite through the heating step (I); and then subjecting the organic-inorganic composite to the inorganic matter-removing step of removing the inorganic matter in the composite.

The hollow carbon fine particles may also be produced as follows (Production Mode 2): at the time of the production of the organic-inorganic composite of the present invention, the carbon material-removing step is subsequently performed after the heating step (I), and then the inorganic matter-removing step of removing the inorganic matter is performed. That is, the fine particles may be produced by: producing the core-shell particles through the heating step (I) and the carbon material-removing step subsequent thereto; and then subjecting the core-shell particles to the inorganic matter-removing step of removing the inorganic matter in each of the particles.

A method of removing the inorganic matter in the inorganic matter-removing step is, for example, a method including removing the inorganic matter with a solvent that can dissolve the inorganic matter without dissolving the carbon material. A solvent having such dissolution characteristic as described above, which is not particularly limited, is preferably an aqueous solvent. The reason why the aqueous solvent is preferred as described above is that the carbon material in the organic-inorganic composite produced by the production method of the present invention is often hardly soluble in water, while the inorganic matter therein is often soluble in water (in particular, acidic water or basic water). Examples of the aqueous solvent include: acidic aqueous solutions, such as sulfuric acid, hydrochloric acid, and nitric acid; and basic aqueous solutions, such as sodium hydroxide, potassium hydroxide, and ammonia. In addition, a temperature in the removing step, which is not particularly limited, is preferably from 0° C. to 150° C., more preferably from 20° C. to 100° C. because the dissolution characteristic of the aqueous solvent can be effectively expressed. Further, the physical treatment of the removing step, which is not particularly limited, is preferably still standing, stirring, ultrasonic treatment, or a shearing operation, more preferably stirring, ultrasonic treatment, or a shearing operation because the removability of the inorganic matter can be effectively expressed.

The contents described in the section <<<<2. Typical Example of Method of producing Carbon Material-containing Material>>>> may be incorporated for the thickness of the carbon material portion in the hollow carbon fine particles.

<<5-4. Highly Carbonized Hollow Carbon Fine Particles>>

The highly carbonized hollow carbon fine particles may be produced as follows: at the time of the production of the organic-inorganic composite of the present invention, the inorganic matter-removing step is subsequently performed after the heating step (I), and then the residue is subjected to the heating step (II) of further heating the residue. That is, the hollow carbon fine particles obtained in Production Mode 1 described above are further heated. The carbon material portions of the fine particles may be highly carbonized through the heating step (II). Thus, the highly carbonized hollow carbon fine particles may be obtained. When the carbon material portions are highly carbonized, the strength and heat resistance of the resultant carbon material or carbon material composite can be improved.

The highly carbonized hollow carbon fine particles may also be produced as follows: at the time of the production of the organic-inorganic composite of the present invention, the carbon material-removing step is subsequently performed after the heating step (I), and then the inorganic matter-removing step is further subsequently performed, followed by the performance of the heating step (II) of further heating the residue. That is, the hollow carbon fine particles obtained in Production Mode 2 described above are further heated. The carbon material portions of the fine particles may be highly carbonized through the heating step (II).

The contents described in the section <<<<2. Typical Example of Method of producing Carbon Material-containing Material>>>> may be incorporated for the thickness of the carbon material portion in the highly carbonized hollow carbon fine particles.

EXAMPLES

The present invention is specifically described below by way of Examples, but the present invention is not limited to these Examples. The term "part(s)" means "part(s) by weight" and the symbol "%" means "wt %" unless otherwise specified. In addition, the term "weight" as used herein may be replaced with the term "mass"; provided that the symbol "%" in a portion concerning C1s XPS herein means "atm %".

<Raman Spectroscopic Analysis>

Raman spectroscopic analysis was performed with the following apparatus under the following conditions.

Measuring apparatus: A micro-Raman spectrometer (NRS-3100 manufactured by JASCO Corporation)
Measurement conditions: A laser having a wavelength of 532 nm was used, an objective lens had a magnification of 20, a CCD capture time was 1 second, and the number of scans was 64 (resolution=4 cm$^{-1}$).

In Raman analysis, a G' band and a D+D' band may appear while overlapping each other, and hence the D+D' band may be analyzed as, in particular, a broad peak having a shoulder. In such cases, the inflection point of the shoulder peak is regarded as the peak of the G' band.

<XRD Analysis>

XRD measurement was performed with a fully automatic horizontal X-ray diffractometer (manufactured by Rigaku Corporation, SMART LAB) under the following conditions.

CuKα1-ray: 0.15406 nm
Scanning range: 10° to 90°
X-ray output setting: 45 kV-200 mA
Step size: 0.020°
Number of scans: 0.5° min$^{-1}$ to 4° min$^{-1}$ The XRD measurement was performed under a state in which an inert atmosphere was maintained by loading a sample into an airtight sample stage in a glove box.

<C1s Xps Analysis>

C1s XPS measurement was performed with a photoelectron spectrometer (AXIS-ULTRA, manufactured by Shimadzu Corporation) under the following conditions.

Source: Mg (dual node)
Emission: 10 mA
Anode: 10 kV
Analyzer: Pass Energy: 40
Measurement range: C1s: 296 eV to 270 eV
Number of scans: 10
Analysis conditions: Peaks derived from C1s orbitals were separated for each functional group at the following energies, and the ratios of the peaks were calculated from their respective areas. Peaks derived from typical kinds of functional groups were separated at the following five energies: (1) peaks derived from —COO—, a lactone, and some ketones were separated at 288.3 eV; (2) peaks derived from C=O and an epoxy group were separated at 286.2 eV; (3) peaks derived from C—OH and C—O—C were separated at 285.6 eV; (4) a peak derived from six-membered ring C=C was separated at 284.3 eV; and (5) peaks derived from C—C, C—H, and five-membered ring C=C were separated at 283.6 eV. However, the areas of the peaks (4) and (5) were collectively calculated for convenience of ratio calculation. The symbol "%" in a portion concerning the C1s XPS means "atm %". In Table 1, the ratios of the peaks corresponding to the items (1), (2), and (3) were shown as (A), (B), and (C), respectively, and the total ratio of the peaks corresponding to the items (4) and (5) was shown as (D).

<TG-DTA Analysis>

TG-DTA analysis was performed with the following apparatus under the following conditions.

Measuring apparatus: A simultaneous thermogravimetric analyzer (manufactured by Seiko Instruments Inc., TG/DTA6200) The condensation reaction temperature of the compound (A) was determined as described below.

(1) When one kind of compound was used as the compound (A), the TG-DTA analysis of the compound (A) was performed under a nitrogen gas atmosphere at a rate of temperature increase of 10° C./min from 40° C., and the lowest peak top temperature of the resultant DTA curve was determined as the condensation reaction temperature (T° C.) of the compound (A).

(2) When a mixture of two or more kinds of compounds was used as the compound (A), the TG-DTA analysis of the mixture was performed under a nitrogen gas atmosphere at a rate of temperature increase of 10° C./min from 40° C., and the lowest peak top temperature of the resultant DTA curve was determined as the condensation reaction temperature (T° C.) of the compound (A) (mixture of two or more kinds of compounds).

(3) However, when the compound (A) serving as one kind of compound or a mixture of two or more kinds of compounds contained, for example, an impurity such as a solvent, moisture, or hydrated water, a DTA peak along with the desorption of the impurity (sometimes referred to as "impurity peak") was observed at temperatures lower than the condensation reaction temperature in some cases. In such cases, the condensation reaction temperature of the compound (A) was determined while the impurity peak was neglected. Specifically, the lowest peak top temperature of the resultant DTA curve was determined as the condensation reaction temperature of the compound (A) while the impurity peak was neglected.

The oxidation start temperature of an organic-inorganic composite was estimated by: subjecting the composite to TG-DTA analysis under an air atmosphere at a rate of temperature increase of 10° C./min from 40° C.; and estimating the oxidation start temperature from the lowest rise-up temperature of the resultant DTA curve out of the rise-up temperatures of the DTA curve.

<IR Analysis>

FT-IR analysis was performed with the following apparatus under the following conditions.

Measuring apparatus: A Fourier transform infrared spectrometer (FT/IR-4200 manufactured by JASCO Corporation)
Measurement conditions: The measurement was performed by diffuse reflectance Fourier transform spectroscopy (DRIFT) with a MCT detector at a resolution of 4 cm$^{-1}$ and a number of scans of 128.
Sample condition: A mixture obtained by mixing a sample and KBr at a weight ratio of 1:50 was used.

<$^{13}$C-NMR Measurement and $^{29}$Si-NMR Measurement>

$^{13}$C-NMR measurement and $^{29}$Si-NMR measurement were performed with the following apparatus under the following conditions.

Apparatus: Bruker Avance NEO 400 MHz/263 GHz 9.4 T, DNP system
Probe: 2 ch 3.2 mm DNP probe
Sample tube: 3.2 mm sapphire rotor+Teflon insert+zirconia cap
Measurement temperature: 105 K to 107 K
Magic angle spinning (MAS): 10 kHz
Pulse program: CP (1H—$^{13}$C, 1H—$^{29}$Si)
CP contact time: 3 ms
Sample preparation condition: 40 mg sample+20 µL TEKPol/1,1,2,2-tetrachloroethane (16 mM)

<Measurement of Molecular Weight>

The molecular weight of a carbon material in a carbon material-containing material was measured as described below. The carbon material-containing material was mixed in N,N-dimethylformamide (containing 0.1% of LiBr) so that the content of each carbon material became 0.02 wt %, and the mixture was treated with an ultrasonic wave for 1 hour. After that, the mixture was subjected to pretreatment by being passed through filter paper made of PTFE (0.45 µm), and then the filtrate was subjected to gel permeation chromatography (GPC, HLC-8220GPC manufactured by Tosoh Corporation) by using N,N-dimethylformamide (containing 0.1% of LiBr) as a developing solvent, followed by the calculation of the molecular weight in terms of polystyrene. The maximum molecular weight in the carbon material was calculated from the rise-up point of its peak.

<Measurement of Heat-Conducting Characteristics (Thermal Diffusivity and Thermal Conductivity)>

With regard to a thermal diffusivity serving as a heat-conducting characteristic, the thermal diffusivity of a film in its thickness direction was measured with M3 type 2 manufactured by ai-Phase Co., Ltd. A thermal conductivity serving as a heat-conducting characteristic was calculated from the expression "specific heat of film×density×thermal diffusivity".

<SPS Sintering>

SPS sintering was performed with the following apparatus under the following conditions.

Apparatus: LABOX-125C manufactured by SinterLand, Inc.
Atmosphere: under vacuum
Temperature increase: 10° C./min (temperature increase from ~5 Pa)
Sintering temperature: 610° C.
Holding time: 5 minutes
Pressurization: 50 MPa (from temperature increase to sintering)
Cooling: pressureless and natural cooling <Measurement of Powder Resistance>

A powder resistance was measured as described below. A 4-millimeter thick Teflon plate was perforated with a 1-centimeter square hole, and a powder was loaded into the hole. The powder was sandwiched between copper electrodes from both of its sides, and the resistance of the powder was measured. A used apparatus was a high resistance meter 6517BJ manufactured by Tektronix, Inc., and the resistance was measured at an applied voltage of 10 V.

[Example 1]: Phloroglucinol+Silica Particles+250° C.×1 Hour

Phloroglucinol (manufactured by Tokyo Chemical Industry Co., Ltd., melting point: 220° C., condensation reaction temperature: 330° C., theoretical specific surface area: 750 m$^2$/g) was sufficiently mixed with silica particles (manufactured by Fuji Silysia Chemical Ltd., product name: "Q-10HT60315", specific surface area: 259 m$^2$/g) so that the thickness of the layer of phloroglucinol was 1.5 times as large as that of the layer of the silica particles.

The resultant mixture was sealed in a quartz ample tube in a vacuum, and was then heated in an electric furnace, which had been heated to 250° C. in advance, for 1 hour.

Thus, an organic-inorganic composite (1) including a carbon material (1A) and an inorganic oxide (1B) was obtained.

The organic-inorganic composite (1) was dispersed in N-methylpyrrolidone (NMP), and the solubility of its carbon component was recognized by the approach described in the foregoing. As a result, the component was soluble in a solvent.

Figure 3:
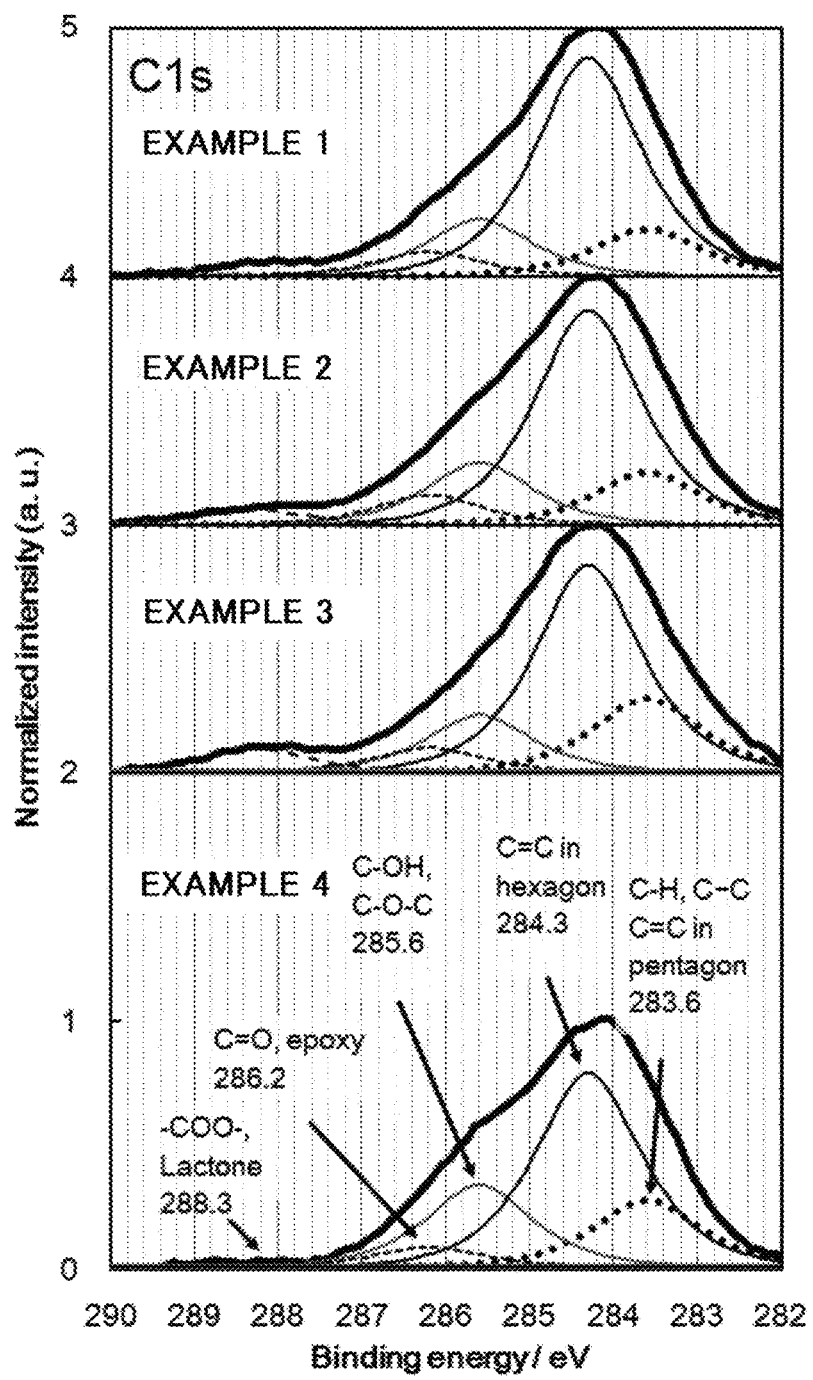
FIG. 3 is an XPS spectral (C1s) diagram of each of organic-inorganic composites (1) to (4) obtained in Examples 1 to 4.

The results of the C1s XPS analysis of the resultant organic-inorganic composite (1) are shown in FIG. 3 (XPS spectrum (C1s)) and Table 1. It is found from Table 1 that the organic-inorganic composite (1) is an organic-inorganic composite including a carbon material and an inorganic oxide. The ratio of the total amount of all carbon-oxygen bonds (C—O bonds and C═O bonds) to the total amount of all carbon bonds (a C—C bond, a C═C bond, a C—H bond, the C—O bonds, and the C═O bonds) was 26%, the ratio of the total amount of an ether-derived C—O bond and an alcohol-derived C—O bond to the total amount of all the carbon-oxygen bonds (the C—O bonds and the C═O bonds) was 62%, and the ratio of the total amount of the ether-derived C—O bond and the alcohol-derived C—O bond to the total amount of all the carbon bonds (the C—C bond, the C═C bond, the C—H bond, the C—O bonds, and the C═O bonds) was 16%. It is found from the foregoing that the composite has a high structure control ratio.

When phloroglucinol was subjected to TG-DTA analysis under a nitrogen gas atmosphere and under a temperature increase condition of 10° C./min, the weight ratio (M500/M50) of the weight M500 thereof at a temperature of 500° C. to the initial weight M50 thereof at a temperature of 50° C. was 0.49. It is found from the foregoing that phloroglucinol may be sufficiently present on the inorganic oxide even after its carbonization.

Figure 4:
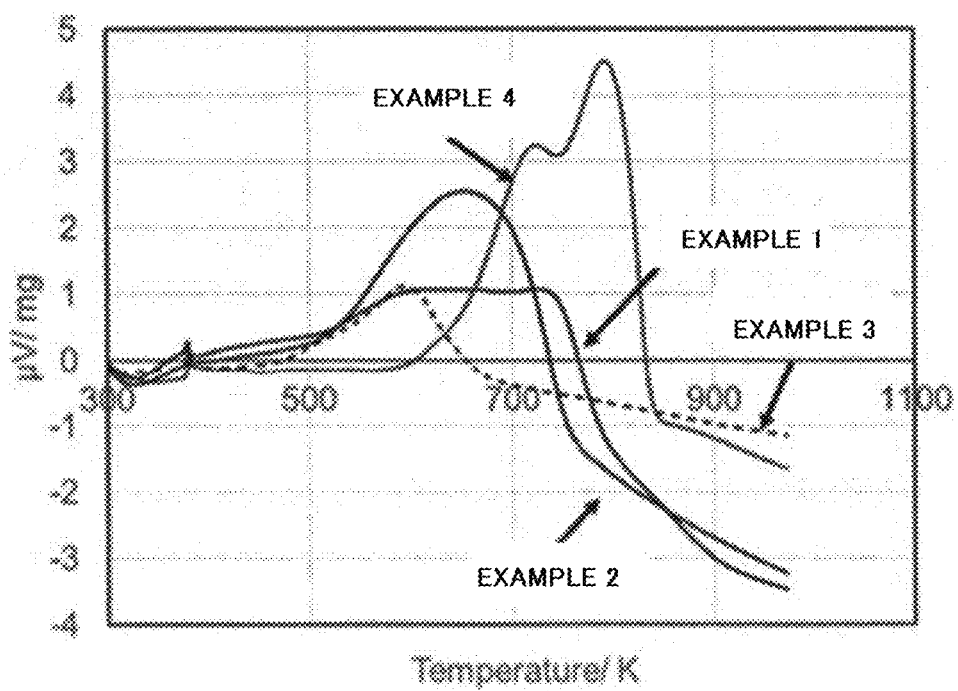
FIG. 4 is a measurement diagram for showing the result of DTA analysis in the TG-DTA analysis of each of the organic-inorganic composites (1) to (4) obtained in Examples 1 to 4.

The result of DTA analysis in the TG-DTA analysis of the resultant organic-inorganic composite (1) is shown in FIG. 4. According to FIG. 4, when the organic-inorganic composite (1) was subjected to TG-DTA analysis under an air atmosphere and under a temperature increase condition of 10° C./min from 40° C., its oxidation start temperature represented by the rise-up temperature of the resultant DTA curve was 200° C. It is found from the foregoing that the composite has high oxidation resistance.

Figure 5:
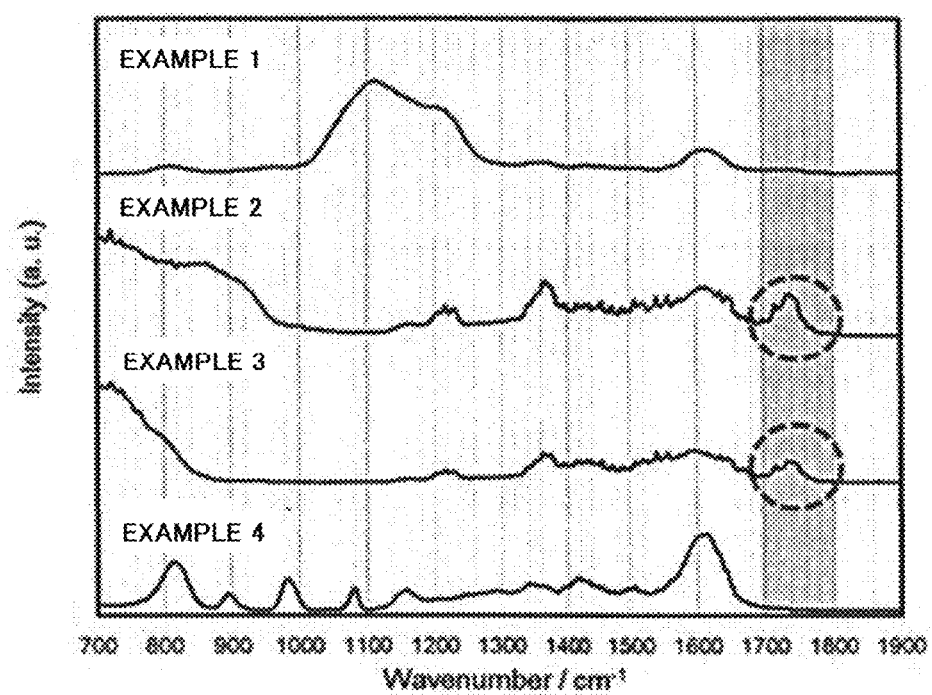
FIG. 5 is an IR spectral diagram of each of the organic-inorganic composites (1) to (4) obtained in Examples 1 to 4.

Further, a result obtained by performing the IR analysis of the resultant organic-inorganic composite (1) is shown in FIG. 5. According to FIG. 5, in the IR spectrum of the organic-inorganic composite (1), no peak is observed in the range of from 1,660 cm$^{-1}$ to 1,800 cm$^{-1}$ derived from a C═O structure, and hence the structure of the composite can be controlled to a high degree.

Figure 6:
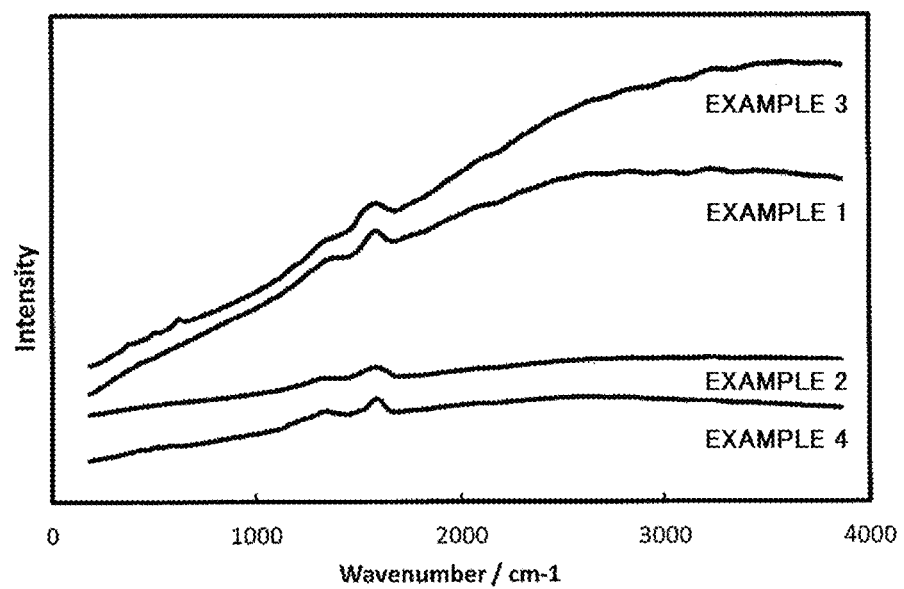
FIG. 6 is a Raman spectral diagram of each of the organic-inorganic composites (1) to (4) obtained in Examples 1 to 4.

Further, the Raman spectrum of the resultant organic-inorganic composite (1) is shown in FIG. 6. The Raman spectrum had peaks at 1,365 cm$^{-1}$, 1,590 cm$^{-1}$, 2,650 cm$^{-1}$, and 2,835 cm$^{-1}$, and hence it was found that the carbon material (1A) was a carbon material containing a carbon-based compound having graphene structures and having a structure in which the graphene structures were laminated.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 2]: Phloroglucinol+Alumina Particles+250° C.×1 Hour

An organic-inorganic composite (2) including a carbon material (2A) and an inorganic oxide (2B) was obtained in the same manner as in Example 1 except that the silica particles were changed to alumina particles (sample "JRC-ALO7" distributed for free by a general incorporated association "Catalysis Society of Japan", specific surface area: 180 m$^2$/g).

The organic-inorganic composite (2) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (2) are shown in FIG. 3 (XPS spectrum (C1s)) and Table 1. It is found from Table 1 that the organic-inorganic composite (2) is an organic-inorganic composite including a carbon material and an inorganic oxide. The ratio of the total amount of all carbon-oxygen bonds (C—O bonds and C═O bonds) to the total amount of all carbon bonds (a C—C bond, a C═C bond, a C—H bond, the C—O bonds, and the C═O bonds) was 29%, the ratio of the total amount of an ether-derived C—O bond and an alcohol-derived C—O bond to the total amount of all the carbon-oxygen bonds (the C—O bonds and the C=O bonds) was 59%, and the ratio of the total amount of the ether-derived C—O bond and the alcohol-derived C—O bond to the total amount of all the carbon bonds (the C—C bond, the C=C bond, the C—H bond, the C—O bonds, and the C=O bonds) was 17%. It is found from the foregoing that the composite has a high structure control ratio.

The result of DTA analysis in the TG-DTA analysis of the resultant organic-inorganic composite (2) is shown in FIG. 4. According to FIG. 4, when the organic-inorganic composite (2) was subjected to TG-DTA analysis under an air atmosphere and under a temperature increase condition of 10° C./min from 40° C., its oxidation start temperature represented by the rise-up temperature of the resultant DTA curve was 230° C. It is found from the foregoing that the composite has high oxidation resistance.

Further, a result obtained by performing the IR analysis of the resultant organic-inorganic composite (2) is shown in FIG. 5. According to FIG. 5, in the IR spectrum of the organic-inorganic composite (2), a peak is present in the range of from 1,660 $cm^{-1}$ to 1,800 $cm^{-1}$ derived from a C=O structure, and hence the composite has a high structure control ratio determined by the C1s XPS but has a somewhat low structure control ratio determined by the FT-IR analysis.

Further, the Raman spectrum of the resultant organic-inorganic composite (2) is shown in FIG. 6. The Raman spectrum had peaks at 1,340 $cm^{-1}$, 1,585 $cm^{-1}$, 2,650 $cm^{-1}$, and 2,835 $cm^{-1}$, and hence it was found that the carbon material (2A) was a carbon material containing a carbon-based compound having graphene structures and having a structure in which the graphene structures were laminated.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 3]: Phloroglucinol+Titania Particles+250° C.×1 Hour

An organic-inorganic composite (3) including a carbon material (3A) and an inorganic oxide (3B) was obtained in the same manner as in Example 1 except that the silica particles were changed to titania particles (sample "JRC-TIO-4(2)" distributed for free by a general incorporated association "Catalysis Society of Japan", specific surface area: 50 $m^2/g$).

The organic-inorganic composite (3) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (3) are shown in FIG. 3 (XPS spectrum (C1s)) and Table 1. It is found from Table 1 that the organic-inorganic composite (3) is an organic-inorganic composite including a carbon material and an inorganic oxide. The ratio of the total amount of all carbon-oxygen bonds (C—O bonds and C=O bonds) to the total amount of all carbon bonds (a C—C bond, a C=C bond, a C—H bond, the C—O bonds, and the C=O bonds) was 27%, the ratio of the total amount of an ether-derived C—O bond and an alcohol-derived C—O bond to the total amount of all the carbon-oxygen bonds (the C—O bonds and the C=O bonds) was 56%, and the ratio of the total amount of the ether-derived C—O bond and the alcohol-derived C—O bond to the total amount of all the carbon bonds (the C—C bond, the C=C bond, the C—H bond, the C—O bonds, and the C=O bonds) was 15%. It is found from the foregoing that the composite has a high structure control ratio.

The result of DTA analysis in the TG-DTA analysis of the resultant organic-inorganic composite (3) is shown in FIG. 4. According to FIG. 4, when the organic-inorganic composite (3) was subjected to TG-DTA analysis under an air atmosphere and under a temperature increase condition of 10° C./min from 40° C., its oxidation start temperature represented by the rise-up temperature of the resultant DTA curve was 200° C. It is found from the foregoing that the composite has high oxidation resistance.

Further, a result obtained by performing the IR analysis of the resultant organic-inorganic composite (3) is shown in FIG. 5. According to FIG. 5, in the IR spectrum of the organic-inorganic composite (3), a peak is present in the range of from 1,660 $cm^{-1}$ to 1,800 $cm^{-1}$ derived from a C=O structure, and hence the composite has a high structure control ratio determined by the C1s XPS but has a somewhat low structure control ratio determined by the FT-IR analysis.

Further, the Raman spectrum of the resultant organic-inorganic composite (3) is shown in FIG. 6. The Raman spectrum had peaks at 1,340 $cm^{-1}$, 1,580 $cm^{-1}$, 2,650 $cm^{-1}$, and 2,820 $cm^{-1}$, and hence it was found that the carbon material (3A) was a carbon material containing a carbon-based compound having graphene structures and having a structure in which the graphene structures were laminated.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 4]: Phloroglucinol+Heteropolyacid Particles (HPW)+250° C.×1 Hour

An organic-inorganic composite (4) including a carbon material (4A) and an inorganic oxide (4B) was obtained in the same manner as in Example 1 except that the silica particles were changed to HPW (manufactured by FUJIFILM Wako Pure Chemical Corporation, 12-tungsto(VI) phosphoric acid n-hydrate, specific surface area: 278 $m^2/g$) serving as heteropolyacid particles.

The organic-inorganic composite (4) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (4) are shown in FIG. 3 (XPS spectrum (C1s)) and Table 1. It is found from Table 1 that the organic-inorganic composite (4) is an organic-inorganic composite including a carbon material and an inorganic oxide. The ratio of the total amount of all carbon-oxygen bonds (C—O bonds and C=O bonds) to the total amount of all carbon bonds (a C—C bond, a C=C bond, a C—H bond, the C—O bonds, and the C=O bonds) was 29%, the ratio of the total amount of an ether-derived C—O bond and an alcohol-derived C—O bond to the total amount of all the carbon-oxygen bonds (the C—O bonds and the C═O bonds) was 76%, and the ratio of the total amount of the ether-derived C—O bond and the alcohol-derived C—O bond to the total amount of all the carbon bonds (the C—C bond, the C═C bond, the C—H bond, the C—O bonds, and the C═O bonds) was 22%. It is found from the foregoing that the composite has a high structure control ratio.

The result of DTA analysis in the TG-DTA analysis of the resultant organic-inorganic composite (4) is shown in FIG. 4. According to FIG. 4, when the organic-inorganic composite (4) was subjected to TG-DTA analysis under an air atmosphere and under a temperature increase condition of 10° C./min from 40° C., its oxidation start temperature represented by the rise-up temperature of the resultant DTA curve was 300° C. It is found from the foregoing that the composite has high oxidation resistance.

Further, a result obtained by performing the IR analysis of the resultant organic-inorganic composite (4) is shown in FIG. 5. According to FIG. 5, in the IR spectrum of the organic-inorganic composite (4), no peak is observed in the range of from 1,660 cm$^{-1}$ to 1,800 cm$^{-1}$ derived from a C═O structure, and hence the structure of the composite can be controlled to a high degree.

Further, the Raman spectrum of the resultant organic-inorganic composite (4) is shown in FIG. 6. The Raman spectrum had peaks at 1,350 cm$^{-1}$, 1,585 cm$^{-1}$, 2,650 cm$^{-1}$, and 2,810 cm$^{-1}$, and hence it was found that the carbon material (4A) was a carbon material containing a carbon-based compound having graphene structures and having a structure in which the graphene structures were laminated. In addition, the molecular weight of the carbon material (4A) portion was measured. As a result, the portion had a weight-average molecular weight of 8,000 and a maximum molecular weight of 50,000.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 5]: Phloroglucinol+Heteropolyacid Particles (HPMo+250°) C×1 Hour

An organic-inorganic composite (5) including a carbon material (5A) and an inorganic oxide (5B) was obtained in the same manner as in Example 1 except that the silica particles were changed to HPMo (manufactured by FUJIF-ILM Wako Pure Chemical Corporation, 12-molybdo(VI) phosphoric acid n-hydrate) serving as heteropolyacid particles.

The organic-inorganic composite (5) was dispersed in N-methylpyrrolidone (NMP), and the solubility of its carbon component was recognized by the approach described in the foregoing. As a result, the component was soluble in a solvent.

Figure 7:
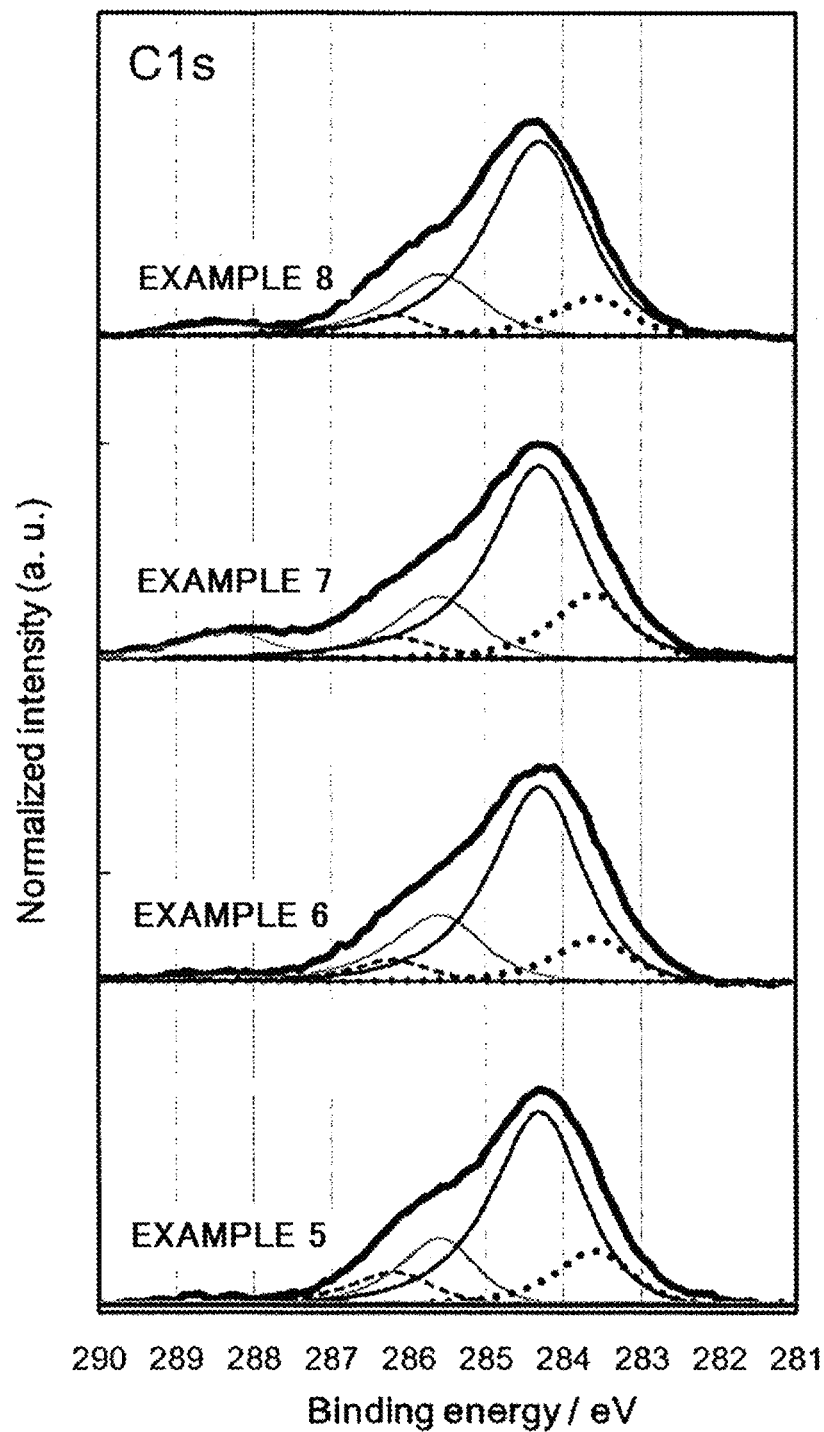
FIG. 7 is an XPS spectral (C1s) diagram of each of organic-inorganic composites (5) to (8) obtained in Examples 5 to 8.

The results of the C1s XPS analysis of the resultant organic-inorganic composite (5) are shown in FIG. 7 (XPS spectrum (C1s)) and Table 1. It is found from Table 1 that the organic-inorganic composite (5) is an organic-inorganic composite including a carbon material and an inorganic oxide. The ratio of the total amount of all carbon-oxygen bonds (C—O bonds and C═O bonds) to the total amount of all carbon bonds (a C—C bond, a C═C bond, a C—H bond, the C—O bonds, and the C═O bonds) was 27%, the ratio of the total amount of an ether-derived C—O bond and an alcohol-derived C—O bond to the total amount of all the carbon-oxygen bonds (the C—O bonds and the C═O bonds) was 63%, and the ratio of the total amount of the ether-derived C—O bond and the alcohol-derived C—O bond to the total amount of all the carbon bonds (the C—C bond, the C═C bond, the C—H bond, the C—O bonds, and the C═O bonds) was 17%. It is found from the foregoing that the composite has a high structure control ratio.

Figure 8:
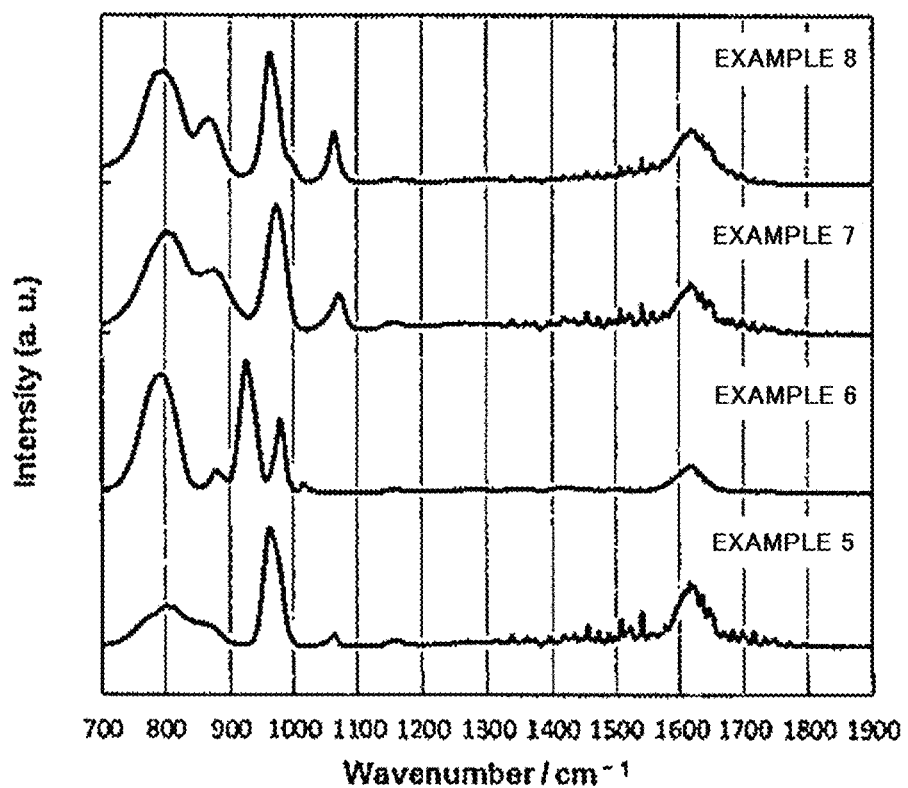
FIG. 8 is an IR spectral diagram of each of the organic-inorganic composites (5) to (8) obtained in Examples 5 to 8.

Further, a result obtained by performing the IR analysis of the resultant organic-inorganic composite (5) is shown in FIG. 8. According to FIG. 8, in the IR spectrum of the organic-inorganic composite (5), no peak is observed in the range of from 1,660 cm$^{-1}$ to 1,800 cm$^{-1}$ derived from a C═O structure, and hence the structure of the composite can be controlled to a high degree.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 6]: Phloroglucinol+Heteropolyacid Particles (HSiW)+250° C.×1 Hour

An organic-inorganic composite (6) including a carbon material (6A) and an inorganic oxide (6B) was obtained in the same manner as in Example 1 except that the silica particles were changed to HSiW (manufactured by Japan New Metals Co., Ltd., silicotungstic acid) serving as heteropolyacid particles.

The organic-inorganic composite (6) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (6) are shown in FIG. 7 (XPS spectrum (C1s)) and Table 1. It is found from Table 1 that the organic-inorganic composite (6) is an organic-inorganic composite including a carbon material and an inorganic oxide. The ratio of the total amount of all carbon-oxygen bonds (C—O bonds and C═O bonds) to the total amount of all carbon bonds (a C—C bond, a C═C bond, a C—H bond, the C—O bonds, and the C═O bonds) was 29%, the ratio of the total amount of an ether-derived C—O bond and an alcohol-derived C—O bond to the total amount of all the carbon-oxygen bonds (the C—O bonds and the C═O bonds) was 72%, and the ratio of the total amount of the ether-derived C—O bond and the alcohol-derived C—O bond to the total amount of all the carbon bonds (the C—C bond, the C═C bond, the C—H bond, the C—O bonds, and the C═O bonds) was 21%. It is found from the foregoing that the composite has a high structure control ratio.

Further, a result obtained by performing the IR analysis of the resultant organic-inorganic composite (6) is shown in FIG. 8. According to FIG. 8, in the IR spectrum of the organic-inorganic composite (6), no peak is observed in the range of from 1,660 cm$^{-1}$ to 1,800 cm$^{-1}$ derived from a C=O structure, and hence the structure of the composite can be controlled to a high degree.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 7]: Phloroglucinol+Heteropolyacid Particles (HPVMo+250°) C×1 Hour

An organic-inorganic composite (7) including a carbon material (7A) and an inorganic oxide (7B) was obtained in the same manner as in Example 1 except that the silica particles were changed to HPVMo (manufactured by Japan New Metals Co., Ltd., phosphovanadomolybdic acid) serving as heteropolyacid particles.

The organic-inorganic composite (7) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (7) are shown in FIG. 7 (XPS spectrum (C1s)) and Table 1. It is found from Table 1 that the organic-inorganic composite (7) is an organic-inorganic composite including a carbon material and an inorganic oxide. The ratio of the total amount of all carbon-oxygen bonds (C—O bonds and C=O bonds) to the total amount of all carbon bonds (a C—C bond, a C=C bond, a C—H bond, the C—O bonds, and the C=O bonds) was 29%, the ratio of the total amount of an ether-derived C—O bond and an alcohol-derived C—O bond to the total amount of all the carbon-oxygen bonds (the C—O bonds and the C=O bonds) was 55%, and the ratio of the total amount of the ether-derived C—O bond and the alcohol-derived C—O bond to the total amount of all the carbon bonds (the C—C bond, the C=C bond, the C—H bond, the C—O bonds, and the C=O bonds) was 16%. It is found from the foregoing that the composite has a high structure control ratio.

Further, a result obtained by performing the IR analysis of the resultant organic-inorganic composite (7) is shown in FIG. 8. According to FIG. 8, in the IR spectrum of the organic-inorganic composite (7), no peak is observed in the range of from 1,660 cm$^{-1}$ to 1,800 cm$^{-1}$ derived from a C=O structure, and hence the structure of the composite can be controlled to a high degree.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 8]: Phloroglucinol+Heteropolyacid Particles (HPWMo+250°) C×1 Hour

An organic-inorganic composite (8) including a carbon material (8A) and an inorganic oxide (8B) was obtained in the same manner as in Example 1 except that the silica particles were changed to HPWMo (manufactured by Japan New Metals Co., Ltd., phosphotungstomolybdic acid) serving as heteropolyacid particles.

The organic-inorganic composite (8) was dispersed in N-methylpyrrolidone (NMP), and the solubility of its carbon component was recognized by the approach described in the foregoing. As a result, the component was soluble in a solvent.

The results of the C1s XPS analysis of the resultant organic-inorganic composite (8) are shown in FIG. 7 (XPS spectrum (C1s)) and Table 1. It is found from Table 1 that the organic-inorganic composite (8) is an organic-inorganic composite including a carbon material and an inorganic oxide. The ratio of the total amount of all carbon-oxygen bonds (C—O bonds and C=O bonds) to the total amount of all carbon bonds (a C—C bond, a C=C bond, a C—H bond, the C—O bonds, and the C=O bonds) was 27%, the ratio of the total amount of an ether-derived C—O bond and an alcohol-derived C—O bond to the total amount of all the carbon-oxygen bonds (the C—O bonds and the C=O bonds) was 70%, and the ratio of the total amount of the ether-derived C—O bond and the alcohol-derived C—O bond to the total amount of all the carbon bonds (the C—C bond, the C=C bond, the C—H bond, the C—O bonds, and the C=O bonds) was 19%. It is found from the foregoing that the composite has a high structure control ratio.

Further, a result obtained by performing the IR analysis of the resultant organic-inorganic composite (8) is shown in FIG. 8. According to FIG. 8, in the IR spectrum of the organic-inorganic composite (8), no peak is observed in the range of from 1,660 cm$^{-1}$ to 1,800 cm$^{-1}$ derived from a C=O structure, and hence the structure of the composite can be controlled to a high degree.

As described above, according to the production method of the present invention, a carbon material-containing material, which is soluble in a solvent and has a precisely controlled structure, can be simply produced under a mild condition. In addition, as described above, according to the present invention, there can be provided an organic-inorganic composite, which is soluble in a solvent, has a precisely controlled structure, and can be industrially produced under a mild condition.

[Example 9]: Phloroglucinol+Silica Particles+300° C.×3 Hours, Hollow Carbon Fine Particles 300 Milligrams of phloroglucinol (manufactured by Tokyo Chemical Industry Co., Ltd., melting point: 220° C., condensation reaction temperature: 330° C.) was dissolved in 3 g of isopropyl alcohol, and 1,000 mg of silica spherical fine particles (manufactured by Nippon Shokubai Co., Ltd., average particle diameter: 0.19 μm) were added to the solution, followed by sufficient mixing of the contents by ultrasonic treatment.

Isopropyl alcohol was removed from the resultant mixture by normal-temperature vacuum drying, and the remaining massive product was shredded, followed by heating at 300° C. for 3 hours.

Thus, an organic-inorganic composite (9) including a carbon material (9A) and an inorganic oxide (9B) was obtained.

Figure 9:
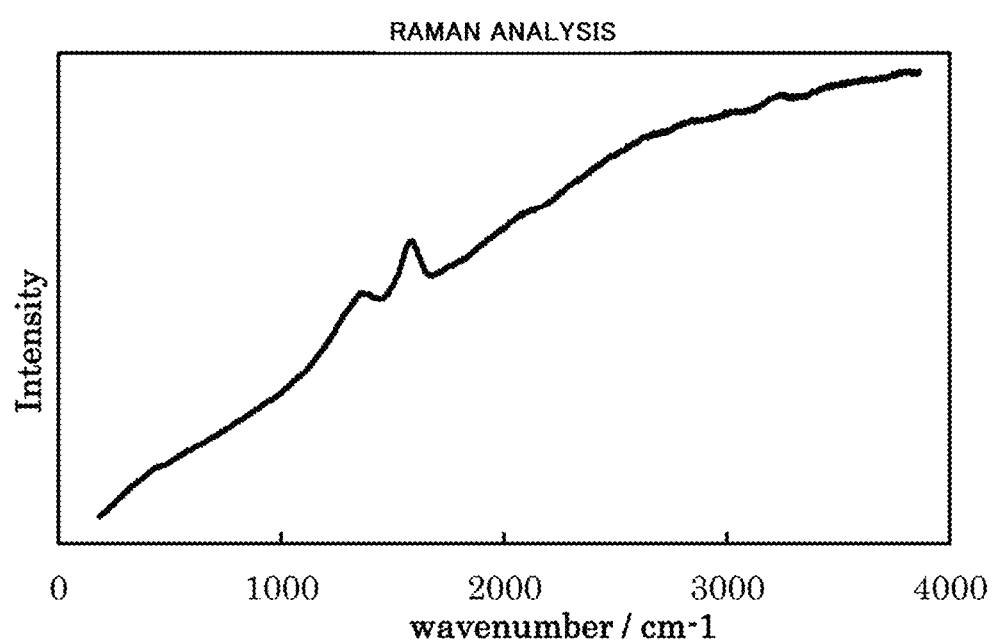
FIG. 9 is a Raman spectral diagram of an organic-inorganic composite (9) obtained in Example 9.

The Raman spectrum of the organic-inorganic composite (9) was shown in FIG. 9. The Raman spectrum had peaks at 1,375 cm$^{-1}$, 1,600 cm$^{-1}$, 2,700 cm$^{-1}$, and 2,890 cm$^{-1}$, and hence it was found that the carbon material (9A) was a carbon material containing a carbon-based compound having graphene structures and having a structure in which the graphene structures were laminated. In addition, the molecular weight of the carbon material (9A) portion was measured. As a result, the portion had a weight-average molecular weight of 200,000 and a maximum molecular weight of 1,100,000.

The resultant organic-inorganic composite (9) was treated with N-methylpyrrolidone (NMP). Thus, the carbon material (9A) was removed, and hence core-shell particles (9) (core portions: inorganic oxide particles, shell portions: carbon material bonding regions) in each of which the surface of the inorganic oxide (9B) was coated with the carbon material bonding region were obtained.

Figure 10:
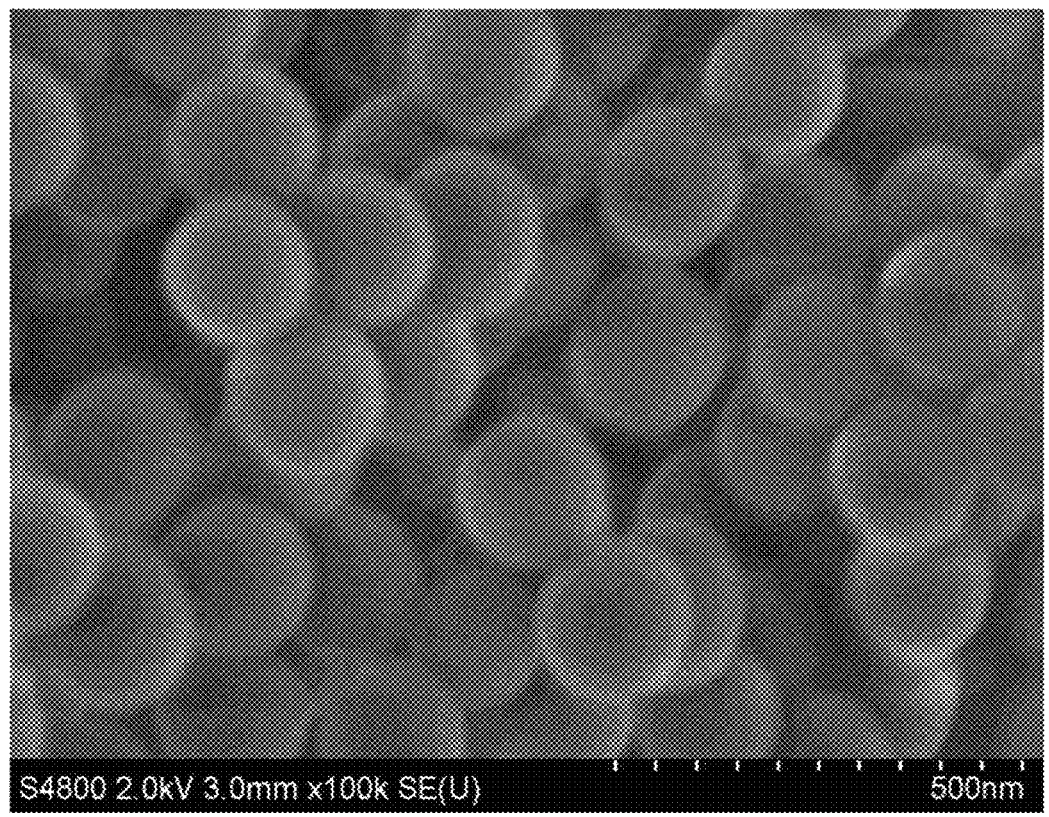
FIG. 10 is a SEM photographic view of highly carbonized core-shell particles (9) obtained in Example 9.
Figure 11:
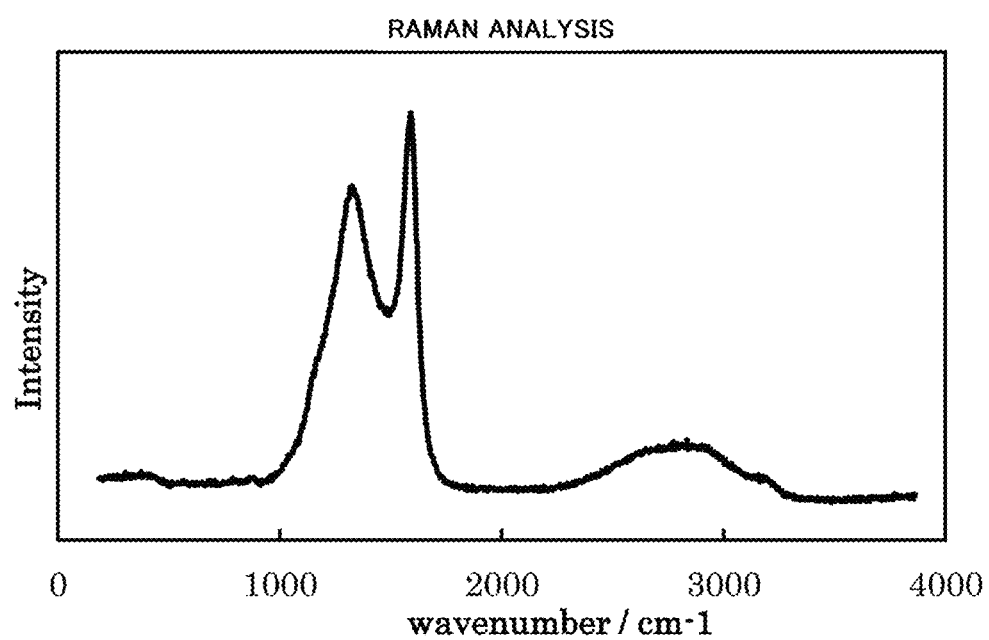
FIG. 11 is a Raman spectral diagram of the surfaces of the highly carbonized core-shell particles (9) obtained in Example 9.

The core-shell particles (9) were further calcined at 700° C. for 1 hour. Thus, the carbon material in each of the shell portions was highly carbonized, and hence highly carbonized core-shell particles (9) were obtained. A SEM photograph of the highly carbonized core-shell particles (9) was shown in FIG. 10, and the Raman spectrum of the surfaces of the highly carbonized core-shell particles (9) was shown in FIG. 11. It is found from FIG. 10 and FIG. 11 that the surfaces (shell portions) of the highly carbonized core-shell particles (9) each include a highly carbonized carbon material without impairing its shape.

Figure 12:
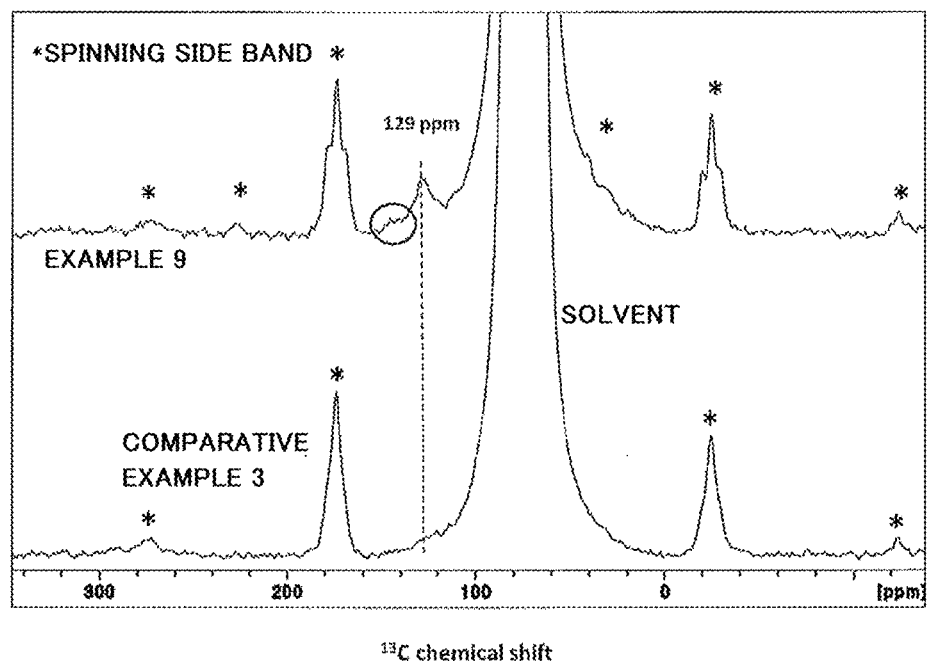
FIG. 12 is a $^{13}$C-NMR chart of each of the highly carbonized core-shell particles (9) obtained in Example 9 and particles obtained in Comparative Example 3.
Figure 13:
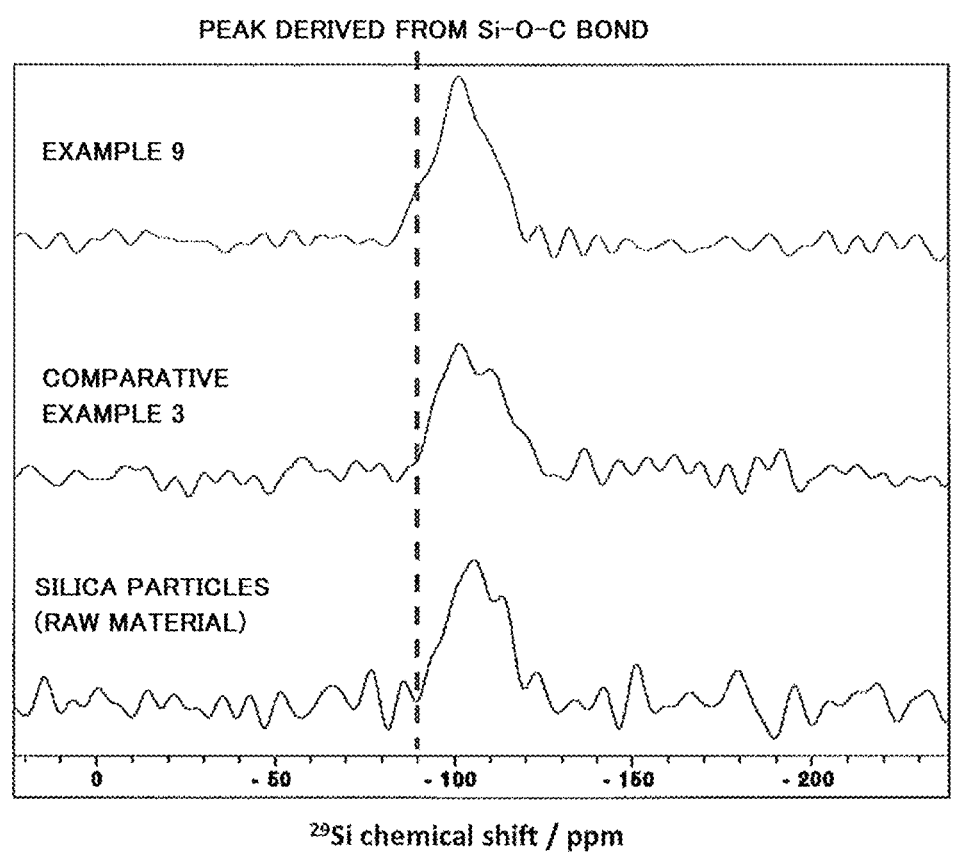
FIG. 13 is a $^{29}$Si-NMR chart of each of the highly carbonized core-shell particles (9) obtained in Example 9, the particles obtained in Comparative Example 3, and silica particles.

The results of the $^{13}$C-NMR analysis and $^{29}$Si-NMR analysis of the highly carbonized core-shell particles (9) were shown in FIG. 12 and FIG. 13, respectively. First, in the $^{13}$C-NMR, a peak at 129 ppm and a shoulder peak over the range of from 140 ppm to 160 ppm were able to be observed. The peaks are considered to be derived from the presence of sp2 carbon (129 ppm), and a bond between an oxygen atom on the surface of the inorganic matter and a carbon atom derived from the carbon material (140 ppm to 160 ppm). In Comparative Example 3 to be described later, it is assumed that no sp2 carbon is formed, and sp3 carbon is mainly formed and hides behind a solvent peak. In addition, in the $^{29}$Si-NMR, a peak derived from a Si—O—C bond was able to be clearly observed as compared to the silica spherical fine particles serving as a raw material and Comparative Example 3 to be described later. Accordingly, it was found that a covalent bond between a carbon atom derived from the carbon material and an atom on the outermost surface of the inorganic matter was formed. As described above, the carbon atom was covalently bonded only to the outermost surface of the inorganic matter. Accordingly, the intensity of the peak was small, and hence the peak was able to be observed as the shoulder peak.

The powder resistance of the highly carbonized core-shell particles (9) was measured to be $3 \times 10^5$ Ω·cm. The powder resistance of the silica spherical fine particles serving as a raw material was of the order of $10^{14}$ Ω·cm, and hence it was found that when the fine particles were turned into core-shell particles, their conductivity was able to be improved by a factor of about $10^9$.

The thicknesses of the carbon portions of the highly carbonized core-shell particles (9) were estimated from their TG-DTA analysis. A method for the estimation included: increasing the temperature of each of the silica spherical fine particles serving as a raw material and the highly carbonized core-shell particles (9) from room temperature to 1,000° C. at 10° C./min under an air atmosphere to burn the carbon component of the core-shell particles; and calculating a difference between the weights of the silica spherical fine particles serving as a raw material and the highly carbonized core-shell particles (9) after the burning to analyze the amount of the carbon component. According to the method, the content of the carbon component of the highly carbonized core-shell particles (9) was 1.39 wt %. When the diameter of each of the silica spherical fine particles was set to 0.19 μm, and the density of the carbon component was set to 2, the average thickness of the carbon component was calculated to be 0.49 nm.

500 Milligrams of the core-shell particles (9) were subjected to ultrasonic washing in a 10% aqueous solution of sodium hydroxide for 5 hours, and were filtered to provide 20 mg of hollow carbon fine particles (9). In consideration of the fact that the filtrate was colorless and transparent, and the amount of a removed product, only the carbon component remained, and an inorganic component in each of the core-shell particles was able to be removed. Probably because of the foregoing, the formation of the hollow carbon fine particles (9) each having a hollow structure was achieved.

[Example 10]: Phloroglucinol+Copper Particles+300° C.×2 Hours, Highly Carbonized Core-shell Particles 1 Gram of phloroglucinol (manufactured by Tokyo Chemical Industry Co., Ltd., melting point: 220° C., condensation reaction temperature: 330° C.) was dissolved in 200 g of acetone, and 20 g of copper particles (manufactured by ECKA Granules Germany GmbH, particle diameter: 95 vol % or more of the particles each had a particle diameter of 36 μm or less) were added to the solution, followed by sufficient mixing of the contents by ultrasonic treatment.

Acetone was removed from the resultant mixture by normal-temperature vacuum drying, and the remaining massive product was shredded, followed by heating at 300° C. for 2 hours.

Thus, an organic-inorganic composite (10) including a carbon material (10A) and an inorganic oxide (10B) was obtained.

The resultant organic-inorganic composite (10) was treated with N,N-dimethylformamide (DMF). Thus, the carbon material (10A) was removed, and hence core-shell particles (10) (core portions: inorganic oxide particles, shell portions: carbon material bonding regions) in each of which the surface of the inorganic oxide (10B) was coated with the carbon material bonding region were obtained.

Figure 14:
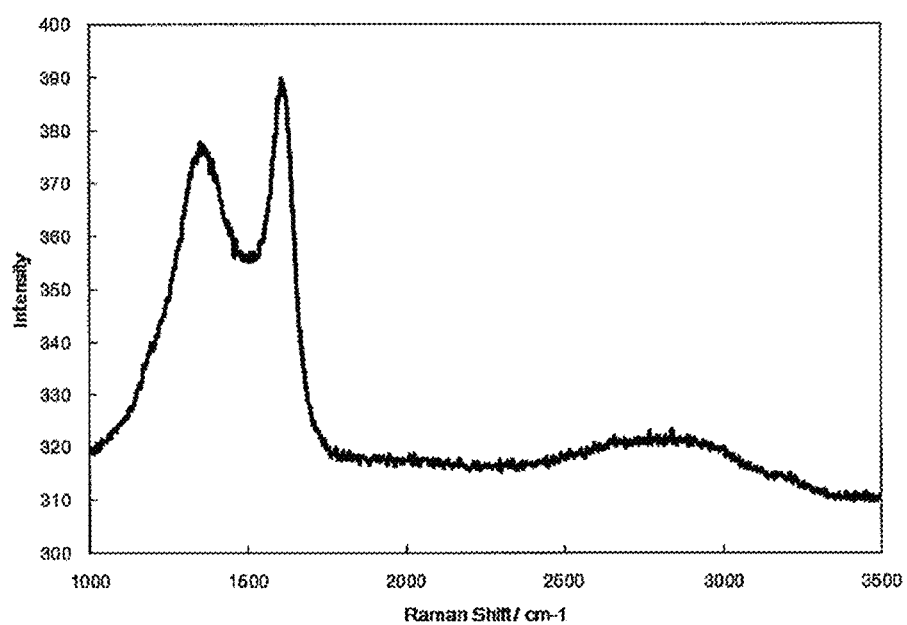
FIG. 14 is a Raman spectral diagram of the surfaces of highly carbonized core-shell particles (10) obtained in Example 10.

The core-shell particles (10) were further calcined at 700° C. for 1 hour. Thus, the carbon material in each of the shell portions was highly carbonized, and hence highly carbonized core-shell particles (10) were obtained. The Raman spectrum of the surfaces of the highly carbonized core-shell particles (10) was shown in FIG. 14. It is found from FIG. 14 that the surfaces (shell portions) of the highly carbonized core-shell particles (10) each include a highly carbonized carbon material without impairing its shape.

[Example 11]: Phloroglucinol+Aluminum Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of aluminum particles (manufactured by ECKA Granules Germany GmbH, D50=5 μm) were added to the solution. The contents were sufficiently mixed by ultrasonic treatment, and were dried to provide an aluminum particle-phloroglucinol mixed body. The mixed body was calcined under a nitrogen atmosphere with a Kugelrohr at 300° C. for 2 hours. Thus, an organic-inorganic composite (11) including a carbon material (11A) and an inorganic oxide (11B) was obtained.

The resultant organic-inorganic composite (11) was subjected to ultrasonic treatment in N,N-dimethylformamide (DMF), and the treated product was purified by removing the excess carbon material (11A) through filtration. Thus, core-shell particles (11) (core portions: inorganic oxide particles, shell portions: carbon material bonding regions) in each of which the surface of the inorganic oxide (11B) was coated with the carbon material bonding region were obtained.

Figure 15:
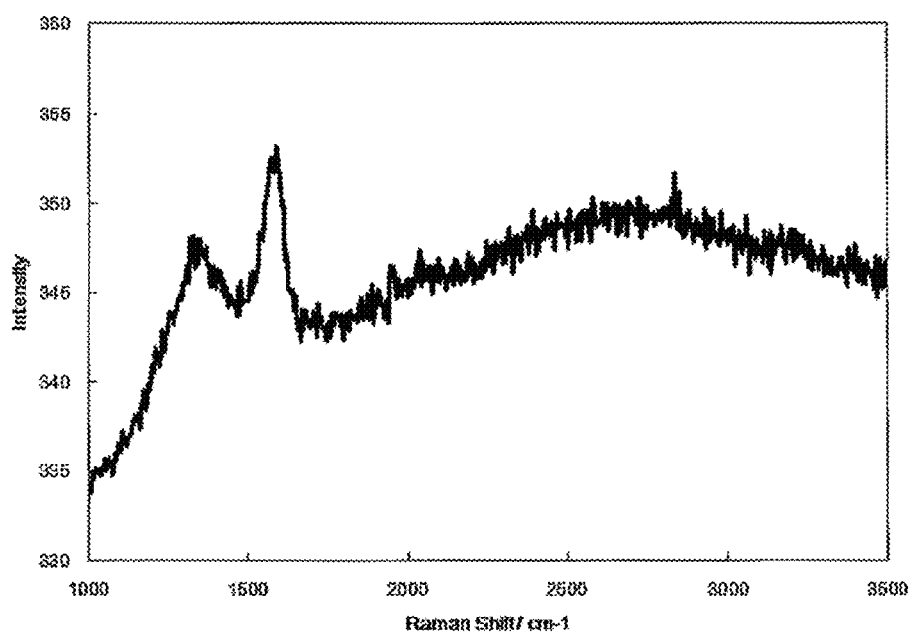
FIG. 15 is a Raman spectral diagram of the surfaces of highly carbonized core-shell particles (11) obtained in Example 11.

The core-shell particles (11) were further calcined at 600° C. for 2 hours. Thus, the carbon material in each of the shell portions was highly carbonized, and hence highly carbonized core-shell particles (11) were obtained. The Raman spectrum of the surfaces of the highly carbonized core-shell particles (11) was shown in FIG. 15. It is found from FIG. 15 that the surfaces (shell portions) of the highly carbonized core-shell particles (11) each include a highly carbonized carbon material without impairing its shape.

Figure 16:
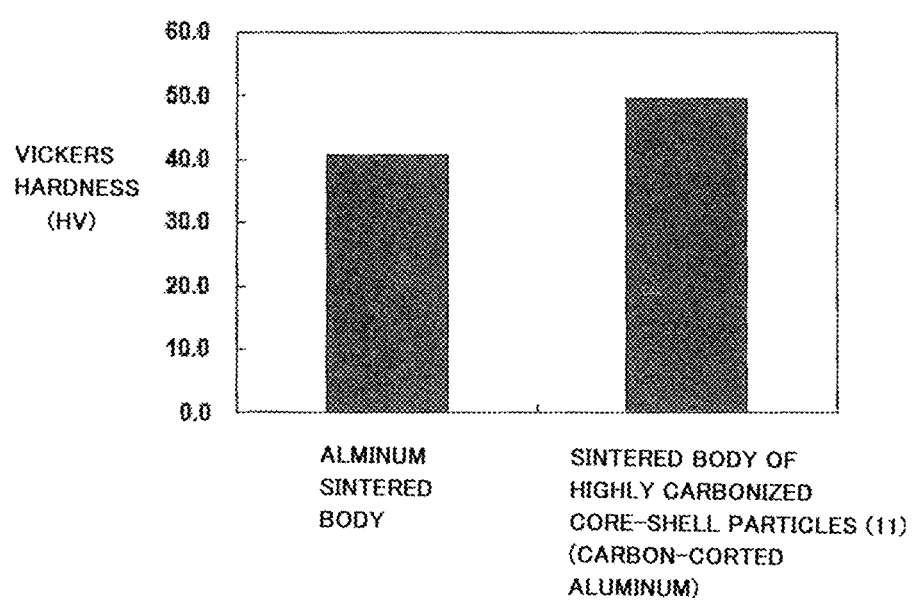
FIG. 16 is a graphical representation for comparing the Vickers hardnesses of a sintered body obtained by the SPS sintering of the highly carbonized core-shell particles (11) and a sintered body obtained by the SPS sintering of aluminum.

In addition, the resultant highly carbonized core-shell particles (11) were subjected to SPS sintering to provide an aluminum-carbon alloy sintered body. As comparison, the aluminum particles serving as a raw material were also subjected to SPS sintering to produce an aluminum sintered body. The Vickers hardnesses of the respective sintered bodies were determined. As a result, such a graph as shown in FIG. 16 was obtained, and hence it was found that in the case where core-shell particles produced by a carbon coating technology in the present invention were used, the particles were able to be improved in strength (hardness) when sintered. That is, the carbon material-containing material obtained by the production method of the present invention may be applied to an application where a strength is imparted to a sintered body (sintered body strength improver).

[Example 12]: Phloroglucinol+Barium Titanate Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of barium titanate particles (manufactured by FUJIFILM Wako Pure Chemical Corporation) were added to the solution. The contents were sufficiently mixed by ultrasonic treatment, and were dried to provide a barium titanate particle-phloroglucinol mixed body. The mixed body was calcined under a nitrogen atmosphere with a Kugelrohr at 300° C. for 2 hours. Thus, an organic-inorganic composite (12) including a carbon material (12A) and an inorganic oxide (12B) was obtained.

The resultant organic-inorganic composite (12) was subjected to ultrasonic treatment in N,N-dimethylformamide (DMF), and the treated product was purified by removing the excess carbon material (12A) through centrifugation. Thus, core-shell particles (12) (core portions: inorganic oxide particles, shell portions: carbon material bonding regions) in each of which the surface of the inorganic oxide (12B) was coated with the carbon material bonding region were obtained.

Figure 17:
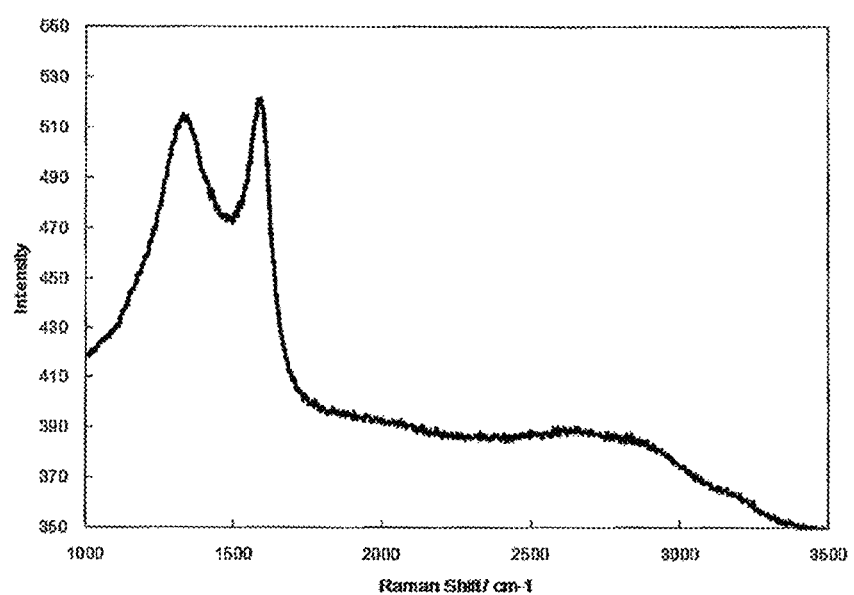
FIG. 17 is a Raman spectral diagram of the surfaces of highly carbonized core-shell particles (12) obtained in Example 12.

The core-shell particles (12) were further calcined at 700° C. for 2 hours. Thus, the carbon material in each of the shell portions was highly carbonized, and hence highly carbonized core-shell particles (12) were obtained. The Raman spectrum of the surfaces of the highly carbonized core-shell particles (12) was shown in FIG. 17. It is found from FIG. 17 that the surfaces (shell portions) of the highly carbonized core-shell particles (12) each include a highly carbonized carbon material without impairing its shape.

[Example 13]: Phloroglucinol+Strontium Titanate Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of strontium titanate particles (manufactured by Sigma-Aldrich, Inc.) were added to the solution. The contents were sufficiently mixed by ultrasonic treatment, and were dried to provide a strontium titanate particle-phloroglucinol mixed body. The mixed body was calcined under a nitrogen atmosphere with a Kugelrohr at 300° C. for 2 hours. Thus, an organic-inorganic composite (13) including a carbon material (13A) and an inorganic oxide (13B) was obtained.

The resultant organic-inorganic composite (13) was subjected to ultrasonic treatment in N,N-dimethylformamide (DMF), and the treated product was purified by removing the excess carbon material (13A) through centrifugation. Thus, core-shell particles (13) (core portions: inorganic oxide particles, shell portions: carbon material bonding regions) in each of which the surface of the inorganic oxide (13B) was coated with the carbon material bonding region were obtained.

Figure 18:
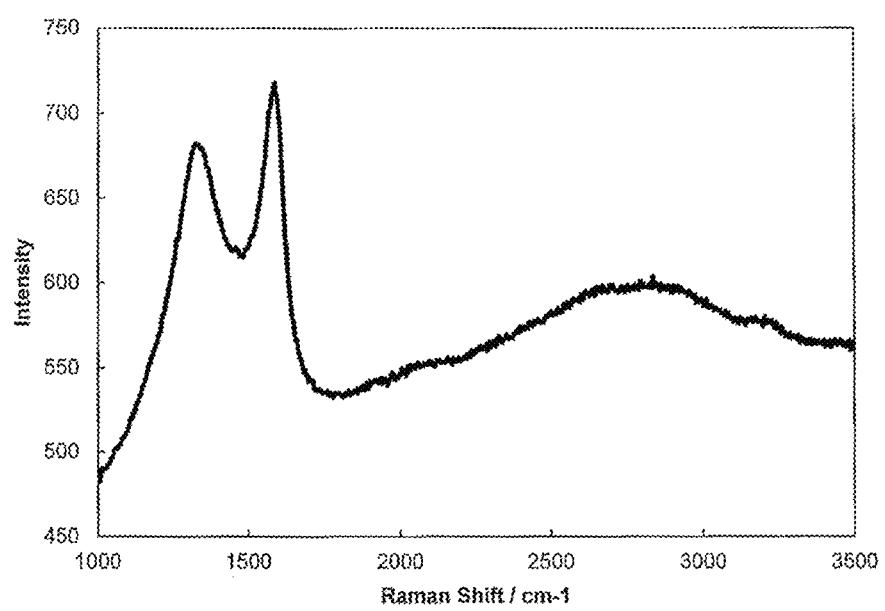
FIG. 18 is a Raman spectral diagram of the surfaces of highly carbonized core-shell particles (13) obtained in Example 13.

The core-shell particles (13) were further calcined at 700° C. for 2 hours. Thus, the carbon material in each of the shell portions was highly carbonized, and hence highly carbonized core-shell particles (13) were obtained. The Raman spectrum of the surfaces of the highly carbonized core-shell particles (13) was shown in FIG. 18. It is found from FIG. 18 that the surfaces (shell portions) of the highly carbonized core-shell particles (13) each include a highly carbonized carbon material without impairing its shape.

[Example 14]: Phloroglucinol+Lithium Niobate Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of lithium niobate particles (manufactured by Sigma-Aldrich, Inc.) were added to the solution. The contents were sufficiently mixed by ultrasonic treatment, and were dried to provide a lithium niobate particle-phloroglucinol mixed body. The mixed body was calcined under a nitrogen atmosphere with a Kugelrohr at 300° C. for 2 hours. Thus, an organic-inorganic composite (14) including a carbon material (14A) and an inorganic oxide (14B) was obtained.

The resultant organic-inorganic composite (14) was subjected to ultrasonic treatment in N,N-dimethylformamide (DMF), and the treated product was purified by removing the excess carbon material (14A) through filtration. Thus, core-shell particles (14) (core portions: inorganic oxide particles, shell portions: carbon material bonding regions) in each of which the surface of the inorganic oxide (14B) was coated with the carbon material bonding region were obtained.

Figure 19:
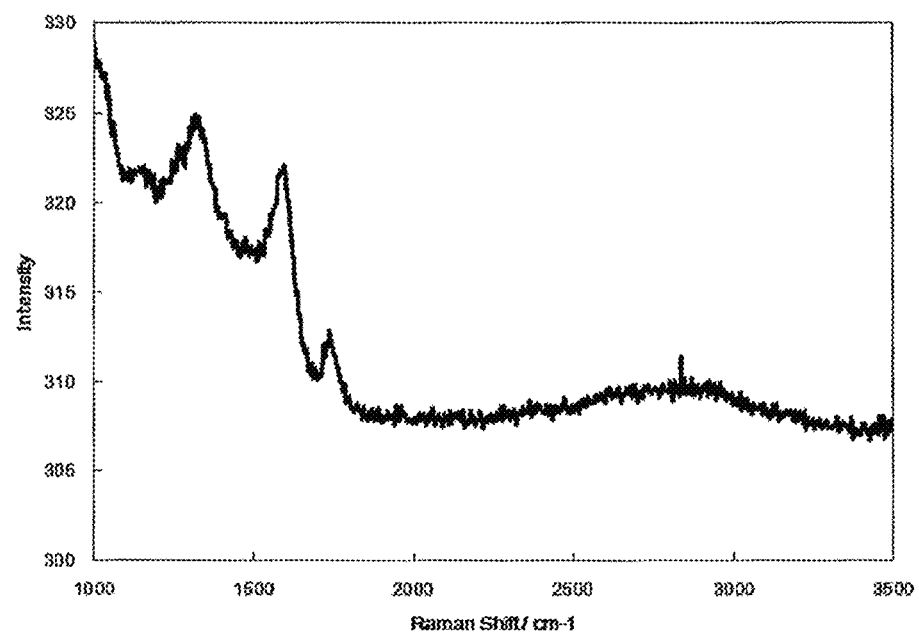
FIG. 19 is a Raman spectral diagram of the surfaces of highly carbonized core-shell particles (14) obtained in Example 14.

The core-shell particles (14) were further calcined at 700° C. for 2 hours. Thus, the carbon material in each of the shell portions was highly carbonized, and hence highly carbonized core-shell particles (14) were obtained. The Raman spectrum of the surfaces of the highly carbonized core-shell particles (14) was shown in FIG. 19. It is found from FIG. 19 that the surfaces (shell portions) of the highly carbonized core-shell particles (14) each include a highly carbonized carbon material without impairing its shape.

[Example 15]: Phloroglucinol+Silicon Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of silicon particles (manufactured by YY Company) were added to the solution. The contents were sufficiently mixed by ultrasonic treatment, and were dried to provide a silicon particle-phloroglucinol mixed body. The mixed body was calcined under a nitrogen atmosphere with a Kugelrohr at 300° C. for 2 hours. Thus, an organic-inorganic composite (15) including a carbon material (15A) and an inorganic oxide (15B) was obtained.

The resultant organic-inorganic composite (15) was subjected to ultrasonic treatment in N,N-dimethylformamide (DMF), and the treated product was purified by removing the excess carbon material (15A) through centrifugation. Thus, core-shell particles (15) (core portions: inorganic oxide particles, shell portions: carbon material bonding regions) in each of which the surface of the inorganic oxide (15B) was coated with the carbon material bonding region were obtained.

Figure 20:
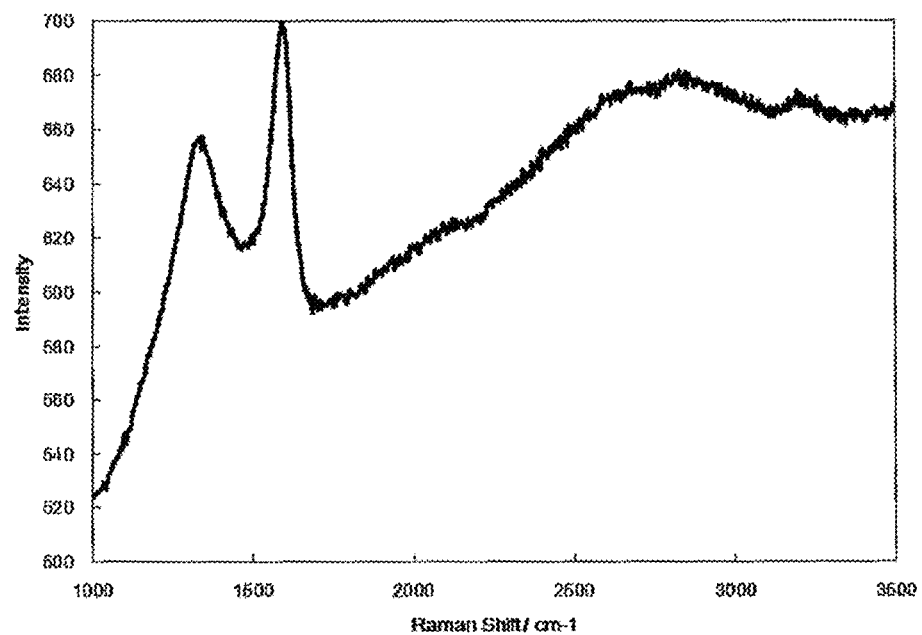
FIG. 20 is a Raman spectral diagram of the surfaces of highly carbonized core-shell particles (15) obtained in Example 15.

The core-shell particles (15) were further calcined at 700° C. for 2 hours. Thus, the carbon material in each of the shell portions was highly carbonized, and hence highly carbonized core-shell particles (15) were obtained. The Raman spectrum of the surfaces of the highly carbonized core-shell particles (15) was shown in FIG. 20. It is found from FIG. 20 that the surfaces (shell portions) of the highly carbonized core-shell particles (15) each include a highly carbonized carbon material without impairing its shape.

[Example 16]: Phloroglucinol+Boron Nitride Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of boron nitride particles (manufactured by Showa Denko K.K.) were added to the solution. The contents were sufficiently mixed by ultrasonic treatment, and were dried to provide a boron nitride particle-phloroglucinol mixed body. The mixed body was calcined under a nitrogen atmosphere with a Kugelrohr at 300° C. for 2 hours. Thus, an organic-inorganic composite (16) including a carbon material (16A) and an inorganic oxide (16B) was obtained.

The resultant organic-inorganic composite (16) was subjected to ultrasonic treatment in N,N-dimethylformamide (DMF), and the treated product was purified by removing the excess carbon material (16A) through filtration. Thus, core-shell particles (16) (core portions: inorganic oxide particles, shell portions: carbon material bonding regions) in each of which the surface of the inorganic oxide (16B) was coated with the carbon material bonding region were obtained.

Figure 21:
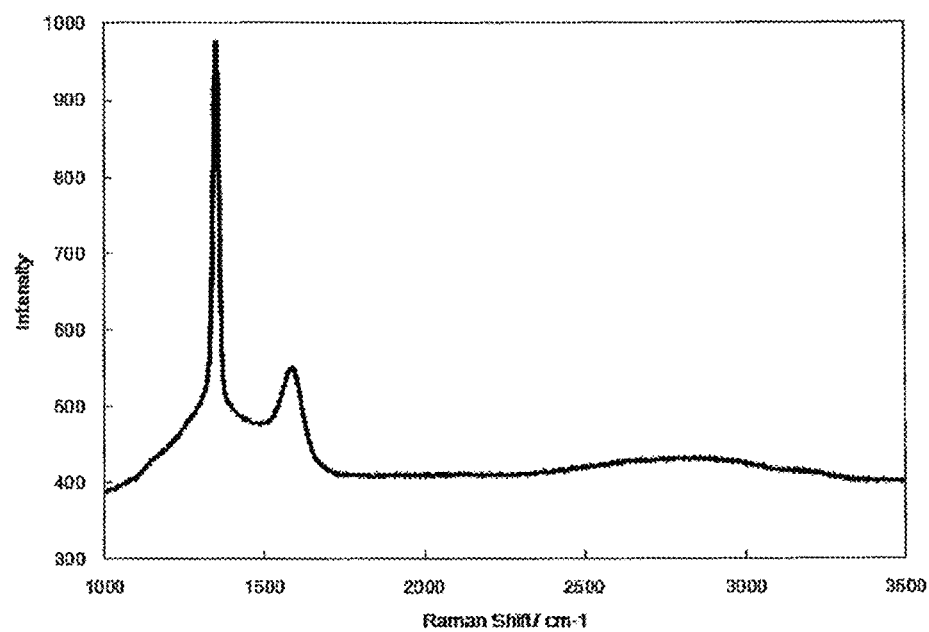
FIG. 21 is a Raman spectral diagram of the surfaces of highly carbonized core-shell particles (16) obtained in Example 16.

The core-shell particles (16) were further calcined at 700° C. for 2 hours. Thus, the carbon material in each of the shell portions was highly carbonized, and hence highly carbonized core-shell particles (16) were obtained. The Raman spectrum of the surfaces of the highly carbonized core-shell particles (16) was shown in FIG. 21. It is found from FIG. 21 that the surfaces (shell portions) of the highly carbonized core-shell particles (16) each include a highly carbonized carbon material without impairing its shape.

[Example 17]: Phloroglucinol+Alumina Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of alumina particles (manufactured by Showa Denko K.K.) were added to the solution. The contents were sufficiently mixed by ultrasonic treatment, and were dried to provide an alumina particle-phloroglucinol mixed body. The mixed body was calcined under a nitrogen atmosphere with a Kugelrohr at 300° C. for 2 hours. Thus, an organic-inorganic composite (17) including a carbon material (17A) and an inorganic oxide (17B) was obtained.

The resultant organic-inorganic composite (17) was subjected to ultrasonic treatment in N,N-dimethylformamide (DMF), and the treated product was purified by removing the excess carbon material (17A) through filtration. Thus, core-shell particles (17) (core portions: inorganic oxide particles, shell portions: carbon material bonding regions) in each of which the surface of the inorganic oxide (17B) was coated with the carbon material bonding region were obtained.

Figure 22:
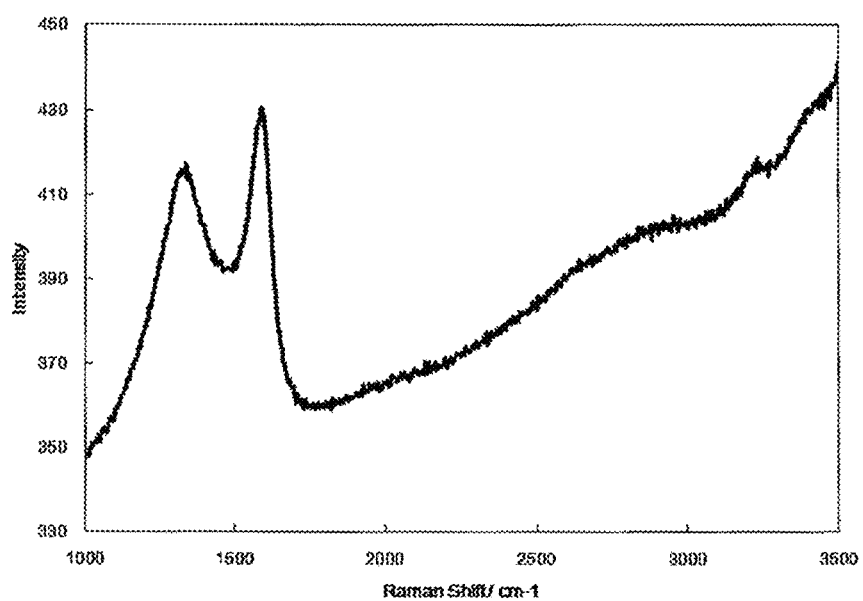
FIG. 22 is a Raman spectral diagram of the surfaces of highly carbonized core-shell particles (17) obtained in Example 17.

The core-shell particles (17) were further calcined at 700° C. for 2 hours. Thus, the carbon material in each of the shell portions was highly carbonized, and hence highly carbonized core-shell particles (17) were obtained. The Raman spectrum of the surfaces of the highly carbonized core-shell particles (17) was shown in FIG. 22. It is found from FIG. 22 that the surfaces (shell portions) of the highly carbonized core-shell particles (17) each include a highly carbonized carbon material without impairing its shape.

In addition, the resultant highly carbonized core-shell particles (17) and the alumina particles serving as a raw material were used to provide a mixture "polymethyl methacrylate (PMMA)/alumina" and a mixture "PMMA/highly carbonized core-shell particles (17)" as follows: the PMMA and the alumina particles serving as a raw material were mixed in DMF so that a volume ratio "PMMA:alumina particles" became 1:2, followed by drying to provide the former mixture; and the PMMA and the highly carbonized core-shell particles (17) were mixed in DMF so that a volume ratio "PMMA:highly carbonized core-shell particles (17)" became 1:2, followed by drying to provide the latter mixture. The heat-conducting characteristics of the respective mixtures in their thickness directions were analyzed. As a result, it was found that the use of the highly carbonized core-shell particles (17) achieved an improvement in thermal conductivity as shown in Table 2. The specific heat and density of each of the mixtures were calculated from the mixing ratio, and their values used here were 920 J/kg·K and 3,000 kg/m$^3$, respectively. That is, the organic-inorganic composite of the present invention may be applied to an application where a heat-conducting characteristic is improved (heat-conducting characteristic improver).

[Example 18]: Phloroglucinol+Magnesium Oxide Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of magnesium oxide particles (MgO manufactured by Ube Industries, Ltd.) were added to the solution. The contents were sufficiently mixed by ultrasonic treatment, and were dried to provide a magnesium oxide particle-phloroglucinol mixed body. The mixed body was calcined under a nitrogen atmosphere with a Kugelrohr at 300° C. for 2 hours. Thus, an organic-inorganic composite (18) including a carbon material (18A) and an inorganic oxide (18B) was obtained.

The resultant organic-inorganic composite (18) was subjected to ultrasonic treatment in N,N-dimethylformamide (DMF), and the treated product was purified by removing the excess carbon material (18A) through centrifugation. Thus, core-shell particles (18) (core portions: inorganic oxide particles, shell portions: carbon material bonding regions) in each of which the surface of the inorganic oxide (18B) was coated with the carbon material bonding region were obtained.

Figure 23:
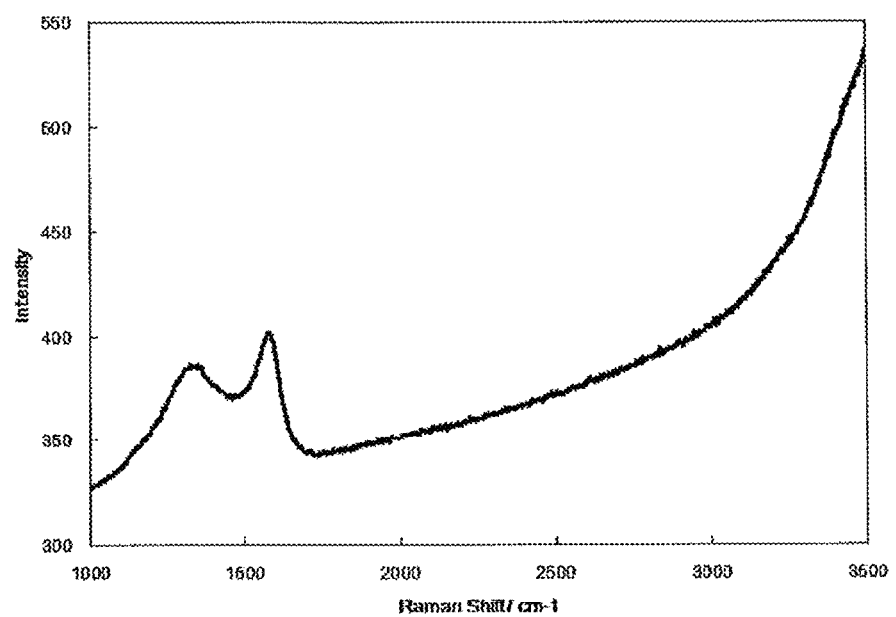
FIG. 23 is a Raman spectral diagram of the surfaces of highly carbonized core-shell particles (18) obtained in Example 18.

The core-shell particles (18) were further calcined at 700° C. for 2 hours. Thus, the carbon material in each of the shell portions was highly carbonized, and hence highly carbonized core-shell particles (18) were obtained. The Raman spectrum of the surfaces of the highly carbonized core-shell particles (18) was shown in FIG. 23. It is found from FIG. 23 that the surfaces (shell portions) of the highly carbonized core-shell particles (18) each include a highly carbonized carbon material without impairing its shape.

[Example 19]: Phloroglucinol+Aluminum Nitride Particles+300° C.×2 Hours, Highly Carbonized Core-Shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of aluminum nitride particles (manufactured by Tokuyama Corporation) were added to the solution. The contents were sufficiently mixed by ultrasonic treatment, and were dried to provide an aluminum nitride particle-phloroglucinol mixed body. The mixed body was calcined under a nitrogen atmosphere with a Kugelrohr at 300° C. for 2 hours. Thus, an organic-inorganic composite (19) including a carbon material (19A) and an inorganic oxide (19B) was obtained.

The resultant organic-inorganic composite (19) was subjected to ultrasonic treatment in N,N-dimethylformamide (DMF), and the treated product was purified by removing the excess carbon material (19A) through centrifugation. Thus, core-shell particles (19) (core portions: inorganic oxide particles, shell portions: carbon material bonding regions) in each of which the surface of the inorganic oxide (19B) was coated with the carbon material bonding region were obtained.

Figure 24:
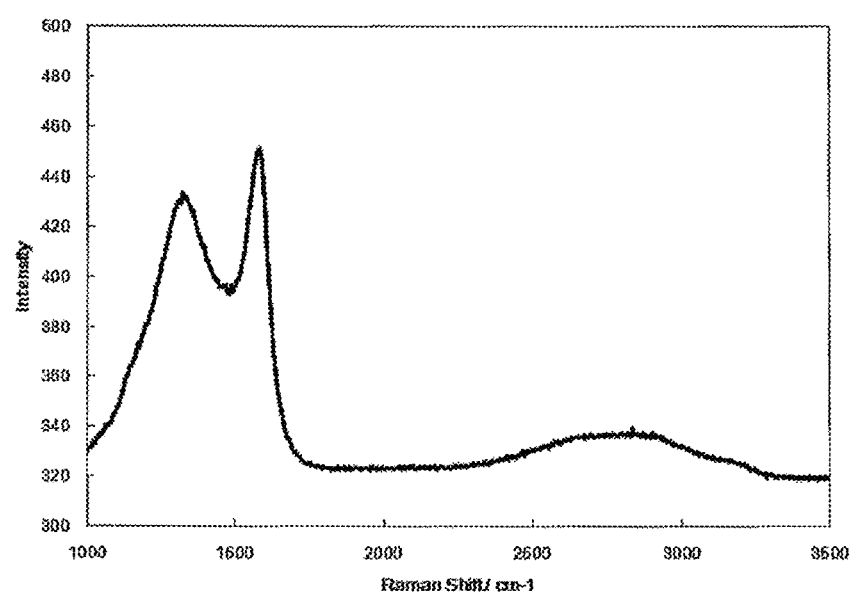
FIG. 24 is a Raman spectral diagram of the surfaces of highly carbonized core-shell particles (19) obtained in Example 19.

The core-shell particles (19) were further calcined at 700° C. for 2 hours. Thus, the carbon material in each of the shell portions was highly carbonized, and hence highly carbonized core-shell particles (19) were obtained. The Raman spectrum of the surfaces of the highly carbonized core-shell particles (19) was shown in FIG. 24. It is found from FIG. 24 that the surfaces (shell portions) of the highly carbonized core-shell particles (19) each include a highly carbonized carbon material without impairing its shape.

[Example 20]: Phloroglucinol+Lithium Iron Phosphate Particles+300° C.×2 Hours, Highly Carbonized Core-shell Particles 0.2 Gram of phloroglucinol (manufactured by Tokyo Chemical Industry Co., Ltd., melting point: 220° C., condensation reaction temperature: 330° C.) was dissolved in 200 g of acetone, and 2 g of lithium iron phosphate particles (manufactured by Toshima Manufacturing Co., Ltd.) were added to the solution. The contents were sufficiently mixed by ultrasonic treatment, and were dried to provide a lithium iron phosphate particle-phloroglucinol mixed body. The mixed body was calcined under a nitrogen atmosphere with a Kugelrohr at 300° C. for 2 hours. Thus, an organic-inorganic composite (20) including a carbon material (20A) and an inorganic oxide (20B) was obtained.

The resultant organic-inorganic composite (20) was subjected to ultrasonic treatment in N,N-dimethylformamide (DMF), and the treated product was purified by removing the excess carbon material (20A) through centrifugation. Thus, core-shell particles (20) (core portions: inorganic oxide particles, shell portions: carbon material bonding regions) in each of which the surface of the inorganic oxide (20B) was coated with the carbon material bonding region were obtained.

Figure 25:
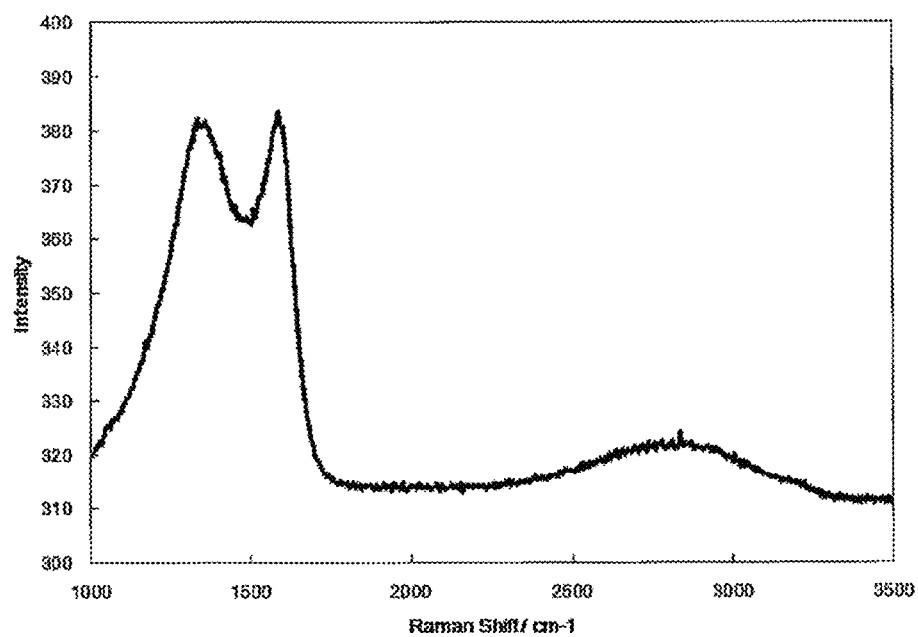
FIG. 25 is a Raman spectral diagram of the surfaces of highly carbonized core-shell particles (20) obtained in Example 20.

The core-shell particles (20) were further calcined at 700° C. for 2 hours. Thus, the carbon material in each of the shell portions was highly carbonized, and hence highly carbonized core-shell particles (20) were obtained. The Raman spectrum of the surfaces of the highly carbonized core-shell particles (20) was shown in FIG. 25. It is found from FIG. 25 that the surfaces (shell portions) of the highly carbonized core-shell particles (20) each include a highly carbonized carbon material without impairing its shape.

[Example 21]: Phloroglucinol+Silica Particles+250° C.×2 Hours, Highly Carbonized Core-shell Particles, Different Solvent 1 Gram of phloroglucinol (manufactured by Tokyo Chemical Industry Co., Ltd., melting point: 220° C., condensation reaction temperature: 330° C.) was dissolved in 30 g of acetone, and 10 g of silica spherical fine particles (manufactured by Nippon Shokubai Co., Ltd., average particle diameter: 0.19 μm) were added to the solution, followed by sufficient mixing of the contents by ultrasonic treatment.

Acetone was removed from the resultant mixture by normal-temperature vacuum drying, and the remaining massive product was shredded, followed by heating at 250° C. for 2 hours.

Thus, an organic-inorganic composite (21) including a carbon material (21A) and an inorganic oxide (21B) was obtained.

Figure 26:
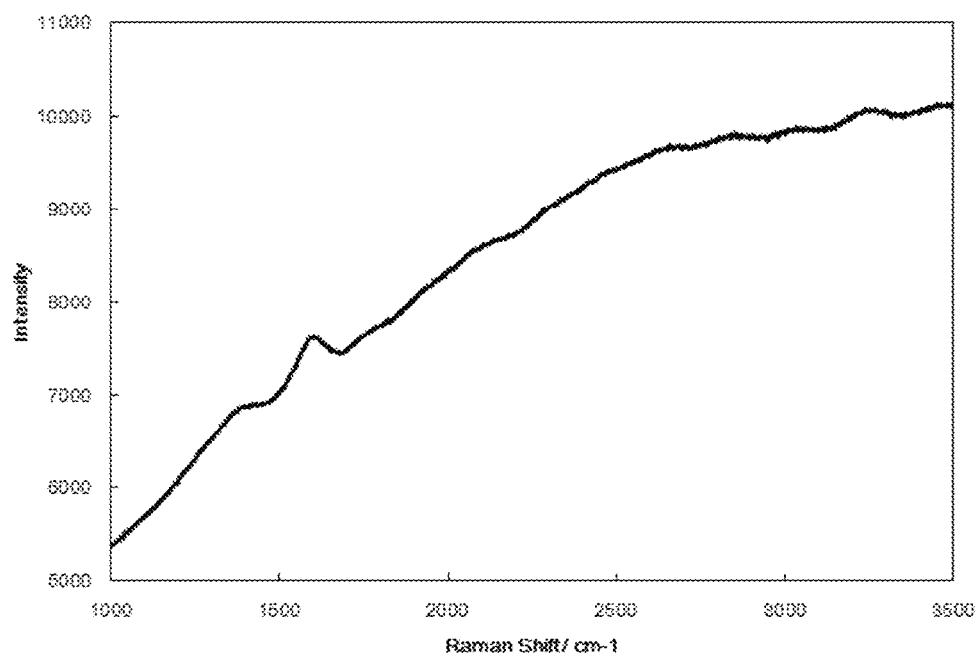
FIG. 26 is a Raman spectral diagram of the surface of an organic-inorganic composite (21) obtained in Example 21.

The Raman spectrum of the organic-inorganic composite (21) was shown in FIG. 26. It was found that the carbon material (21A) was a carbon material containing a carbon-based compound having graphene structures and having a structure in which the graphene structures were laminated.

The resultant organic-inorganic composite (21) was subjected to ultrasonic treatment in acetone, and the treated product was purified by removing the excess carbon material (21A) through centrifugation. Thus, core-shell particles (21) (core portions: inorganic oxide particles, shell portions: carbon material bonding regions) in each of which the surface of the inorganic oxide (21B) was coated with the carbon material bonding region were obtained.

Figure 27:
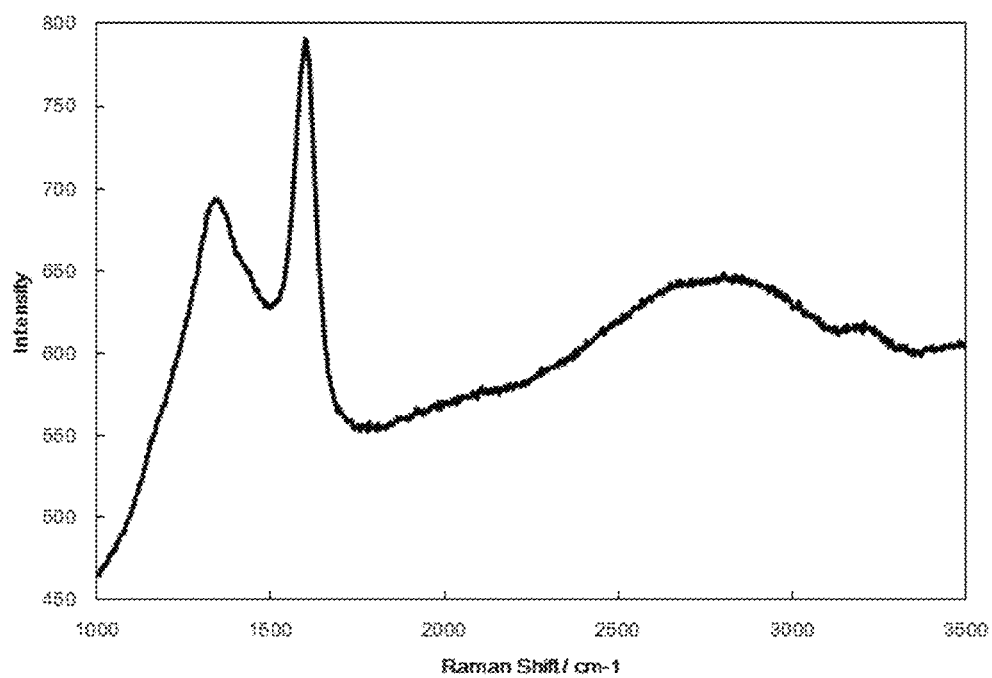
FIG. 27 is a Raman spectral diagram of the surfaces of highly carbonized core-shell particles (21) obtained in Example 21.

The core-shell particles (21) were further calcined at 700° C. for 1 hour. Thus, the carbon material in each of the shell portions was highly carbonized, and hence highly carbonized core-shell particles (21) were obtained. The Raman spectrum of the surfaces of the highly carbonized core-shell particles (21) was shown in FIG. 27.

Figure 28:
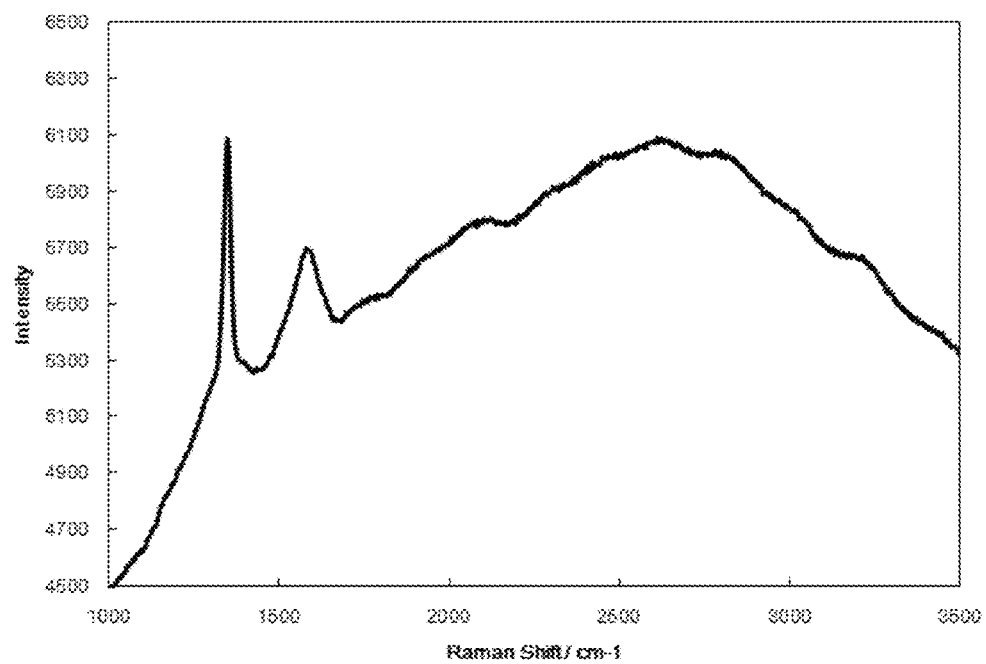
FIG. 28 is a Raman spectral diagram of the surface of an organic-inorganic composite (22) obtained in Example 22.
Figure 29:
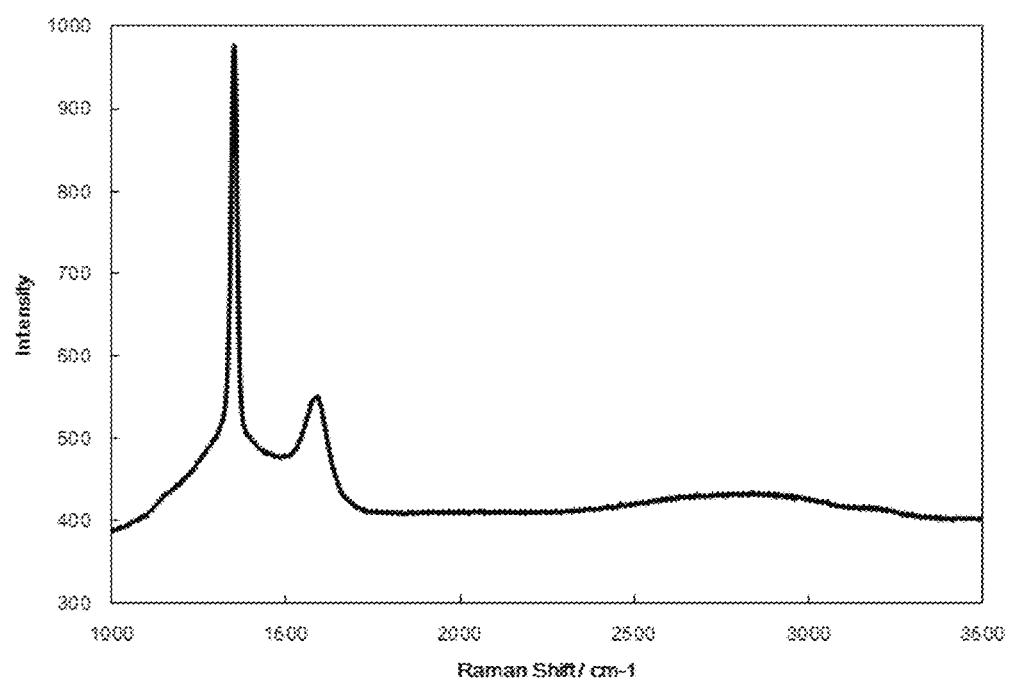
FIG. 29 is a Raman spectral diagram of the surfaces of highly carbonized core-shell particles (22) obtained in Example 22.

[Example 22]: Phloroglucinol+Boron Nitride+250° C.×2 Hours, Highly Carbonized Core-shell Particles, Different Solvent An organic-inorganic composite (22), core-shell particles (22), and highly carbonized core-shell particles (22) were each obtained in the same manner as in Example 21 except that boron nitride was used as a raw material. The Raman spectra of the organic-inorganic composite (22) and the highly carbonized core-shell particles (22) were shown in FIG. 28 and FIG. 29, respectively. As can be seen from Examples 21 and 22, the solvent to be used was able to be changed through an operation such as calcination temperature adjustment.

[Example 23]: Hexahydroxytriphenylene+Silica Particles+350° C.×2 Hours, Highly Carbonized Core-shell Particles, Different Raw Material 1 Gram of 2,3,6,7,10,11-hexahydroxytriphenylene (manufactured by Tokyo Chemical Industry Co., Ltd., melting point: none, condensation reaction temperature: 430° C.) was dissolved in 30 g of DMF, and 10 g of silica spherical fine particles (manufactured by Nippon Shokubai Co., Ltd., average particle diameter: 0.19 μm) were added to the solution, followed by sufficient mixing of the contents by ultrasonic treatment.

DMF was removed from the resultant mixture with an evaporator, and the remaining massive product was shredded, followed by heating at 350° C. for 2 hours.

Figure 30:
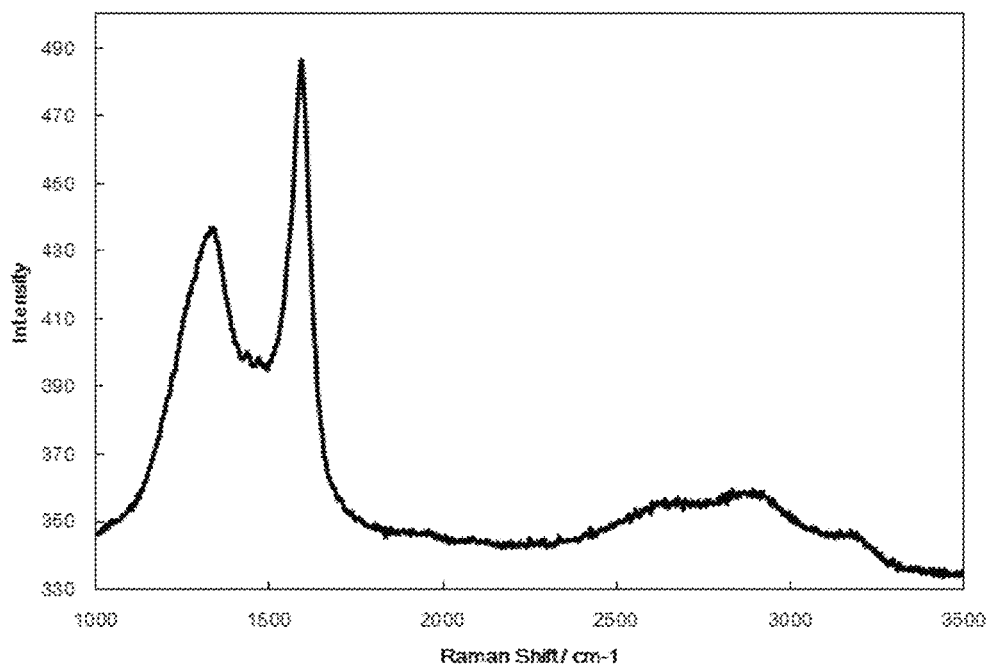
FIG. 30 is a Raman spectral diagram of the surface of an organic-inorganic composite (23) obtained in Example 23.

Thus, an organic-inorganic composite (23) including a carbon material (23A) and an inorganic oxide (23B) was obtained. The Raman spectrum of the organic-inorganic composite (23) was shown in FIG. 30. The Raman spectrum had peaks at 1,340 cm$^{-1}$ 1,590 cm$^{-1}$, 2,700 cm$^{-1}$, and 2,895 cm$^{-1}$, and hence it was found that the carbon material (23A) was a carbon material containing a carbon-based compound having graphene structures and having a structure in which the graphene structures were laminated.

The resultant organic-inorganic composite (23) was subjected to ultrasonic treatment in DMF, and the treated product was purified by removing the excess carbon material (23A) through centrifugation. Thus, core-shell particles (23) (core portions: inorganic oxide particles, shell portions: carbon material bonding regions) in each of which the surface of the inorganic oxide (23B) was coated with the carbon material bonding region were obtained.

Figure 31:
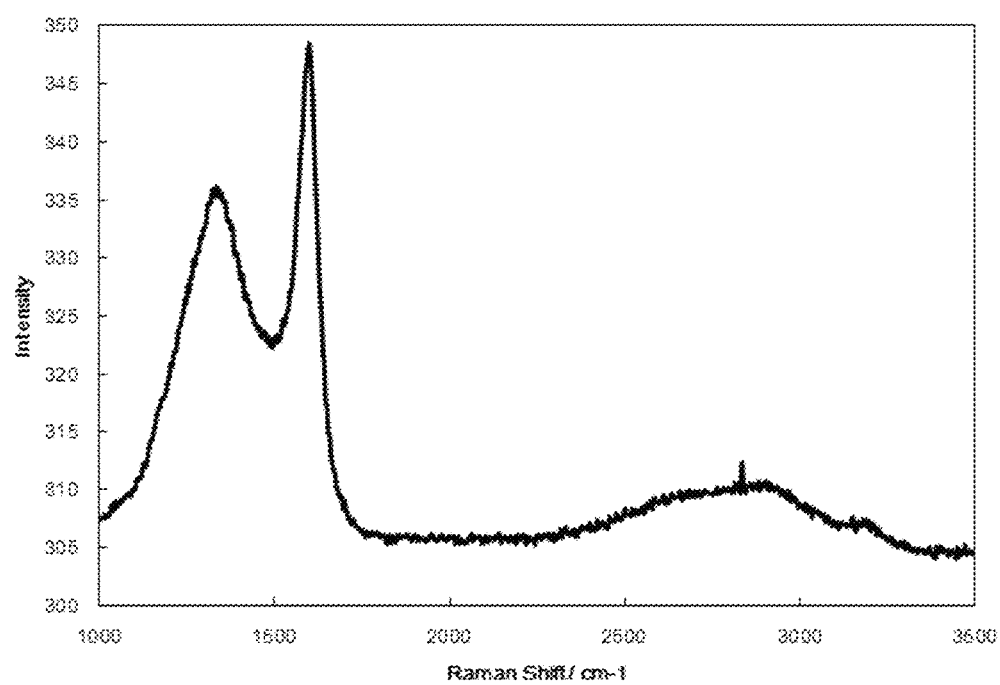
FIG. 31 is a Raman spectral diagram of the surfaces of highly carbonized core-shell particles (23) obtained in Example 23.

The core-shell particles (23) were further calcined at 700° C. for 1 hour. Thus, the carbon material in each of the shell portions was highly carbonized, and hence highly carbonized core-shell particles (23) were obtained. The Raman spectrum of the surfaces of the highly carbonized core-shell particles (23) was shown in FIG. 31.

[Example 24]: (+)-Catechin+Silica Particles+250° C.×2 Hours, Highly Carbonized Core-shell Particles, Different Raw Material 1 Gram of (+)-catechin hydrate (manufactured by Tokyo Chemical Industry Co., Ltd., melting point: none, condensation reaction temperature: 270° C.) was dissolved in 30 g of acetone, and 10 g of silica spherical fine particles (manufactured by Nippon Shokubai Co., Ltd., average particle diameter: 0.19 μm) were added to the solution, followed by sufficient mixing of the contents by ultrasonic treatment. The catechin was a hydrate, and hence the condensation reaction temperature in its TG-DTA was determined by: neglecting a dehydration peak; and determining the temperature at which the condensation of the catechin proceeded after the dehydration thereof.

Acetone was removed from the resultant mixture by normal-temperature vacuum drying, and the remaining massive product was shredded, followed by heating at 250° C. for 2 hours.

Thus, an organic-inorganic composite (24) including a carbon material (24A) and an inorganic oxide (24B) was obtained.

Figure 32:
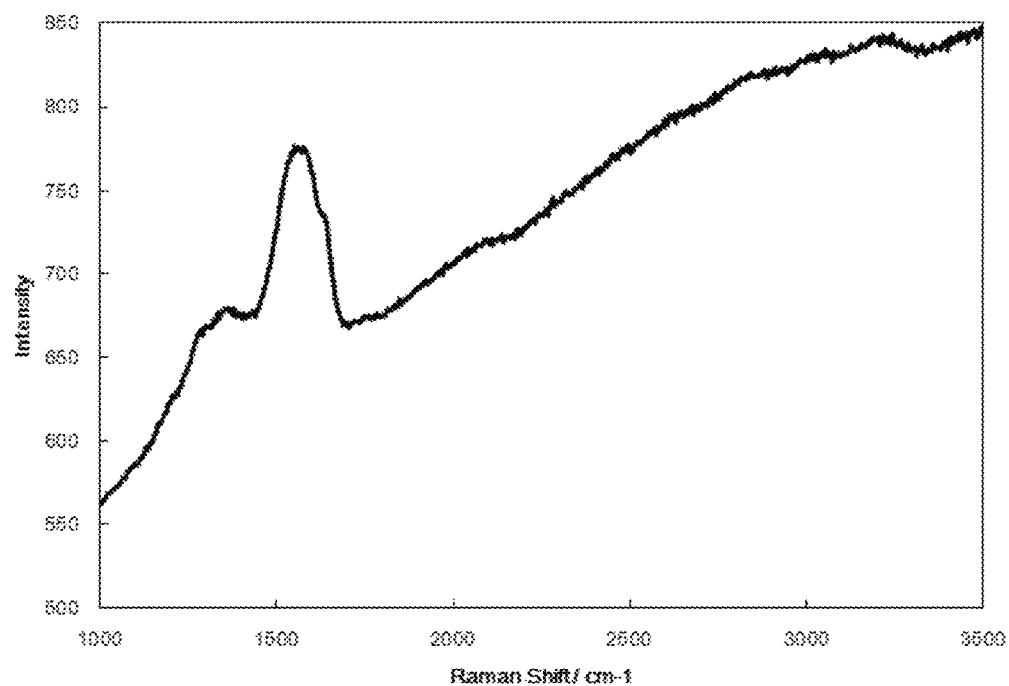
FIG. 32 is a Raman spectral diagram of the surface of an organic-inorganic composite (24) obtained in Example 24.

The Raman spectrum of the organic-inorganic composite (24) was shown in FIG. 32. The Raman spectrum had peaks at 13 cm$^{-1}$, 15 cm$^{-1}$, 27 cm$^{-1}$, and 28 cm$^{-1}$, and hence it was found that the carbon material (24A) was a carbon material containing a carbon-based compound having graphene structures and having a structure in which the graphene structures were laminated.

The resultant organic-inorganic composite (24) was subjected to ultrasonic treatment in DMF, and the treated product was purified by removing the excess carbon material (24A) through centrifugation. Thus, core-shell particles (24) (core portions: inorganic oxide particles, shell portions: carbon material bonding regions) in each of which the surface of the inorganic oxide (24B) was coated with the carbon material bonding region were obtained.

Figure 33:
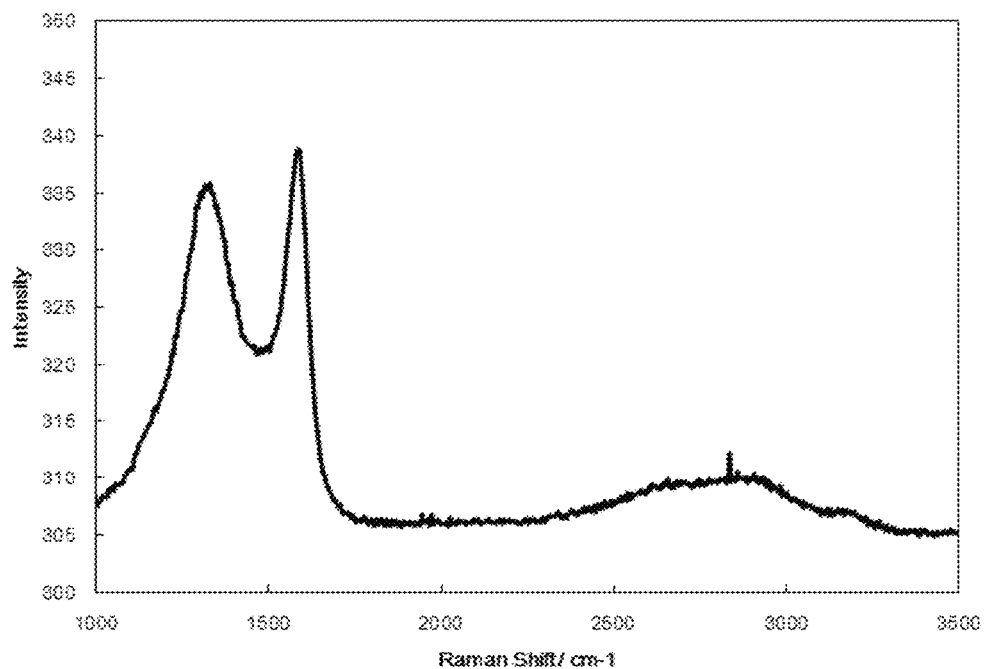
FIG. 33 is a Raman spectral diagram of the surfaces of highly carbonized core-shell particles (24) obtained in Example 24.

The core-shell particles (24) were further calcined at 700° C. for 1 hour. Thus, the carbon material in each of the shell portions was highly carbonized, and hence highly carbonized core-shell particles (24) were obtained. The Raman spectrum of the surfaces of the highly carbonized core-shell particles (24) was shown in FIG. 33.

Comparative Example 1

An organic-inorganic composite (C1) was obtained by the method described in Example 9 except that the heating temperature was set to 170° C. However, no signal of the carbon material of the composite could be observed by its Raman analysis, and only fluorescence derived from the low-molecular weight compound thereof was observed. That is, it was found that phloroglucinol was not sufficiently carbonized.

Comparative Example 2

An organic-inorganic composite (C2) was obtained by the method described in Example 23 except that the heating temperature was set to 270° C. However, no signal of the carbon material of the composite could be observed by its Raman analysis, and only fluorescence derived from the low-molecular weight compound thereof was observed. That is, it was found that hexahydroxytriphenylene was not sufficiently carbonized.

Comparative Example 3

The silica spherical fine particles used in Example 9 were baked under a nitrogen atmosphere at 700° C. for 2 hours. The baked particles were coated with carbon in a vapor phase by using a quick carbon coater (manufactured by Sanyu Electron Co., Ltd., SC-701CT) to produce particles. The presence of carbon was recognized from the Raman analysis of the particles. The results of the $^{13}$C-NMR analysis and $^{29}$Si-NMR analysis of the particles were shown in FIG. 12 and FIG. 13, respectively. As a result of comparison to Example 9, it was found that carbon was present on the surface of each of the particles obtained in Comparative Example 3, but was not sp2 carbon, and a Si—O—C bond was absent, and hence the carbon was not present on the surface of each of the particles through a covalent bond (of course, the bond cannot also be observed in the silica spherical fine particles serving as a raw material). When the results of Comparative Example 3 were considered while being compared to Examples, it was found that according to the present invention, such a carbon material-containing material that the surface of its inorganic matter was strongly coated with an sp2 carbon component through a covalent bond was able to be provided.

Reference Example 1

An organic-inorganic composite ($R^1$) was obtained by the method described in Example 9 except that the heating temperature was set to 520° C. However, the carbon component of the composite was insoluble in N-methylpyrrolidone (NMP), and hence no subsequent treatment could be performed.

It was found from Examples and the like described above that according to the production method of the present invention, a carbon material-containing material that was soluble in a solvent or a carbon material-containing material having a precisely controlled structure was able to be simply produced under a mild condition. It was also found that according to the present invention, such carbon material-containing material was able to be provided. It was also found that the use of the organic-inorganic composite of the present invention whose carbon material was soluble in a solvent was able to relatively easily achieve a core-shell type composite or a hollow carbon material.

TABLE 1

| | Production of organic-inorganic composite | | | | | C1s XPS analysis of organic-inorganic composite | | | | | | | Presence absence of peak derived from C=O stretching vibration in IR analysis |
|---|---|---|---|---|---|---|---|---|---|---|---|---|---|
| | | | | | | Carbon bond (%) | | | | Ratio (%) of carbon-oxygen bonds to all bonds | Ratio (%) of C—O—C to all carbon-oxygen bonds | Ratio (%) of C—OH and C—O—C to all bonds | |
| | Compound (A) | Inorganic oxide | Heating temperature (° C.) | Heating time (hours(s)) | Organic-inorganic composite | (A) —COO—, lactone, and some ketones | (B) C=O epoxy | (C) C—OH C—O—C | (D) C—H C—C C=C | | | | |
| Example 1 | Phloroglucinol | Silica | 250 | 1 | (1) | 3 | 7 | 16 | 74 | 26 | 62 | 16 | Absent |
| Example 2 | Phloroglucinol | Alumina | 250 | 1 | (2) | 4 | 8 | 17 | 71 | 29 | 59 | 17 | Present |
| Example 3 | Phloroglucinol | Titania | 250 | 1 | (3) | 6 | 6 | 1 5 | 73 | 27 | 56 | 15 | Present |
| Example 4 | Phloroglucinol | HPW | 250 | 1 | (4) | 1 | 6 | 22 | 71 | 29 | 76 | 22 | Absent |
| Example 5 | Phloroglucinol | HPMo | 250 | 1 | (5) | 1 | 9 | 17 | 73 | 27 | 63 | 17 | Absent |
| Example 6 | Phloroglucinol | HSiW | 250 | 1 | (6) | 2 | 6 | 21 | 71 | 29 | 72 | 21 | Absent |
| Example 7 | Phloroglucinol | HPVMo | 250 | 1 | (7) | 7 | 6 | 16 | 71 | 29 | 55 | 16 | Absent |
| Example 8 | Phloroglucinol | HPWMo | 250 | 1 | (8) | 3 | 5 | 19 | 73 | 27 | 70 | 19 | Absent |

TABLE 2

| | Thermal diffusivity (×10$^{-7}$ m$^2$/s) | Thermal conductivity (W/mK) |
|---|---|---|
| PMMA/alumina | 7.40 | 2.04 |
| PMMA/highly carbonized core-shell particles (17) | 8.91 | 2.46 |

INDUSTRIAL APPLICABILITY

The carbon material-containing material obtained by the production method of the present invention and the carbon material-containing material of the present invention may each be effectively utilized as a material at the time of industrial production of, for example, carbon-coated inorganic particles and hollow carbon fine particles each of which is useful as, for example, a filler having a light weight, excellent lubricity, excellent electrical conductivity, excellent thermal conductivity, and an excellent antioxidative property. Applications where the materials are assumed to be utilized include: a solid lubricant; an additive for lubrication to be added to a lubricating oil or the like; and a conductive aid, an antistatic agent, a strength-imparting agent, a friction-reducing agent, or a thermal conductivity-imparting agent to be added to an inorganic material or an organic material, such as a resin. In addition, the organic-inorganic composite of the present invention may be effectively utilized as a material at the time of industrial production of, for example, carbon-coated inorganic particles and hollow carbon fine particles each of which is useful as, for example, a filler having a light weight, excellent lubricity, excellent electrical conductivity, excellent thermal conductivity, and an excellent antioxidative property. Applications where the materials are assumed to be utilized include: a solid lubricant; an additive for lubrication to be added to a lubricating oil or the like; and a conductive aid, an antistatic agent, a strength-imparting agent, a friction-reducing agent, or a thermal conductivity-imparting agent to be added to an inorganic material or an organic material, such as a resin.

REFERENCE SIGNS LIST 10 carbon material
20 inorganic matter particle
30 carbon material bonding region
100 organic-inorganic composite
200 core-shell particle

The invention claimed is:

1. A method of producing a carbon material-containing material, comprising a heating step (I) of heating a composition containing a compound (A), which causes a condensation reaction between the same molecules and/or between different molecules by being heated, and an inorganic matter,
   wherein when the compound (A) has a condensation reaction temperature of T ° C., a heating temperature in the heating step (I) is (T−150)° C. or more, and
   wherein the heating temperature in the heating step (I) is 300° C. or less, and
   wherein the carbon material-containing material includes the compound (A) carbonized by the heating step (I) in a carbon material of the carbon material-containing material.

2. The method of producing a carbon material-containing material according to claim 1, further comprising a carbon material-removing step of removing at least part of a carbon material produced by the heating of the compound (A) after the heating step (I).

3. The method of producing a carbon material-containing material according to claim 1, further comprising an inorganic matter-removing step of removing the inorganic matter after the heating step (I).

4. The method of producing a carbon material-containing material according to claim 1, wherein the compound (A) has a molecular weight of 500 or less.

5. The method of producing a carbon material-containing material according to claim 1, wherein the compound (A) has a condensation reaction temperature of 450° C. or less.

6. The method of producing a carbon material-containing material according to claim 1, wherein when the compound (A) is subjected to TG-DTA analysis under a nitrogen gas atmosphere and under a temperature increase condition of 10° C./min from 40° C., a weight ratio (M500/M50) of a weight M500 thereof at a temperature of 500° C. to an initial weight M50 thereof at a temperature of 50° C. is 0.2 or more.

7. The method of producing a carbon material-containing material according to claim 1, wherein the condensation reaction is accelerated by an acid catalyst.

8. The method of producing a carbon material-containing material according to claim 1, wherein the condensation reaction is at least one kind selected from the group consisting of:
   (a) a condensation reaction caused by formation of $H_2O$ from a —H group and a —OH group, and desorption thereof;
   (b) a condensation reaction caused by formation of ROH from a —H group and an —OR group where R represents any appropriate substituted or unsubstituted alkyl group, and desorption thereof;
   (c) a condensation reaction caused by formation of HX from a —H group and an —X group where X represents a halogen or CN, and desorption thereof;
   (d) a condensation reaction caused by formation of $NH_3$ from a —H group and an —$NH_2$ group, and desorption thereof;
   (e) a condensation reaction caused by formation of $RNH_2$ from a —H group and an —NHR group where R represents any appropriate substituted or unsubstituted alkyl group, and desorption thereof;
   (f) a condensation reaction caused by formation of $R^1R^2NH$ from a —H group and an —$NR^1R^2$ group where $R^1$ and $R^2$ each represent any appropriate substituted or unsubstituted alkyl group, and desorption thereof;
   (g) a condensation reaction caused by formation of $H_2S$ from a —H group and a —SH group, and desorption thereof;
   (h) a condensation reaction caused by formation of RSH from a —H group and an —SR group where R represents any appropriate substituted or unsubstituted alkyl group, and desorption thereof;
   (i) a condensation reaction caused by formation of RCOOH from a —H group and an —OOCR group where R represents any appropriate substituted or unsubstituted alkyl group, and desorption thereof;
   (j) a condensation reaction caused by formation of $H_2SO_3$ from a —H group and an —OSO(OH) group, and desorption thereof;
   (k) a condensation reaction caused by formation of $RSO_2$(OH) from a —H group and an —$OSO_2R$ group where R represents any appropriate substituted or unsubstituted alkyl group, and desorption thereof;
   (l) a condensation reaction caused by formation of $ROSO_3H$ from a —H group and an —$OSO_2$(OR) group where R represents any appropriate substituted or unsubstituted alkyl group, and desorption thereof; and
   (m) a condensation reaction caused by formation of $H_2SO_4$ from a —H group and an —$OSO_2$(OH) group, and desorption thereof.

9. The method of producing a carbon material-containing material according to claim 1, wherein the inorganic matter is at least one kind selected from the group consisting of an inorganic oxide, an inorganic nitride, an inorganic sulfide, an inorganic carbide, and an insoluble salt.

10. The method of producing a carbon material-containing material according to claim 9, wherein the inorganic oxide is inorganic oxide particles each having a functional group on a surface thereof.

11. The method of producing a carbon material-containing material according to claim 10, wherein the inorganic oxide particles are at least one kind selected from the group consisting of silica particles, alumina particles, titania particles, magnesium oxide particles, polyacid particles, metal particles whose surfaces are oxidized at least partially, composite oxide particles, and solid solution oxide particles.

12. The method of producing a carbon material-containing material according to claim 9, wherein the inorganic oxide has a decomposition temperature of 800° C. or more.

13. A carbon material-containing material, comprising:
a carbon material; and
an inorganic matter,
wherein at least part of the carbon material and at least part of the inorganic matter are bonded to each other through a covalent bond, and
wherein the carbon material-containing material shows a peak in a range of from 125 ppm to 135 ppm in $^{13}$C-NMR analysis thereof, and
wherein a thickness of the carbon material is less than 3 nm.

14. The carbon material-containing material according to claim 13, wherein the carbon material-containing material shows a peak in a range of from 140 ppm to 160 ppm in $^{13}$C-NMR analysis thereof.

15. An organic-inorganic composite, comprising:
a carbon material; and
an inorganic matter,
wherein the carbon material is soluble in N-methylpyrrolidone, and
wherein the carbon material is a carbonized carbon material.

16. The organic-inorganic composite according to claim 15, wherein the inorganic matter is at least one kind selected from the group consisting of an inorganic oxide, an inorganic nitride, an inorganic sulfide, an inorganic carbide, and an insoluble salt.

17. The organic-inorganic composite according to claim 16, wherein the inorganic oxide is inorganic oxide particles each having a functional group on a surface thereof.

18. The organic-inorganic composite according to claim 17, wherein the inorganic oxide particles are at least one kind selected from the group consisting of silica particles, alumina particles, titania particles, magnesium oxide particles, polyacid particles, metal particles whose surfaces are oxidized at least partially, composite oxide particles, and solid solution oxide particles.

* * * * *